(12) United States Patent
Suwa et al.

(10) Patent No.: US 9,541,795 B2
(45) Date of Patent: Jan. 10, 2017

(54) LIQUID CRYSTAL DISPLAY DEVICE AND METHOD FOR MANUFACTURING THE SAME

(71) Applicant: Sony Corporation, Tokyo (JP)

(72) Inventors: Shunichi Suwa, Kanagawa (JP);
Masashi Miyakawa, Kanagawa (JP);
Masahiko Nakamura, Kanagawa (JP);
Tadaaki Isozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 14/187,941

(22) Filed: Feb. 24, 2014

(65) Prior Publication Data

US 2014/0168588 A1 Jun. 19, 2014

Related U.S. Application Data

(62) Division of application No. 13/166,236, filed on Jun. 22, 2011, now Pat. No. 8,696,950.

(30) Foreign Application Priority Data

Jul. 30, 2010 (JP) .................................. 2010-171835

(51) Int. Cl.
*G02F 1/1337* (2006.01)

(52) U.S. Cl.
CPC ....... *G02F 1/1337* (2013.01); *G02F 1/133711* (2013.01); *G02F 1/133753* (2013.01); *G02F 1/133707* (2013.01); *G02F 1/133788* (2013.01)

(58) Field of Classification Search
CPC .............. G06F 1/1337; G06F 1/133711; G06F 1/33753; G06F 1/133707; G06F 1/133788
See application file for complete search history.

(56) References Cited

U.S. PATENT DOCUMENTS

| 2004/0207794 A1 | 10/2004 | Miyachi et al. |
| 2006/0268186 A1 | 11/2006 | Kamada et al. |
| 2009/0015745 A1 | 1/2009 | Nakagawa et al. |
| 2009/0147200 A1 | 6/2009 | Okuyama et al. |

FOREIGN PATENT DOCUMENTS

| JP | 10-73821 A | 3/1998 |
| JP | 10-87859 A | 4/1998 |
| JP | 10-232400 A | 9/1998 |
| JP | 10-252646 A | 9/1998 |
| JP | 11-326638 A | 11/1999 |
| JP | 2002-082336 A | 3/2002 |

*Primary Examiner* — Mathieu Vargot
(74) *Attorney, Agent, or Firm* — Chip Law Group

(57) ABSTRACT

A liquid crystal display device including an array of pixels each including first and second substrates, first and second electrodes formed on opposing surfaces of the first and second substrates, which surfaces are positioned opposite to the second and first substrates, first and second alignment restricting portions provided in the first and second electrodes, first and second alignment films covering respectively the first and second electrodes, the first and second alignment restricting portions, and the opposing surfaces of the first and second substrates, and a liquid crystal layer formed between the first and second alignment films and containing liquid crystal molecules, wherein, in each pixel, major axes of a group of liquid crystal molecules are positioned substantially in the same imaginary plane in a predetermined overlapped region between the first and second electrodes, and a pre-tilt is given to the liquid crystal molecules by at least the first alignment film.

12 Claims, 25 Drawing Sheets

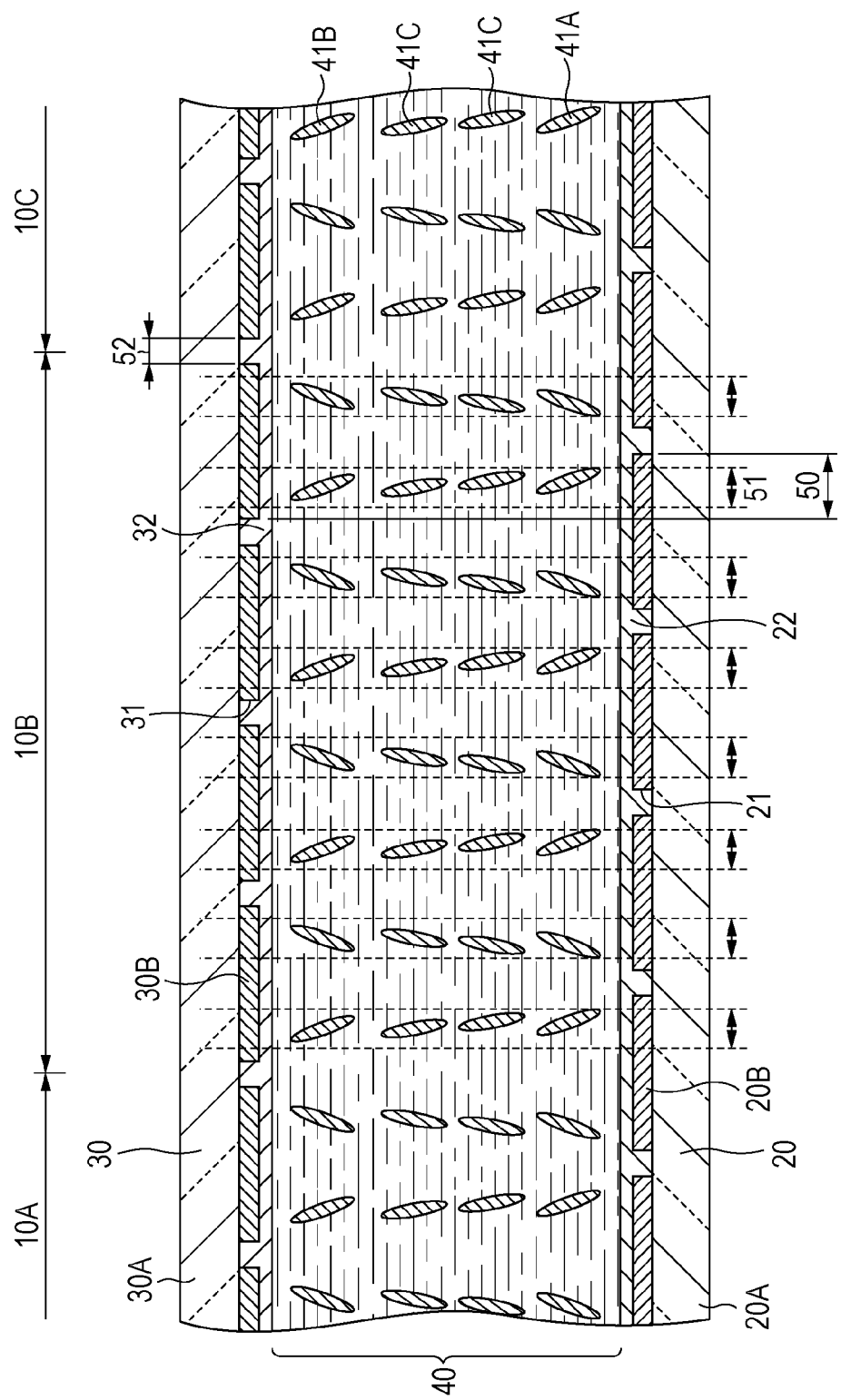

EDGE OF FIRST ELECTRODE
(PIXEL ELECTRODE)

EDGE OF SECOND ELECTRODE
(COUNTER ELECTRODE)

EDGE OF FIRST ELECTRODE
(PIXEL ELECTRODE)

EDGE OF SECOND ELECTRODE
(COUNTER ELECTRODE)

EDGE OF FIRST ELECTRODE
(PIXEL ELECTRODE)

EDGE OF SECOND ELECTRODE
(COUNTER ELECTRODE)

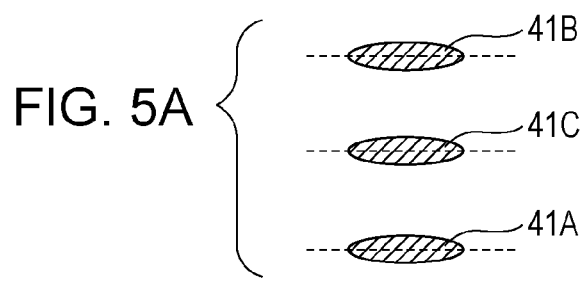
FIG. 5A
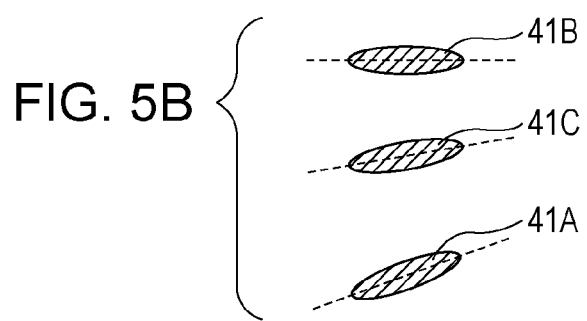
FIG. 5B
FIG. 6
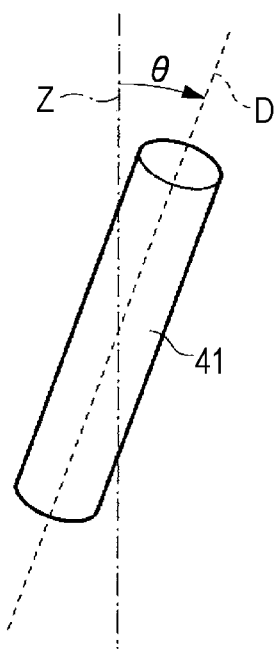

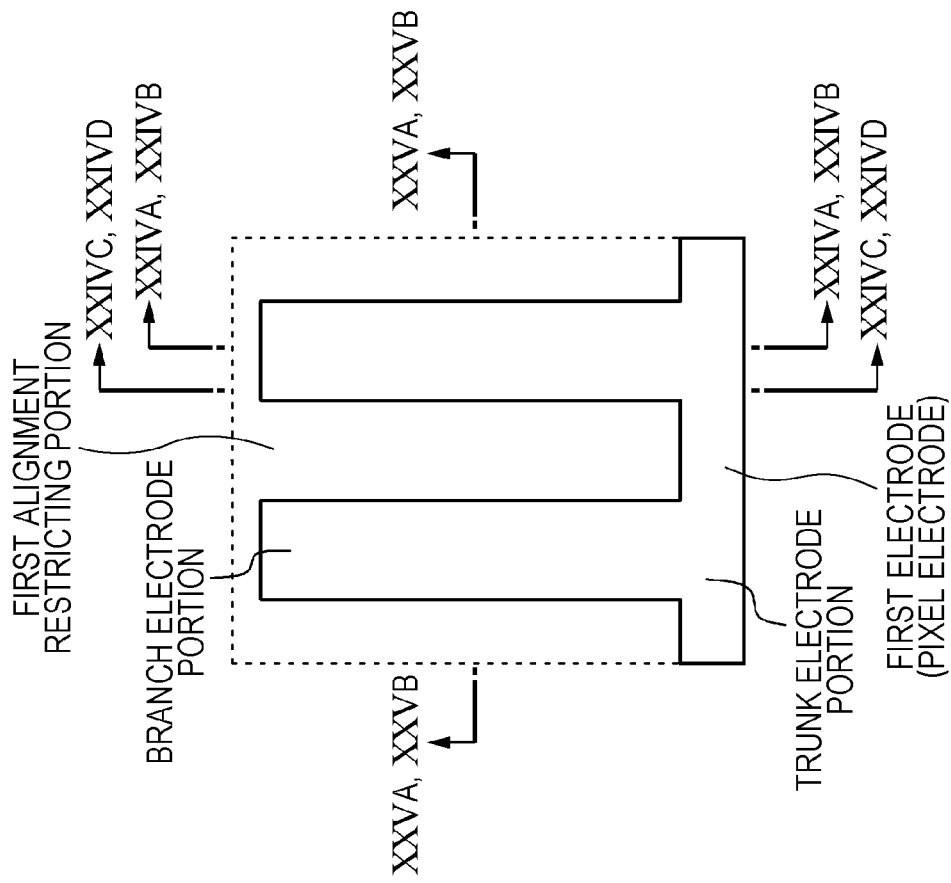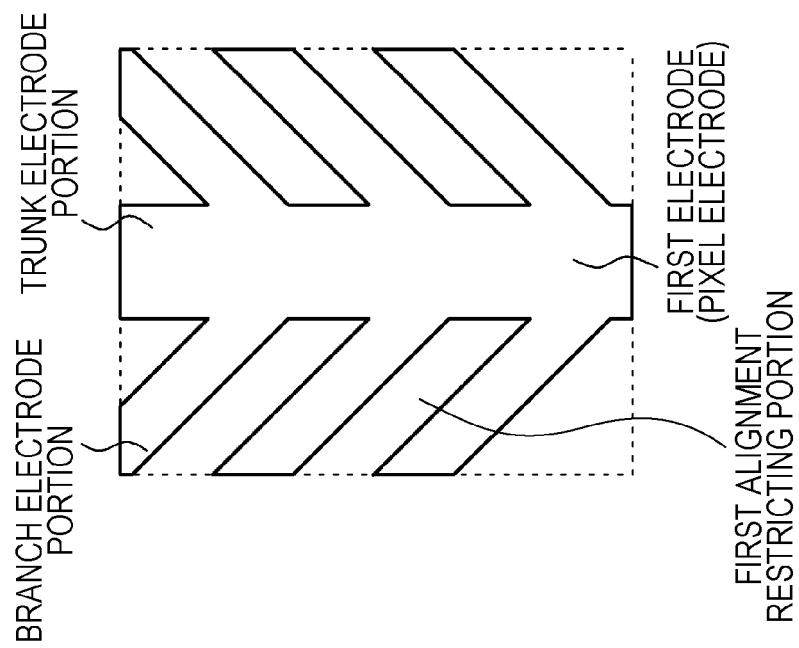

LIQUID CRYSTAL DISPLAY DEVICE AND METHOD FOR MANUFACTURING THE SAME

CROSS REFERENCES TO RELATED APPLICATIONS

The present application is a division of U.S. patent application Ser. No. 13/166,236, filed Jun. 22, 2011, now U.S. Pat. No. 8,696,950, which claims priority to Japanese Priority Patent Application JP 2010-171835, filed in the Japan Patent Office on Jul. 30, 2010, the entire contents of which are hereby incorporated herein by reference.

BACKGROUND

The present application relates to a liquid crystal display device including a liquid crystal display element in which a liquid crystal layer is formed in a sealed-off state between a pair of substrates having alignment films formed on substrate surfaces opposing to each other. The present application also relates to a method for manufacturing the liquid crystal display device.

Recently, LCDs (Liquid Crystal Displays) have been used as display monitors for liquid crystal television receivers, notebook-size personal computers, car navigation devices, etc. in many cases. The liquid crystal displays are classified into various display modes (types) depending on molecular arrangement (alignment) of liquid crystal molecules that are contained in a liquid crystal layer formed in sandwiched relation between substrates. As one example of the display modes, there is a TN (Twisted Nematic) mode in which liquid crystal molecules are arrayed while twisting in a state not applied with a voltage. In the TN mode, each liquid crystal molecule has positive dielectric anisotropy, i.e., a property that the dielectric constant of the liquid crystal molecule in its major axis is larger than that in its minor axis. Therefore, the liquid crystal layer is of such a structure that the liquid crystal molecules are successively arranged in a line in the direction perpendicular to the substrate surface while the oriented azimuths of the liquid crystal molecules are gradually rotated in planes parallel to the substrate surface.

On the other hand, attention has been focused on a VA (Vertical Alignment) mode in which the liquid crystal molecules are aligned in vertical orientation perpendicularly to the substrate surface in the state not applied with a voltage. In the VA mode, each liquid crystal molecule has negative dielectric anisotropy, i.e., a property that the dielectric constant of the liquid crystal molecule in its major axis is smaller than that in its minor axis. Therefore, the VA mode can realize a wider viewing angle than the TN mode.

In the liquid crystal display of the VA mode, when a voltage is applied, the liquid crystal molecules aligned in vertical orientation perpendicularly to the substrate surface responds to the applied voltage such that the molecules are tipped down to the direction parallel to the substrate surface due to the negative dielectric anisotropy, thus allowing light to pass through the liquid crystal layer. However, because the liquid crystal molecules aligned perpendicularly to the substrate surface are tilted in arbitrary directions, the alignment of the liquid crystal molecules is disturbed upon the application of the voltage, whereby a response characteristic to the voltage is degraded.

Techniques for restricting the direction in which the liquid crystal molecules are tilted in response to the voltage have been studied with the view of improving the response characteristic. More specifically, there is a technique (photo-alignment technique) in which a pre-tilt is given to the liquid crystal molecules by using an alignment film that is formed by casting linearly-polarized ultraviolet light or obliquely casting ultraviolet light for irradiation to the substrate surface. In one example of the photo-alignment technique, an alignment film is formed by obliquely casting linearly-polarized ultraviolet light for irradiation to a film, which is made of a polymer including a chalcone structure and which is formed on the substrate surface, so that a double-bond portion in the chalcone structure is cross-linked (see Japanese Unexamined Patent Application Publication No. 10-087859, No. 10-252646, and No. 2002-082336). As another example, there is a technique of forming an alignment film by using a mixture of a vinyl-cinnamate derivative high-molecule and polyimide (see Japanese Unexamined Patent Application Publication No. 10-232400). As still another example, there is a technique of forming an alignment film by casting linearly-polarized ultraviolet light at a wavelength of 254 nm for irradiation to a film containing polyimide, thereby decomposing part of the polyimide (see Japanese Unexamined Patent Application Publication No. 10-073821). Further, as one example in peripherals of the photo-alignment technique, there is a technique of forming a liquid crystal alignment film by forming a film made of a liquid crystal high-molecular compound on a film made of a polymer containing a dichroic photo-reactive formation unit, e.g., an azobenzene derivative, after casting linearly-polarized ultraviolet light or oblique light for irradiation to the latter film (see Japanese Unexamined Patent Application Publication No. 11-326638).

SUMMARY

The above-described photo-alignment techniques can improve the response characteristic in comparison with that in the ordinary MVA (Multi-domain Vertical Alignment) mode or PVA (Patterned Vertical Alignment) mode, but they have the problem that an elaborate light irradiation apparatus, such as an apparatus for irradiating the substrate surface with the linearly-polarized light from an oblique direction, is necessary when the alignment film is formed. Another problem is that, when a liquid crystal display of the multi-domain type that the liquid crystal molecules are divisionally aligned by providing a plurality of sub-pixels in each pixel is manufactured with the view of realizing a wider viewing angle, a more elaborate apparatus is necessary and a manufacturing process is complicated. More specifically, in the liquid crystal display of the multi-domain type, the alignment film is formed so as to provide the pre-tilt differing per sub-pixel. Thus, when the above-described photo-alignment technique is used in manufacturing the liquid crystal display of the multi-domain type, light irradiation is performed per sub-pixel and a mask pattern is necessary per sub-pixel, whereby the light irradiation apparatus becomes more elaborate.

To cope with the problems described above, there is proposed a photo-alignment method using a striped mask (Jpn. J. Appl. Phys. Vol. 36 (1997) pp. L1449-L1452) with intent to reduce the number of repeated light irradiations. Although eight irradiations in total are usually necessary to form 4-azimuth domains for upper and lower substrates, the proposed photo-alignment technique can reduce the number of repeated irradiations to four. Further, because the irradiation is performed along the stripe direction, the influence of a mask shadow can be reduced.

However, in the liquid crystal display of the VA mode, such as the mode utilizing the photo-alignment using the striped mask or the mode using a fine slit electrode to give a pre-tilt (e.g., PSA (Polymer-Sustained Alignment) mode), the major axes of a group of liquid crystal molecules are gradually twisted in a liquid crystal layer between a pair of electrodes in a direction from one electrode side toward the other electrode side. In that twisted state, when a voltage is applied between the pair of electrodes, it takes a time for the major axes of the group of liquid crystal molecules to release from the twisted state as illustrated in the simulation result of FIG. 22, and a further improvement of the response characteristic is hard to realize. The simulation result of FIG. 22 is based on the structure that, as illustrated in FIG. 26A, a first electrode (pixel electrode) on a first substrate (TFT substrate) has a trunk electrode portion with a width of 8 µm and branch electrode portions (with a width of 4 µm) extending obliquely laterally from the trunk electrode portion (at an interval (gap) of 4 µm between the adjacent branch electrode portions), and that a second electrode (counter electrode) on a second substrate (CF substrate) is formed as the so-called solid electrode without providing slits.

In view of the problems described above, it is desirable to provide a liquid crystal display device including a liquid crystal display element, which can improve a response characteristic. It is also desirable to provide a method of manufacturing a liquid crystal display device, which can easily improve a response characteristic without using an elaborate apparatus.

According to an embodiment, there is provided a liquid crystal display device including an array of plural pixels, each of the plural pixels including a first substrate and a second substrate, a first electrode formed on an opposing surface of the first substrate, which surface is positioned opposite to the second substrate, a first alignment restricting portion provided in the first electrode, a first alignment film covering the first electrode, the first alignment restricting portion, and the opposing surface of the first substrate, a second electrode formed on an opposing surface of the second substrate, which surface is positioned opposite to the first substrate, a second alignment restricting portion provided in the second electrode, a second alignment film covering the second electrode, the second alignment restricting portion, and the opposing surface of the second substrate, and a liquid crystal layer formed between the first alignment film and the second alignment film and containing liquid crystal molecules, wherein, in each pixel, major axes of a group of liquid crystal molecules in the liquid crystal layer are positioned substantially in the same imaginary plane in a central region of an overlapped region where a projected image of a region surrounded by edges of the first electrode and two first alignment restricting portions overlaps with a projected image of a region surrounded by edges of the second electrode and two second alignment restricting portions, and wherein a pre-tilt is given to the liquid crystal molecules by at least the first alignment film. Herein, when looking at the central region of the overlapped region from a direction normal to the second substrate, the major axes of the group of liquid crystal molecules occupying the central region of the overlapped region in the direction normal to the second substrate (more specifically, the major axes of the group of liquid crystal molecules occupying a minute columnar region from the first substrate to the second substrate) are positioned substantially in the same imaginary vertical plane.

In the liquid crystal display device according to the embodiment, the liquid crystal molecules may have negative dielectric anisotropy.

In the liquid crystal display device according to the above-mentioned embodiment, preferably, the first alignment film contains a compound (called a "compound after alignment processing" for convenience of explanation) obtained by cross-linking a high-molecular compound having a cross-linkable functional group or a polymerizable functional group in at least one side chain thereof, and the pre-tilt is given to the liquid crystal molecule by the cross-linked compound (compound after alignment processing). Be it noted that such a liquid crystal display device is called a liquid crystal display device according to a first feature of an embodiment for convenience of explanation). Also, a liquid crystal display element according to the first feature is a liquid crystal display element used in the liquid crystal display device according to the first feature of an embodiment. Further, the term "cross-linkable functional group" implies a group capable of forming a cross-linked structure (bridged structure). In other words, it implies a group capable of developing dimerization. The term "polymerizable functional group" implies a functional group of the type that two or more functional groups can successively develop polymerization.

As an alternative, in the liquid crystal display device according to the above-mentioned embodiment, preferably, the first alignment film contains a compound (called a "compound after alignment processing" for convenience of explanation) obtained by deforming a high-molecular compound having a photosensitive functional group in at least one side chain thereof, and the pre-tilt is given to the liquid crystal molecule by the deformed compound (compound after alignment processing). Be it noted that such a liquid crystal display device is called a "liquid crystal display device according to a second feature of an embodiment" for convenience of explanation). Also, a liquid crystal display element according to the second feature is a liquid crystal display element used in the liquid crystal display device according to the second feature of an embodiment. Further, the term "photosensitive functional group" implies a group capable of absorbing an energy ray.

A method for manufacturing a liquid crystal display device (method for manufacturing a liquid crystal display element), according to any of the first, second and third features of an embodiment, is provided as a method for manufacturing the liquid crystal display device including an array of plural pixels, each of the plural pixels including a first substrate and a second substrate, a first electrode formed on an opposing surface of the first substrate, which surface is positioned opposite to the second substrate, a first alignment restricting portion provided in the first electrode, a first alignment film covering the first electrode, the first alignment restricting portion, and the opposing surface of the first substrate, a second electrode formed on an opposing surface of the second substrate, which surface is positioned opposite to the first substrate, a second alignment restricting portion provided in the second electrode, a second alignment film covering the second electrode, the second alignment restricting portion, and the opposing surface of the second substrate, and a liquid crystal layer formed between the first alignment film and the second alignment film and containing liquid crystal molecules having negative dielectric anisotropy, wherein, in each pixel, major axes of a group of liquid crystal molecules in the liquid crystal layer being positioned substantially in the same imaginary plane in a central region of an overlapped region where a projected image of a region surrounded by edges of the first electrode and two first alignment restricting portions overlaps with a projected image of a region surrounded by edges of the second electrode and two second alignment restricting portions.

Further, the method for manufacturing the liquid crystal display device (method for manufacturing the liquid crystal display element), according to the first feature of an embodiment, includes forming, on the first substrate, the first alignment film made of a high-molecular compound (called a "compound before alignment processing" for convenience of explanation) having a cross-linkable functional group or a polymerizable functional group in at least one side chain thereof, forming the second alignment film on the second substrate, arranging the first substrate and the second substrate such that the first alignment film and the second alignment film are positioned to face each other, and forming the liquid crystal layer, which contains the liquid crystal molecules having negative dielectric anisotropy, in a sealed-off state between the first alignment film and the second alignment film, and after forming the liquid crystal layer in the sealed-off state, cross-linking the high-molecular compound (compound before alignment processing) such that a pre-tilt is given to the liquid crystal molecule.

In the method for manufacturing the liquid crystal display device (method for manufacturing the liquid crystal display element), according to the first feature of an embodiment, the side chain of the high-molecular compound (compound before alignment processing) may be cross-linked by irradiating the liquid crystal layer with an ultraviolet ray while the liquid crystal molecules are aligned by applying a predetermined electric field to the liquid crystal layer.

In that case, preferably, the liquid crystal layer is irradiated with the ultraviolet ray while the electric field is applied to the liquid crystal layer such that the liquid crystal molecules are aligned in an oblique direction with respect to a surface of at least one of a pair of substrates. More preferably, the pair of substrates is made of a substrate having a pixel electrode and a substrate having a counter electrode, and the ultraviolet ray is cast for irradiation to the liquid crystal layer from the outer side of the substrate having the pixel electrode. In general, a color filter is formed on the substrate having the counter electrode. Hence, there is a risk that the cross-linkable functional group or the polymerizable functional group in an alignment film material may become hard to develop a reaction because the ultraviolet ray is absorbed by the color filter. For that reason, as mentioned above, the ultraviolet ray is preferably cast for the irradiation from the outer side of the substrate having the pixel electrode where the color filter is not formed. When the color filter is formed on the substrate having the pixel electrode, the ultraviolet ray is preferably cast for the irradiation from the outer side of the substrate having the counter electrode. Basically, the azimuth angle (deflection angle) of the liquid crystal molecule when the pre-tilt is given is specified depending on the intensity and the direction of the electric field and the molecular structure of the alignment film material, and a polar angle (zenithal angle) thereof is specified depending on the intensity of the electric field and the molecular structure of the alignment film material. Those points are similarly applied to the later-described method for manufacturing the liquid crystal display device according to any of the second and third features of an embodiment.

The method for manufacturing the liquid crystal display device (method for manufacturing the liquid crystal display element), according to the second feature of an embodiment, includes forming, on the first substrate, the first alignment film made of a high-molecular compound (called a "compound before alignment processing" for convenience of explanation) having a photosensitive functional group in at least one side chain thereof, forming the second alignment film on the second substrate, arranging the first substrate and the second substrate such that the first alignment film and the second alignment film are positioned to face each other, and forming the liquid crystal layer, which contains the liquid crystal molecules having negative dielectric anisotropy, in a sealed-off state between the first alignment film and the second alignment film, and after forming the liquid crystal layer in the sealed-off state, deforming the high-molecular compound (compound before alignment processing) such that a pre-tilt is given to the liquid crystal molecule.

In the method for manufacturing the liquid crystal display device (method for manufacturing the liquid crystal display element), according to the second feature of an embodiment, the side chain of the high-molecular compound (compound before alignment processing) may be deformed by irradiating the liquid crystal layer with an ultraviolet ray while the liquid crystal molecules are aligned by applying a predetermined electric field to the liquid crystal layer.

The method for manufacturing the liquid crystal display device (method for manufacturing the liquid crystal display element), according to the third feature of an embodiment, includes forming, on the first substrate, the first alignment film made of a high-molecular compound (called a "compound before alignment processing" for convenience of explanation) having a cross-linkable functional group or a polymerizable functional group, or a photosensitive functional group in at least one side chain thereof, forming the second alignment film on the second substrate, arranging the first substrate and the second substrate such that the first alignment film and the second alignment film are positioned to face each other, and forming the liquid crystal layer, which contains the liquid crystal molecules having negative dielectric anisotropy, in a sealed-off state between the first alignment film and the second alignment film, and after forming the liquid crystal layer in the sealed-off state, irradiating the high-molecular compound (compound before alignment processing) with an energy ray such that a pre-tilt is given to the liquid crystal molecule. Herein, the energy ray may be, for example, an ultraviolet ray, an X-ray, or an electron ray.

In the method for manufacturing the liquid crystal display device (method for manufacturing the liquid crystal display element), according to the third feature of an embodiment, the high-molecular compound may be irradiated with an ultraviolet ray as the energy ray while the liquid crystal molecules are aligned by applying a predetermined electric field to the liquid crystal layer.

The liquid crystal display device according to the first feature of an embodiment and the method for manufacturing the liquid crystal display device according to the first feature of an embodiment, including the above-mentioned preferred embodiments, are also collectively referred to simply as the "first feature of an embodiment" hereinafter. The liquid crystal display device according to the second feature of an embodiment and the method for manufacturing the liquid crystal display device according to the second feature of an embodiment, including the above-mentioned preferred embodiments, are also collectively referred to simply as the "second feature of an embodiment" hereinafter. The liquid crystal display device according to the third feature of an embodiment and the method for manufacturing the liquid crystal display device according to the third feature of an embodiment, including the above-mentioned preferred embodiments, are also collectively referred to simply as the "third feature of an embodiment" hereinafter.

In the first, second or third feature of an embodiment, the high-molecular compound (compound before alignment processing) or the compound (compound after alignment processing) constituting the first alignment film may be made of a compound further having a group expressed by the following formula (1) in at least one side chain thereof. Be it noted that such an arrangement is called respectively a "first formation 1A, second formation 2A, or third formation 3A according to the embodiment" for convenience of explanation.

$$—R1-R2-R3 \tag{1}$$

where R1 is a linear or branched bivalent organic group having a carbon number of 1 or more, the organic group optionally including an ether group or an ester group, R1 being bonded to a main chain of the high-molecular compound (compound before alignment processing) or the cross-linked compound (compound after alignment processing), or R1 is at least one type of bonding group selected from among ether, ester, ether ester, acetal, ketal, hemiacetal, and hemiketal, R1 being bonded to the main chain of the high-molecular compound (compound before alignment processing) or the cross-linked compound (compound after alignment processing), R2 is a bivalent organic group including a plurality of ring structures, one of atoms constituting the ring structures being bonded to R1, and R3 is a univalent group including a hydrogen atom, a halogen atom, an alkyl group, an alkoxy group or a carbonate group, or a derivative thereof.

Alternatively, in the first, second or third feature of an embodiment, the high-molecular compound (compound before alignment processing) or the compound (compound after alignment processing) constituting the first alignment film may be made of a compound having a group expressed by the following formula (2) in at least one side chain thereof. Be it noted that such an arrangement is called respectively a "first formation 1B, second formation 2B, or third formation 3B according to the embodiment" for convenience of explanation. Further, the high-molecular compound (compound before alignment processing) or the compound (compound after alignment processing) constituting the first alignment film may be made of a compound having both the group expressed by the formula (1) and the group expressed by the formula (2) in the side chain instead of having only the group expressed by the formula (2).

$$—R11-R12-R13-R14 \tag{2}$$

where R11 is a linear or branched bivalent organic group having a carbon number of 1 or more and 20 or less, preferably a carbon number of 3 or more and 12 or less, the organic group optionally including an ether group or an ester group, R11 being bonded to a main chain of the high-molecular compound (compound before alignment processing) or the cross-linked compound (compound after alignment processing), or R11 is at least one type of bonding group selected from among ether, ester, ether ester, acetal, ketal, hemiacetal, and hemiketal, R11 being bonded to the main chain of the high-molecular compound (compound before alignment processing) or the cross-linked compound (compound after alignment processing), R12 is a bivalent group including one type of structure selected from among structures represented by chalcone, cinnamate, cinnamoyl, coumarin, maleimide, benzophenone, norbornene, orizanol, chitosan, acryloyl, methacryloyl, vinyl, epoxy and oxetane, or an ethynylene group, R13 is a bivalent organic group including a plurality of ring structures, and R14 is a univalent group including a hydrogen atom, a halogen atom, an alkyl group, an alkoxy group or a carbonate group, or a derivative thereof. In some cases, the formula (2) may be modified to the following formula (2'). Stated another way, the formula (2) involves the formula (2')

$$—R11-R12-R14 \tag{2'}$$

In the first feature of an embodiment, preferably, a compound (compound after alignment processing) obtained by cross-linking the high-molecular compound (compound before alignment processing) includes at least one side chain and a main chain for supporting the side chain with respect to the first substrate, the side chain including a cross-linked portion which is bonded to the main chain and in which a part of the side chain is cross-linked, and a terminal structure portion bonded to the cross-linked portion, and the liquid crystal molecule is given with the pre-tilt by being positioned along the terminal structure portion or caught between the terminal structure portions. In the second feature of an embodiment, preferably, a compound (compound after alignment processing) obtained by deforming the high-molecular compound (compound before alignment processing) includes at least one side chain and a main chain for supporting the side chain with respect to the first substrate, the side chain including a deformed portion which is bonded to the main chain and in which a part of the side chain is deformed, and a terminal structure portion bonded to the deformed portion, and the liquid crystal molecule is given with the pre-tilt by being positioned along the terminal structure portion or caught between the terminal structure portions. In the third feature of an embodiment, preferably, a compound obtained by irradiating the high-molecular compound with the energy ray includes at least one side chain and a main chain for supporting the side chain with respect to the first substrate, the side chain including a cross-linked/deformed portion which is bonded to the main chain and in which a part of the side chain is cross-linked or deformed, and a terminal structure portion bonded to the cross-linked/deformed portion, and the liquid crystal molecule is given with the pre-tilt by being positioned along the terminal structure portion or caught between the terminal structure portions. Be it noted that those arrangements are called respectively a "first formation 1C, second formation 2C, and third formation 3C according to the embodiment" for convenience of explanation. In any of the first formation 1C, the second formation 2C, and the third formation 3C according to the embodiment, the terminal structure portion may contain a mesogenic group. The terminal structure portion corresponds to "R2+R3" in the formula (1), and to "R13+R14" in the formula (2).

In the first feature of an embodiment, preferably, a compound (compound after alignment processing) obtained by cross-linking the high-molecular compound (compound before alignment processing) includes at least one side chain and a main chain for supporting the side chain with respect to the first substrate, the side chain including a cross-linked portion which is bonded to the main chain and in which a part of the side chain is cross-linked, and a terminal structure portion bonded to the cross-linked portion and containing a mesogenic group. Such an arrangement is called a "formation 1D according to the embodiment" for convenience of explanation. Further, in the formation 1D according to the embodiment, the main chain and the cross-linked portion may be covalently bonded to each other, and the cross-linked portion and the terminal structure portion may be covalently bonded to each other. In the second feature of an embodiment, preferably, a compound (compound after alignment processing) obtained by deforming the high-molecular compound (compound before alignment processing) includes at least one side chain and a main chain for supporting the side chain with respect to the first substrate, the side chain including a deformed portion which is bonded to the main chain and in which a part of the side chain is deformed, and a terminal structure portion bonded to the deformed portion and containing a mesogenic group. Such an arrangement is called a "formation 2D according to the embodiment" for convenience of explanation. In the third feature of an embodiment, preferably, a compound (compound after alignment processing) obtained by irradiating the high-molecular compound (compound before alignment processing) with the energy ray includes at least one side chain and a main chain for supporting the side chain with respect to the first substrate, the side chain including a cross-linked/deformed portion which is bonded to the main chain and in which a part of the side chain is cross-linked or deformed and a terminal structure portion bonded to the cross-linked/deformed portion and containing a mesogenic group. Such an arrangement is called a "formation 3D according to the embodiment" for convenience of explanation.

In the first feature according to the embodiment, including the formations 1A to 1D, the side chain (more specifically, the crossed-portion) may contain a photodimerization photosensitive group.

Further, in the first to third features of an embodiment, including the preferred embodiments and arrangements described above, surface roughness Ra of the first alignment film may be 1 nm or less. The surface roughness Ra used herein is defined in conformity with JIS B 0601:2001.

Still further, in the first to third features of an embodiment, including the preferred embodiments and arrangements described above, the second alignment film may be made of the high-molecular compound (compound before alignment processing) constituting the first alignment film, or may have the same composition as that of the first alignment film. However, the second alignment film may be made of a high-molecular compound (compound before alignment processing) differing from the high-molecular compound (compound before alignment processing) constituting the first alignment film as long as the second alignment film is made of the high-molecular compound (compound before alignment processing) according to any of the first to third features of an embodiment.

Still further, in the liquid crystal display device according to the embodiment, including the above-described preferred embodiments and arrangements thereof, or in the method for manufacturing the liquid crystal display device according to any of the first, second and third features of the present application, including the above-described preferred embodiments and arrangements thereof, the first alignment restricting portion may be constituted by a first slit portion formed in the first electrode, the second alignment restricting portion may be constituted by a second slit portion formed in the second electrode, each of the first slit portion and the second slit portion may have a width of 2 µm or more and 10 µm or less, and each of the first slit portion and the second slit portion may have a pitch of 10 µm to 180 µm, preferably 30 µm to 180 µm, and more preferably 60 µm to 180 µm.

In the first to third features of an embodiment, including the preferred embodiments and arrangements described above, the main chain may include an imide bond in a repeated unit. Also, the high-molecular compound (compound after alignment processing) may have a structure capable of aligning the liquid crystal molecules in the predetermined direction with respect to the pair of substrates, namely with respect to not only the first substrate, but also the second substrate. Further, the pair of substrates may be constituted by using the substrate having the pixel electrode and the substrate having the counter electrode, i.e., by employing the substrate having the pixel electrode as the first substrate and the substrate having the counter electrode as the second substrate, respectively, or by employing the substrate having the pixel electrode as the second substrate and the substrate having the counter electrode as the first substrate, respectively.

In the liquid crystal display device and the method for manufacturing the same according to the embodiment, the expression "the central region of the overlapped region" implies a region which has a center in match with that of the overlapped region, which has a shape similar to that of the overlapped region, and which occupies an area of 25% of that of the overlapped region. Further, the expression "the major axes of a group of liquid crystal molecules in the liquid crystal layer being positioned substantially in the same imaginary plane" implies that angles formed by the imaginary plane and the major axes of the group of liquid crystal molecules are within ±5°. In other words, a variation of azimuth angles (deviation angles) of the group of liquid crystal molecules is within ±5°. When each pixel is made up of plural sub-pixels, the above description is similarly applied to each of the sub-pixels by regarding the pixel as the sub-pixel.

The angles formed by the imaginary plane and the major axes of the group of liquid crystal molecules, or a variation of azimuth angles (deviation angles) of the group of liquid crystal molecules can be measured, for example, by the vibration-attenuated total reflection method (also called the attenuated total reflection method) or the phase difference measurement method. The vibration-attenuated total reflection method is a method for measuring an absorption spectrum of a sample surface. In more detail, a sample is held in close contact with a medium having a high refractive index (i.e., a prism), and light being totally reflected after slightly exuding from the prism into the sample is measured. Information of absorption (direction of alignment) of molecules near about 100 nm with respect to the interface (between the liquid crystal and the alignment film) is obtained by rotating the azimuth of the sample. The phase difference measurement method is performed by using RETS100 (made by OTSUKA ELECTRONICS CO., LTD.) as follows. A phase difference is measured in a state where a liquid crystal cell is inclined at a desired angle, to thereby previously obtain the phase difference in an ideally aligned state on condition that the pre-tilt is given. Then, the actual pre-tilt is determined through fitting. Further, the azimuth angle at which the pre-tilt is given can be determined by rotating the sample in a sample plane.

With the liquid crystal display device and the method for manufacturing the same according to the embodiment, in each pixel, the major axes of the group of liquid crystal molecules in the liquid crystal layer are positioned substantially in the same imaginary plane in the central region of the overlapped region where the projected image of the region surrounded by the edges of the first electrode and two first alignment restricting portions overlaps with the projected image of the region surrounded by the edges of the second electrode and two second alignment restricting portions. In other words, a variation of azimuth angles (deviation angles) of the group of liquid crystal molecules in the liquid crystal layer is within ±5°. Thus, in the central region of the overlapped region, the group of liquid crystal molecules in the liquid crystal layer is oriented such that the major axes of the group of liquid crystal molecules are not in the state twisted from the one electrode side toward the other electrode side. Therefore, when a voltage is applied between the pair of electrodes, the major axes of the group of liquid crystal molecules do not take a time to release from the twisted state, and they can respond to the applied voltage in the same plane. As a result, a response characteristic can be further improved.

With the liquid crystal display device according to the first feature of an embodiment, the first alignment film, i.e., at least one of the pair of alignment films, contains the compound obtained by cross-linking the high-molecule compound having the cross-linkable functional group or the polymerizable functional group in at least one side chain thereof, and the pre-tilt is given to the liquid crystal molecule by the cross-linked compound. Therefore, when an electric field is applied between the pixel electrode and the counter electrode, the major axes of the liquid crystal molecules are caused to responsively orient in the predetermined direction with respect to the substrate surface, and satisfactory display characteristics are ensured. Moreover, since the pre-tilt is given to the liquid crystal molecule by the cross-linked compound, a response speed to the electric field applied between the electrodes is increased in comparison with the case where the pre-tilt is not given to the liquid crystal molecule, and satisfactory display characteristics can be more easily maintained than the case where the pre-tilt is given to the liquid crystal molecule without using the cross-linked compound.

With the method for manufacturing the liquid crystal display device according to the first feature of an embodiment, after forming the first alignment film that contains the high-molecule compound having the cross-linkable functional group or the polymerizable functional group in at least one side chain thereof, the liquid crystal layer is formed in the sealed-off state between the first alignment film and the second alignment film. At that time, the liquid crystal molecules in the liquid crystal layer are in such a state that, by the first alignment film and the second alignment film, the liquid crystal molecules are entirely aligned (arrayed) in a predetermined direction (e.g., in a horizontal direction, a vertical direction, or an oblique direction) with respect to the first alignment film and the second alignment film. The high-molecule compound is then cross-linked by causing the cross-linkable functional group or the polymerizable functional group to develop a reaction while the electric field is applied. As a result, the pre-tilt can be given to the liquid crystal molecule near the cross-linked compound. In other words, by cross-linking the high-molecule compound in the state where the liquid crystal molecules are aligned, the pre-tilt can be given to the liquid crystal molecules without irradiating the alignment films with the linearly-polarized light or the oblique incident light before forming the liquid crystal layer in the sealed-off state, and without using the elaborate apparatus. Thus, the response speed can be increased in comparison with the case where the pre-tilt is not given to the liquid crystal molecules.

With the liquid crystal display device according to the second feature of an embodiment, the first alignment film, i.e., at least one of the pair of alignment films, contains the compound obtained by deforming the high-molecule compound having the photosensitive functional group in at least one side chain thereof, and the pre-tilt is given to the liquid crystal molecule by the deformed compound. Therefore, when an electric field is applied between the pixel electrode and the counter electrode, the major axes of the liquid crystal molecules are caused to responsively orient in the predetermined direction with respect to the substrate surface, and satisfactory display characteristics are ensured. Moreover, since the pre-tilt is given to the liquid crystal molecule by the deformed compound, the response speed to the electric field applied between the electrodes is increased in comparison with the case where the pre-tilt is not given to the liquid crystal molecule, and satisfactory display characteristics can be more easily maintained than the case where the pre-tilt is given to the liquid crystal molecule without using the deformed compound.

With the method for manufacturing the liquid crystal display device according to the second feature of an embodiment, after forming the first alignment film that contains the high-molecule compound having the photosensitive functional group in at least one side chain thereof, the liquid crystal layer is formed in the sealed-off state between the first alignment film and the second alignment film. At that time, the liquid crystal molecules in the liquid crystal layer are in such a state that, by the first alignment film and the second alignment film, the liquid crystal molecules are entirely aligned (arrayed) in a predetermined direction (e.g., in a horizontal direction, a vertical direction, or an oblique direction) with respect to the first alignment film and the second alignment film. The high-molecule compound is then deformed while the electric field is applied. As a result, the pre-tilt can be given to the liquid crystal molecule near the deformed compound. In other words, by deforming the high-molecule compound in the state where the liquid crystal molecules are aligned, the pre-tilt can be given to the liquid crystal molecules without irradiating the alignment films with the linearly-polarized light or the oblique incident light before forming the liquid crystal layer in the sealed-off state, and without using the elaborate apparatus. Thus, the response speed can be increased in comparison with the case where the pre-tilt is not given to the liquid crystal molecules.

With the method for manufacturing the liquid crystal display device according to the third feature of an embodiment, the pre-tilt is given to the liquid crystal molecule by irradiating the high-molecule compound (compound before alignment processing) with the energy ray. In other words, by cross-linking or deforming the side chain of the high-molecule compound in the state where the liquid crystal molecules are aligned, the pre-tilt can be given to the liquid crystal molecules without irradiating the alignment films with the linearly-polarized light or the oblique incident light before forming the liquid crystal layer in the sealed-off state, and without using the elaborate apparatus. Thus, the response speed can be increased in comparison with the case where the pre-tilt is not given to the liquid crystal molecules.

Additional features and advantages are described herein, and will be apparent from the following Detailed Description and the figures.

BRIEF DESCRIPTION OF THE FIGURES

FIG. 1 is a schematic partial sectional view of a liquid crystal display device representing embodiments of an embodiment;

FIGS. 5A and 5B are illustrations to explain a twisted state of the major axes of a group of liquid crystal molecules;

FIG. 6 is an illustration to explain a pre-tilt of a liquid crystal molecule;

FIGS. 26A and 26B illustrate electrode structures used when simulating the state where the major axes of the group of liquid crystal molecules are released from the twisted state when the voltage is applied between a pair of electrodes in the liquid crystal display of the VA mode.

DETAILED DESCRIPTION

Figure 2A:
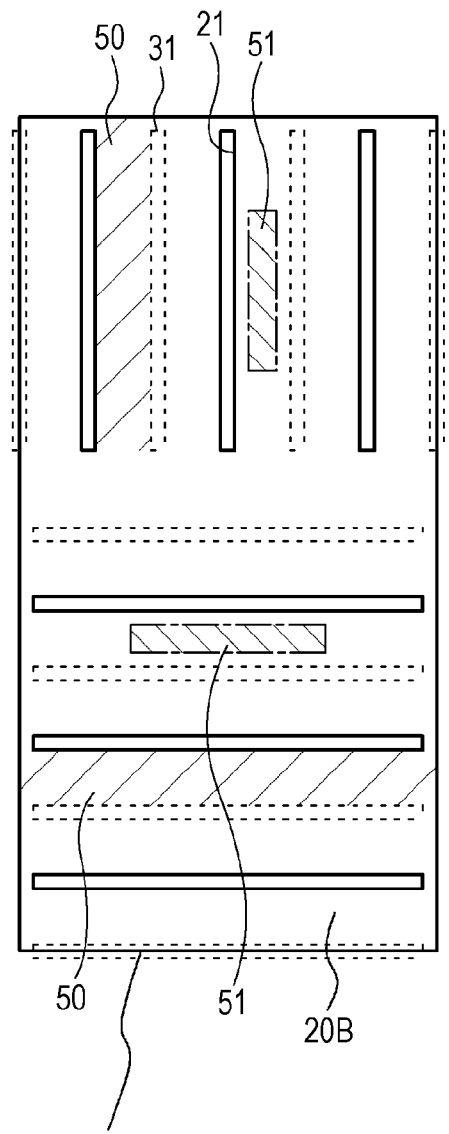
FIG. 2A is a schematic view of a first electrode, first slit portions, a second electrode, and second slit portions when one pixel is viewed from above.

Embodiments of the present application will be described below in detail with reference to the drawings.

It is, however, to be noted that the present application is not limited to the following embodiments and EXAMPLES, and that various numerical values and materials set forth in the following embodiments and EXAMPLES are intended to be merely illustrative. The description is made in the order given below:

1. Construction and structure common to liquid crystal display devices according to the embodiments 2. Liquid crystal display devices and methods for manufacturing the same according to first to fifth embodiments 3. Liquid crystal display devices and methods for manufacturing the same in connection with EXAMPLES of the embodiments Construction and structure common to liquid crystal display devices according to the embodiments FIG. 1 is a schematic partial sectional view of each of liquid crystal display devices (or liquid crystal display elements) according to the first to third features of an embodiment. The liquid crystal display device includes a plurality of pixels 10 (10A, 10B, 10C, etc.). In the liquid crystal display device (liquid crystal display element), a liquid crystal layer 40 including liquid crystal molecules 41 (41A, 41B, 41C, etc.) is formed between a TFT (Thin Film Transistor) substrate 20 and a CF (Color Filter) substrate 30 with alignment films 22, 23 disposed respectively on opposing surfaces of both the substrates. The liquid crystal display device (liquid crystal display element) is of the so-called transmissive type and a display mode is the Vertical Alignment (VA) mode. FIG. 1 illustrates a non-driven state where a drive voltage is not applied. Each pixel 10 is actually made up of plural sub-pixels, such as a sub-pixel displaying a red image, a sub-pixel displaying a green image, and a sub-pixel displaying a blue image.

Herein, the TFT substrate 20 corresponds to a first substrate, and the CF substrate 30 corresponds to a second substrate. Further, a pixel electrode 20B and the alignment film 22 both disposed on the first substrate (TFT substrate) 20 correspond respectively to a first electrode and a first alignment film, and a counter electrode 30B and the alignment film 32 both disposed on the second substrate (CF substrate) 30 correspond respectively to a second electrode and a second alignment film.

More specifically, the liquid crystal display device includes an array of plural pixels each including:
the first substrate (TFT substrate) 20 and the second substrate (CF substrate) 30,
the first electrode (pixel electrode) 20B formed on an opposing surface of the first substrate 20, which surface is positioned opposite to the second substrate 30,
a first alignment restricting portion 21 provided in the first electrode (pixel electrode) 20B, the first alignment film 22 covering the first electrode (pixel electrode) 20B, the first alignment restricting portion 21, and the opposing surface of the first substrate (TFT substrate) 20, the second electrode (counter electrode) 30B formed on an opposing surface of the second substrate (CF substrate) 30, which surface is positioned opposite to the first substrate (TFT substrate) 20, a second alignment restricting portion 31 provided in the second electrode (counter electrode) 30B, the second alignment film 32 covering the second electrode (counter electrode) 30B, the second alignment restricting portion 31, and the opposing surface of the second substrate (CF substrate) 30, and the liquid crystal layer 40 including the liquid crystal molecules 41 and formed between the first alignment film 22 and the second alignment film 32.

The plural pixel electrodes 20B are formed in a matrix pattern, for example, on the opposing surface of the TFT substrate 20 made of a glass substrate, which is positioned opposite to the CF substrate 30 made of a glass substrate. Further, on the opposing surface of the TFT substrate 20, there are disposed TFT switching elements which include gates, sources, drains, etc. for driving the plural pixel electrodes 20B, respectively, and gate lines and source lines (both not shown) connected to the TFT switching elements. The pixel electrode 20B is disposed for each of the pixels, which are electrically separated by a pixel separating portion 52, and is made of a material having transparency, such as ITO (Indium Tin Oxide). The pixel electrode 20B includes first slit portions 21 (i.e., portions where no electrodes are formed) having, e.g., a striped pattern or a V-shaped pattern, which are formed within each pixel. With such an arrangement, when a drive voltage is applied, an electric field is obliquely imposed on the major axes of the liquid crystal molecules 41 to form, in each pixel, regions where the liquid crystal molecules are aligned in different directions (i.e., alignment division). As a result, a viewing angle characteristic is improved. In other words, the first slit portions 21 serve as the first alignment restricting portions for restricting the entire alignment of the liquid crystal molecules 41 in the liquid crystal layer 40 in order to ensure excellent display characteristics. Thus, the first slit portions 21 restrict the alignment direction of the liquid crystal molecules 41 when the drive voltage is applied. Basically, as described above, the azimuth angle of the liquid crystal molecule when a pre-tilt is given is specified depending on the intensity and the direction of the electric field and the molecular structure of the material of the alignment film, while the direction of the electric field is determined by the alignment restricting portions.

On the opposing surface of the CF substrate 30 which is positioned opposite to the TFT substrate 20, a color filter (not shown) made up of striped filters in red (R), green (G) and blue (B), for example, and the counter electrodes 30B are arranged substantially over an entire effective display region. As with the pixel electrode 20B, the counter electrode 30B is made of a material having transparency, such as ITO. The counter electrode 30B includes second slit portions 31 (i.e., portions where no electrodes are formed) having, e.g., a striped pattern or a V-shaped pattern, which are formed in each pixel. With such an arrangement, when a drive voltage is applied, an electric field is obliquely imposed on the major axes of the liquid crystal molecules 41 to form, in each pixel, regions where the liquid crystal molecules are aligned in different directions (i.e., alignment division). As a result, the viewing angle characteristic is improved. In other words, the second slit portions 31 serve as the second alignment restricting portions for restricting the entire alignment of the liquid crystal molecules 41 in the liquid crystal layer 40 in order to ensure excellent display characteristics. Thus, the second slit portions 31 also restrict the alignment direction of the liquid crystal molecules 41 when the drive voltage is applied. Basically, as described above, the azimuth angle of the liquid crystal molecule when a pre-tilt is given is specified depending on the intensity and the direction of the electric field and the molecular structure of the material of the alignment film, while the direction of the electric field is determined by the alignment restricting portions.

Figure 2B:
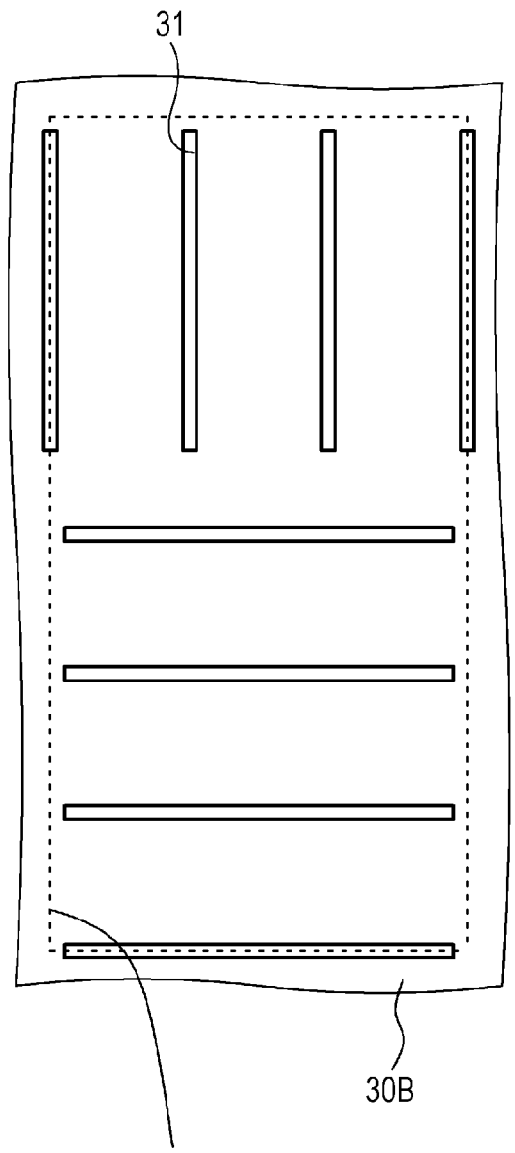
FIG. 2B is a schematic view of the second electrode and the second slit portions when one pixel is viewed from above.
Figure 3A:
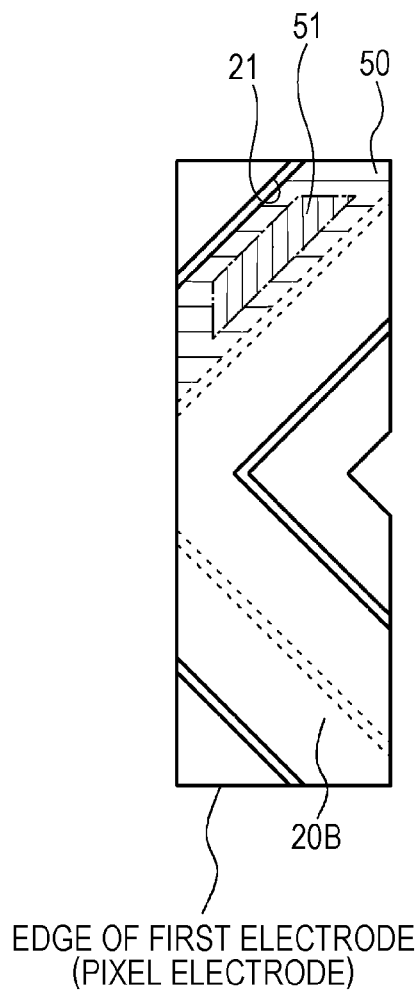
FIG. 3A is a schematic view illustrating a modification of the first electrode, the first slit portions, the second electrode, and the second slit portions when one pixel is viewed from above.
Figure 3B:
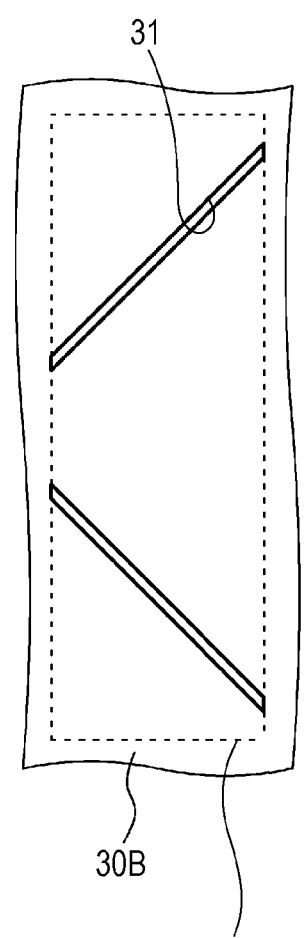
FIG. 3B is a schematic view illustrating a modification of the second electrode and the second slit portions when one pixel is viewed from above.
Figure 4A:
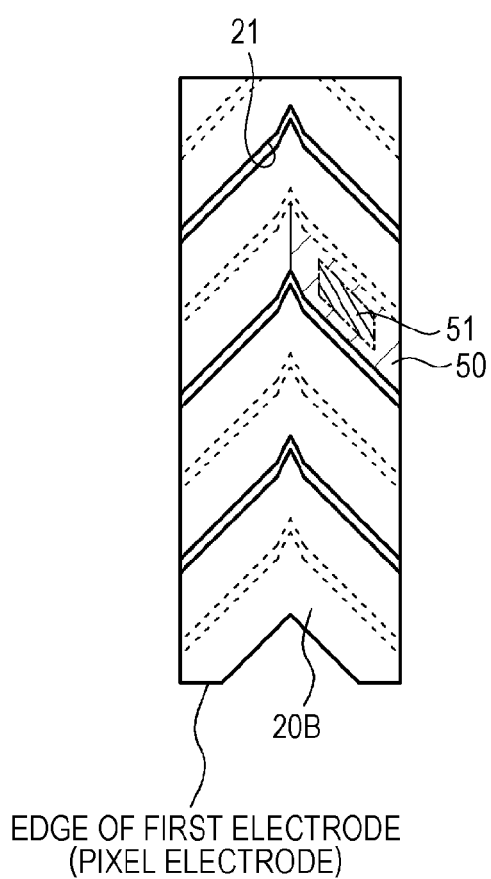
FIG. 4A is a schematic view illustrating another modification of the first electrode, the first slit portions, the second electrode, and the second slit portions when one pixel is viewed from above.
Figure 4B:
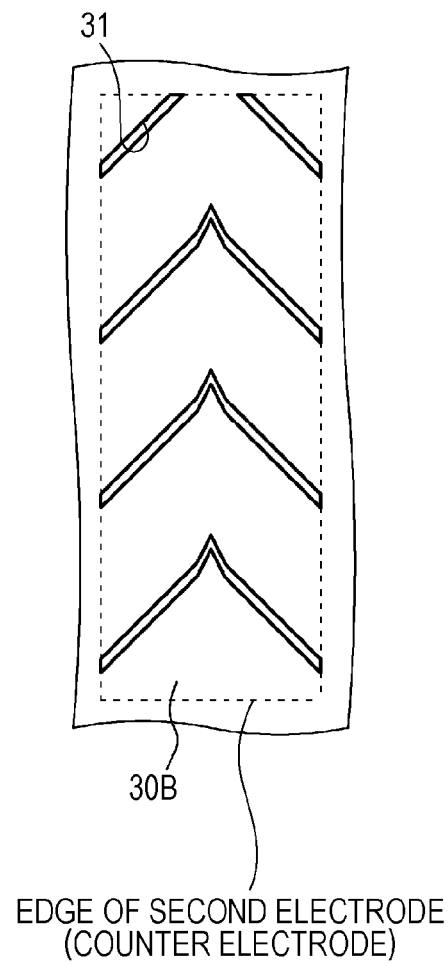
FIG. 4B is a schematic view illustrating another modification of the second electrode and the second slit portions when one pixel is viewed from above.

The second slit portions 31 are arranged so as not to perpendicularly face the first slit portions 21 between the two substrates. In more detail, the plural first slit portions 21 are arranged parallel to each other, and the second slit portions 31 are also arranged parallel to each other. Further, in each pixel, the plural first slit portions 21 are extended in two directions orthogonal to each other, and the plural second slit portions 31 are also extended in two directions orthogonal to each other. Moreover, the first slit portions 21 are extended parallel to the second slit portions 31 that are positioned opposite to face the first slit portions 21. A projected image of each first slit portion 21 is positioned on a projected image of a symmetry line about which two second slit portions 31 are symmetric, and a projected image of each second slit portion 31 is positioned on a projected image of a symmetry line about which two first slit portions 21 are symmetric. FIG. 2A illustrates the layout of the first electrode (pixel electrode) 20B and the first slit portions 21 and the layout of the second electrode (counter electrode) 30B and the second slit portions 31 when one pixel (or one sub-pixel) is viewed from above, and FIG. 2B illustrates the layout of the second electrode (counter electrode) 30B and the second slit portions 31 when one pixel (or one sub-pixel) is viewed from above. FIGS. 3A and 3B and FIGS. 4A and 4B illustrate modified configurations of the first slit portions 21 and the second slit portions 31. In FIGS. 2A, 3A and 4A, an edge of the first electrode (pixel electrode) 20B and the first alignment restricting portions (first slit portions 21) are indicated by solid lines, and the second alignment restricting portions (second slit portions 31) positioned above the formers are indicated by dotted lines. Further, an overlapped region 50 where a projected image of a region surrounded by the edges of the first electrode (pixel electrode) 20B and the two first alignment restricting portions (first slit portions 21) overlaps with a projected image of a region surrounded by the edges of the second electrode (counter electrode) 30B and the two second alignment restricting portions (second slit portions 31) is indicated by hatching. In addition, a central region 51 of the overlapped region 50 is surrounded by a one-dot-chain line and is indicated by hatching. For simplicity of the drawings, the overlapped region 50 and the central region 51 are each illustrated at only one location. In FIGS. 2B, 3B and 4B, an edge of the second electrode (pixel electrode) 30B in each pixel is indicated by a dotted line, and the second alignment restricting portions (second slit portions 31) in each pixel are indicated by solid lines. Be it noted that the configurations of the first alignment restricting portions (first slit portions 21) may be replaced with those of the second alignment restricting portions (second slit portions 31), and the configurations of the second alignment restricting portions (second slit portions 31) may be replaced with those of the first alignment restricting portions (first slit portions 21).

The first alignment film 22 is formed on the surface of the TFT substrate 20 on the side facing the liquid crystal layer 40 to cover the pixel electrode 20B and the first slit portions 21. The second alignment film 32 is formed on the surface of the CF substrate 30 on the side facing the liquid crystal layer 40 to cover the counter electrode 30B. The alignment films 22 and 32 serve to restrict the alignment of the liquid crystal molecules 41. Herein, the alignment films 22 and 32 have the function of not only aligning the liquid crystal molecules 41 in the direction perpendicular to the substrate surface, but also applying a pre-tilt to the liquid crystal molecules 41 (41A and 41B), which are present near the substrates.

In more detail, each of the first slit portions 21 and each of the second slit portions 31 have widths of 5 μm and 5 μm, respectively, and the first slit portions 21 and the second slit portions 31 are arranged at pitches of 113 μm and 113 μm, respectively.

Further, in each pixel (sub-pixel), the major axes of a group of liquid crystal molecules in the liquid crystal layer 40 are positioned substantially in the same imaginary plane in the central region 51 of the overlapped regions 50 where each projected image of the region surrounded by the edges of the first electrode (pixel electrode) 20B and the two first alignment restricting portions (first slit portions 21) overlaps with each projected image of the region surrounded by the edges of the second electrode (counter electrode) 30B and the two second alignment restricting portions (second slit portions 31). In other words, a variation of azimuth angles of the group of liquid crystal molecules in the liquid crystal layer 40 is within ±5°.

Figure 13:
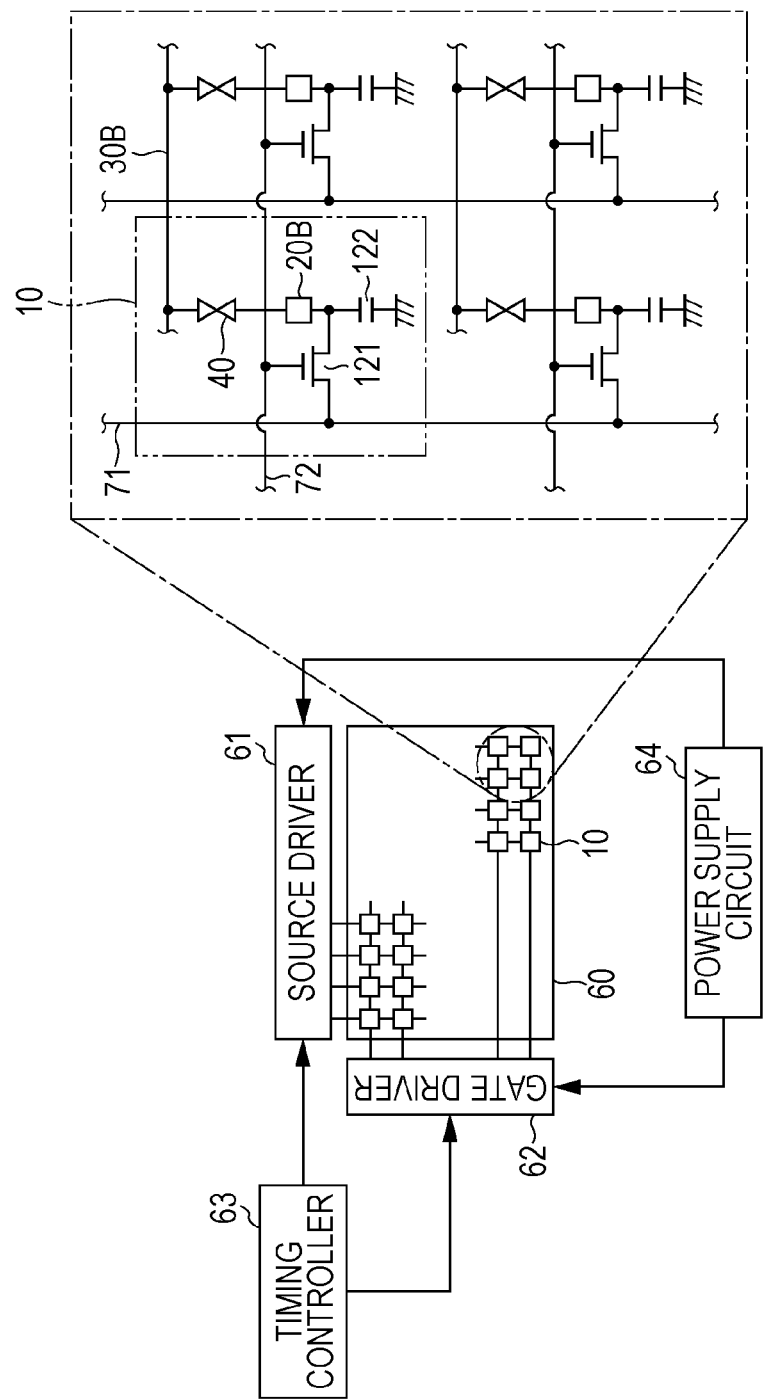
FIG. 13 is a circuit diagram of the liquid crystal display device illustrated in FIG. 1.

FIG. 13 is a circuit diagram of the liquid crystal display device illustrated in FIG. 1.

As illustrated in FIG. 13, the liquid crystal display device includes a liquid crystal display element having the plural pixels 10 that are arranged in a display region 60. In the illustrated liquid crystal display device, a source driver 61, a gate driver 62, a timing controller 63 for controlling the source driver 61 and the gate driver 62, and a power supply circuit 64 for supplying electric power to the source driver 61 and the gate driver 62 are disposed around the display region 60.

The display region 60 is a region where an image is displayed. Thus, the display region 60 provides a region where the plural pixels 10 are arrayed in a matrix pattern such that an image can be displayed. FIG. 13 illustrates not only the display region 60 including the array of plural pixels 10, but also, in enlarged scale, a part of the display region 60 corresponding to just four pixels 10.

In the display region 60, a plurality of source lines 71 are arranged side by side in the row direction, and a plurality of gate lines 72 are arranged side by side in the column direction. The pixels 10 are arranged in one-to-one relation to positions where the source lines 71 intersect the gate lines 72. Each of the pixels 10 includes, in addition to the pixel electrode 20B and the liquid crystal layer 40, a transistor 121 and a capacitor 122. In each transistor 121, a source electrode is connected to the source line 71, a gate electrode is connected to the gate line 72, and a drain electrode is connected to the capacitor 122 and the pixel electrode 20B. Each source line 71 is connected to the source driver 61, and an image signal is supplied from the source driver 61. Each gate line 72 is connected to the gate driver 62, and a scanning signal is successively supplied from the gate driver 62.

The source driver 61 and the gate driver 62 select particular one from among the plural pixels 10.

The timing controller 63 outputs, to the source driver 61, an image signal (e.g., each of RGB image signals corresponding to red, green, and blue), and a source driver control signal for controlling the operation of the source driver 61. Further, the timing controller 63 outputs, to the gate driver 62, a gate driver control signal for controlling the operation of the gate driver 62. The source driver control signal includes, e.g., a horizontal synchronizing signal, a start pulse signal, and a clock signal for the source driver 61. The gate driver control signal includes, e.g., a vertical synchronizing signal and a clock signal for the gate driver 62.

In the illustrated liquid crystal display device, an image is displayed by applying a drive voltage between the first electrode (pixel electrode) 20B and the second electrode (counter electrode) 30B as follows. The source driver 61 supplies individual image signals to the predetermined source lines 71 in accordance with an image signal entered from the timing controller 63 in response to inputting of the source driver control signal from the timing controller 63. In parallel, the gate driver 62 successively supplies a scanning signal to each of the gate lines 72 at the predetermined timing in response to inputting of the gate driver control signal from the timing controller 63. As a result, the pixel 10 positioned at a point where the source line 71 supplied with the image signal intersects the gate line 72 supplied with the scanning signal is selected, and the drive voltage is applied to the pixel 10.

The present application will be described below in connection with the first to fifth embodiments and EXAMPLES of an embodiment.

First Embodiment

The first embodiment concerns with a liquid crystal display device (or a liquid crystal display element) of the VA mode according to the first feature of an embodiment and a method for manufacturing the liquid crystal display device (or the liquid crystal display element) according to each of the first and third features of an embodiment. In the first embodiment, each of the first alignment film and the second alignment film (i.e., the alignment films 22 and 32) includes one or more types of high-molecular compounds (compounds after alignment processing) each having a cross-linked structure in a side chain. A pre-tilt is given to the liquid crystal molecule by the cross-linked compound. The compounds after alignment processing are produced by forming the alignment films 22 and 32 in the state containing one or more types of high-molecular compounds (compounds before alignment processing) having main chains and side chains, forming the liquid crystal layer 40, and by cross-linking the high-molecular compounds or irradiating the high-molecular compounds with an energy ray, more specifically, by causing cross-linkable functional groups or polymerizable functional groups contained in the side chains to react under application of an electric field or a magnetic field. The compounds after alignment processing include structures enabling the liquid crystal molecules to be aligned in a predetermined direction (specifically, in an oblique direction) with respect to a pair of substrates (specifically, the TFT substrate 20 and the CF substrate 30). Thus, by cross-linking the high-molecular compounds or irradiating the high-molecular compounds with an energy ray, the compounds after alignment processing are contained in the alignment films 22 and 32, whereby the pre-tilt can be given to the liquid crystal molecules 41 near the alignment films 22 and 32. As a result, a response speed is increased and display characteristics are improved.

Further, in the central region 51 of the overlapped region 50, the group of liquid crystal molecules in the liquid crystal layer 40 is not in the twisted state. Therefore, when the voltage is applied between the pair of electrodes 20B and 30B, the major axes of the group of liquid crystal molecules do not take a time to release from the twisted state, and the response characteristic can be further improved.

The compound before alignment processing preferably has a highly heat-resistant structure as the main chain. With such a property, even when the liquid crystal display device (or the liquid crystal display element) is exposed to environments at high temperatures, the compounds after alignment processing, which are contained in the alignment films 22 and 32, can maintain the ability of restricting the alignment of the liquid crystal molecules 41. Therefore, the response characteristic and the display characteristics, such as contrast, can be both maintained at a satisfactory level, and reliability is ensured. The main chain preferably contains an imide bond in a repeated unit. One example of the compound before alignment processing, which contains the imide bond in the main chain, is a high-molecular compound having a polyimide structure expressed by the following formula (3). The high-molecular compound having the polyimide structure expressed by the following formula (3) may be made of one type of the polyimide structure selected from among those expressed by the following formula (3), or it may include plural types of the polyimide structures that are coupled at random. Further, the high-molecular compound may include other one or more structures in addition to the polyimide structure(s) expressed by the following formula (3).

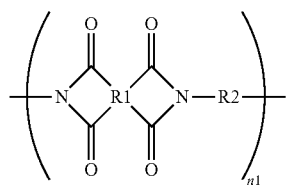

(3)

where R1 is a tetravalent organic group, R2 is a bivalent organic group, and n1 is one ore more integer.

R1 and R2 in the formula (3) are arbitrary as long as they are each a tetravalent or bivalent group containing carbon. It is, however, preferable that at least one of R1 and R2 contains a cross-linkable functional group or a polymerizable functional group in a side chain. This enables the compound after alignment processing to easily have the alignment restricting ability at a sufficient level.

In the compound before alignment processing, it is just necessary that plural side chains are bonded to a main chain and at least one of the plural side chains contains the cross-linkable functional group or the polymerizable functional group. In other words, the compound before alignment processing may include a side chain having no cross-linking ability in addition to the side chain having the cross-linking ability. The side chain containing the cross-linkable functional group or the polymerizable functional group may be one type or plural types. The cross-linkable functional group or the polymerizable functional group is arbitrary as long as it is a functional group capable of developing a cross-linking reaction after the liquid crystal layer 40 has been formed. More specifically, the cross-linkable functional group or the polymerizable functional group may be a group that forms a cross-linked structure by a photoreaction, or a group that forms a cross-linked structure by a thermal reaction. Among those examples, however, it is preferably a photo-reactive cross-linkable functional group or polymerizable functional group (i.e., a photosensitive group having photosensitivity), which forms a cross-linked structure by a photoreaction. That type of group can easily restrict the alignment of the liquid crystal molecules 41 in the predetermined direction and can facilitate manufacturing of the liquid crystal display device (or the liquid crystal display element), which has the improved response characteristic and the satisfactory display characteristics.

The photo-reactive cross-linkable functional group (i.e., the photosensitive group having photosensitivity, such as a photodimerization photosensitive group) is, for example, a group including one type of structure selected from among those represented by chalcone, cinnamate, cinnamoyl, coumarin, maleimide, benzophenone, norbornene, orizanol, and chitosan. Of those examples, the group including the structure of chalcone, cinnamate or cinnamoyl is, e.g., a group expressed by the following formula (41). When the compound before alignment processing, which has the side chain containing the group expressed by the formula (41), is cross-linked, a structure expressed by the following formula (42) is formed, for example. Thus, the compound after alignment processing, which has been produced from the high-molecular compound containing the group expressed by the formula (41), includes the structure having a cyclobutane skeleton expressed by the formula (42). Some of photo-reactive cross-linkable functional groups, e.g., maleimide, exhibit not only a photodimerization reaction, but also a polymerization reaction. For that reason, the expression such as "compound produced by cross-linking of the high-molecular compound having the cross-linkable functional group or the polymerizable functional group" is used here.

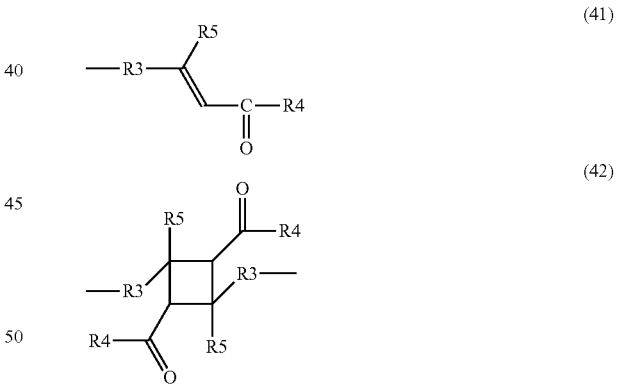

where R3 is a bivalent group including an aromatic ring, R4 is a univalent group including one or more ring structures, R5 is a hydrogen atom, an alkyl group or a derivative thereof.

R3 in the formula (41) is arbitrary as long as it is a bivalent group including an aromatic ring, e.g., a benzene ring. R3 may include, in addition to an aromatic ring, a carbonyl group, an ether bond, an ester bond, or a hydrocarbon group. Further, R4 in the formula (41) is arbitrary as long as it is a univalent group including one or more ring structures. R4 may include, in addition to a ring structure, a carbonyl group, an ether bond, an ester bond, a hydrocarbon group, or a halogen atom. The ring structure included in R4 is arbitrary as long as the structure is a ring containing carbon as an element that constitutes a skeleton. Examples of the ring structure include an aromatic ring, a heterocyclic ring, an aliphatic ring, and ring structures produced with coupling or condensation of those rings. R5 in the formula (41) is arbitrary as long as it is a hydrogen atom, an alkyl group or a derivative thereof. Herein, the term "derivative" implies a group in which part or all of hydrogen atoms contained in an alkyl group is substituted by a substituent, e.g., a halogen atom. In addition, the carbon number of the alkyl group introduced as R5 is arbitrary. R5 is preferably a hydrogen atom or a methyl group. The reason is that such R5 is effective in providing cross-linking reactivity at a satisfactory level.

Two R3 groups in the formula (42) may be the same or differ from each other. This is similarly applied to two R4 groups and two R5 groups in the formula (42). Examples of R3, R4 and R5 in the formula (42) are similar to those mentioned above regarding R3, R4 and R5 in the formula (41).

Examples of the group expressed by the formula (41) include groups expressed by the following formulae (41-1) to (41-33). However, as long as the group has the structure expressed by the formula (41), it is not limited to the examples expressed by the following formulae (41-1) to (41-33).

(41-1)
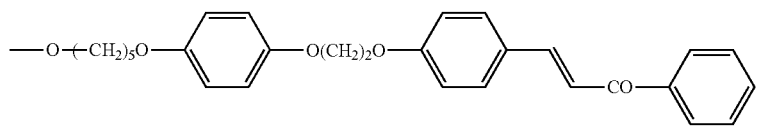

(41-2)
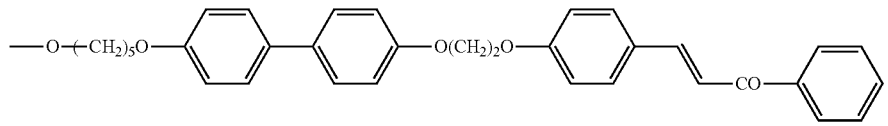

(41-3)
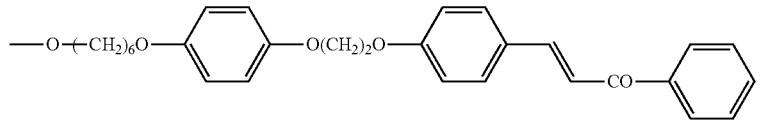

(41-4)
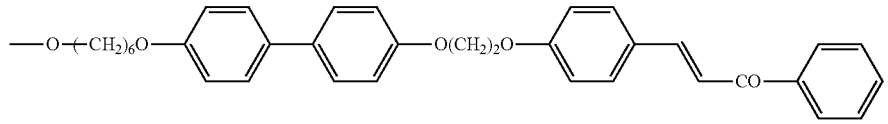

(41-5)
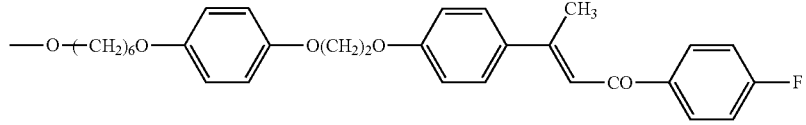

(41-6)
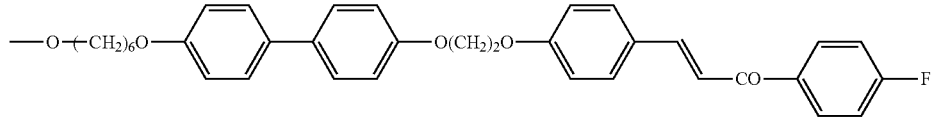

(41-7)
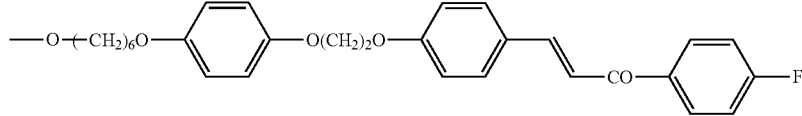

(41-8)
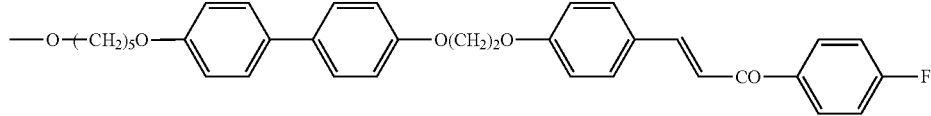

(41-9)
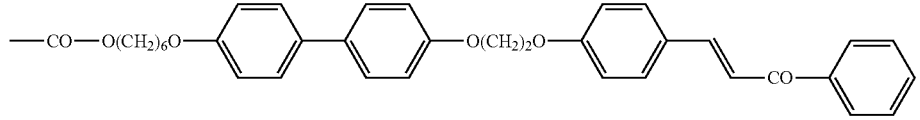

-continued
(41-10)
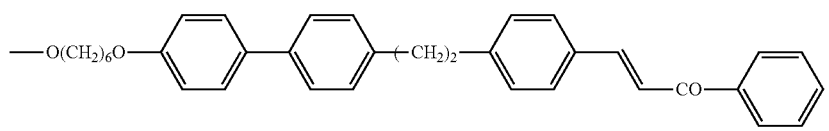
(41-11)
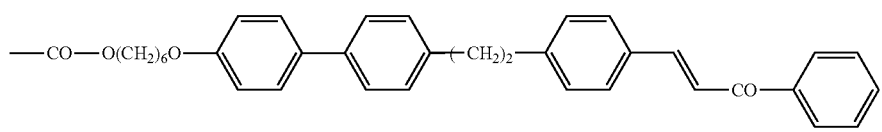
(41-12)
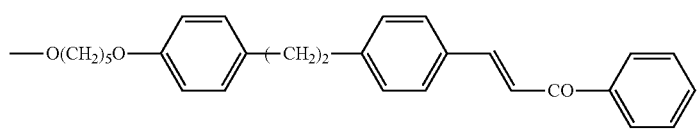
(41-13)
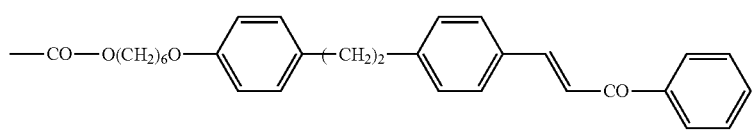
(41-14)
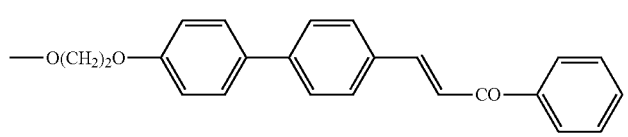
(41-15)
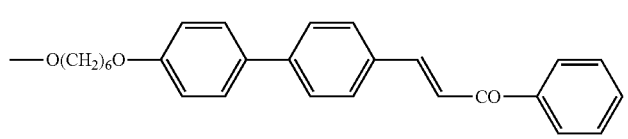
(41-16)
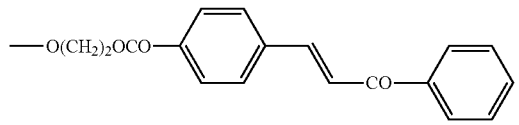
(41-17)
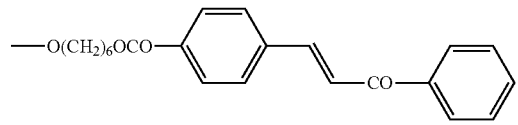
(41-18)
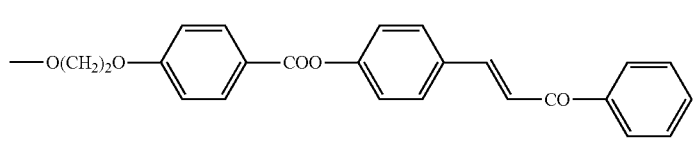
(41-19)
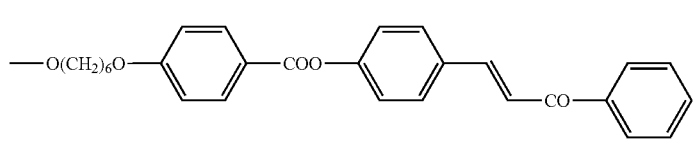
(41-20)
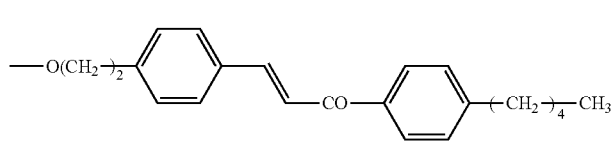

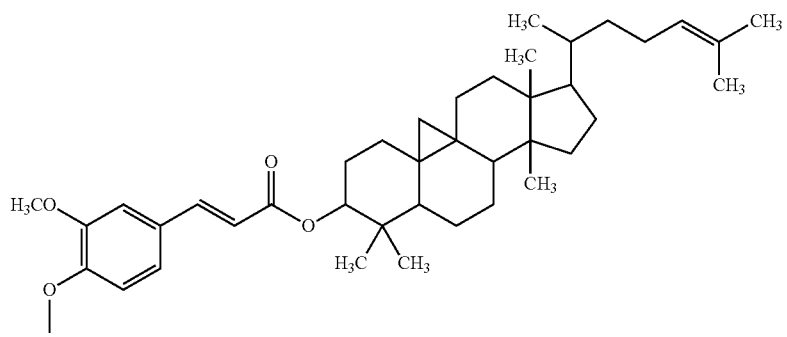
(41-21)
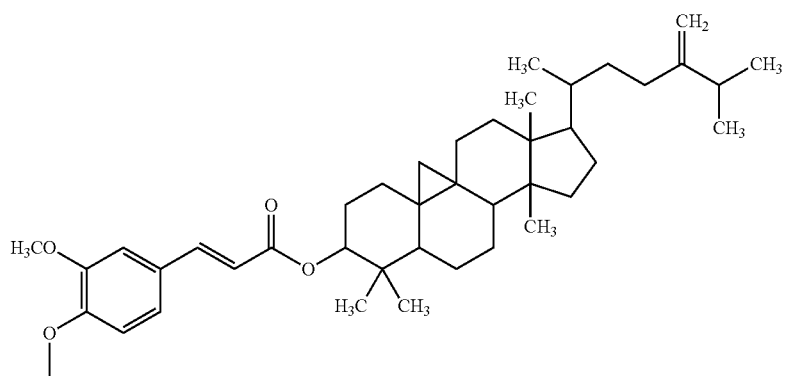
(41-22)
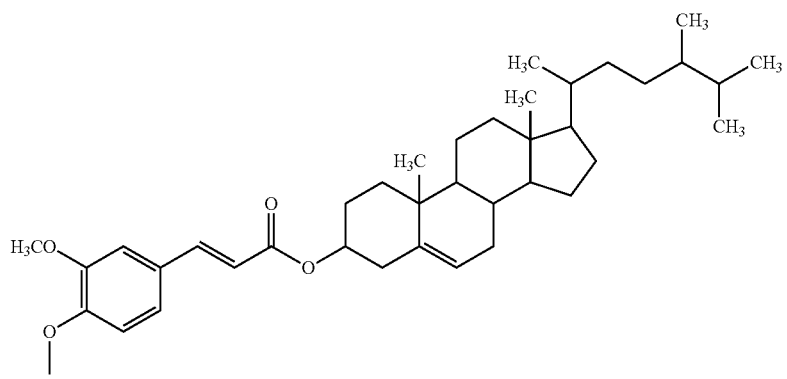
(41-23)
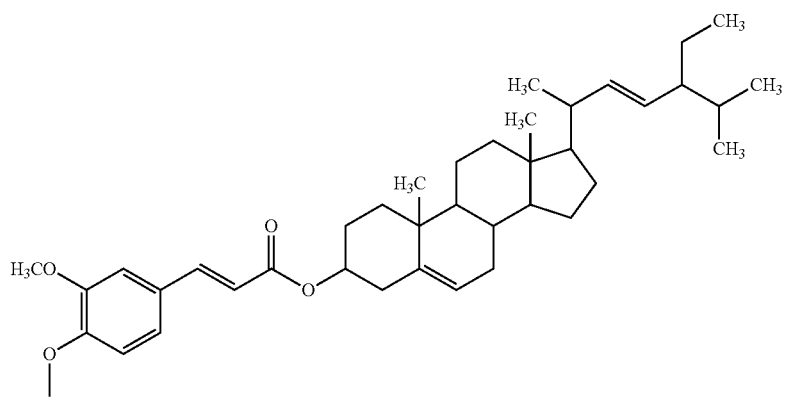
(41-24)

-continued
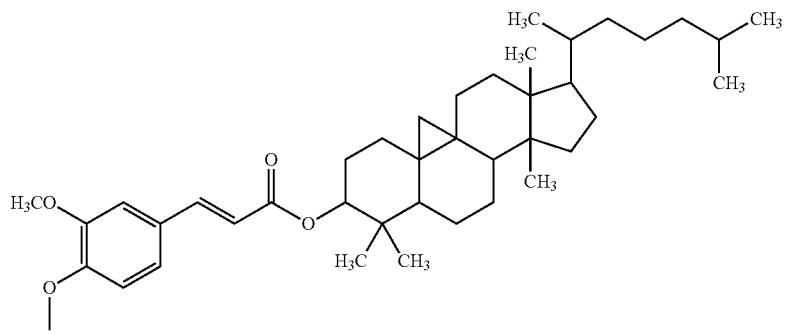
(41-25)
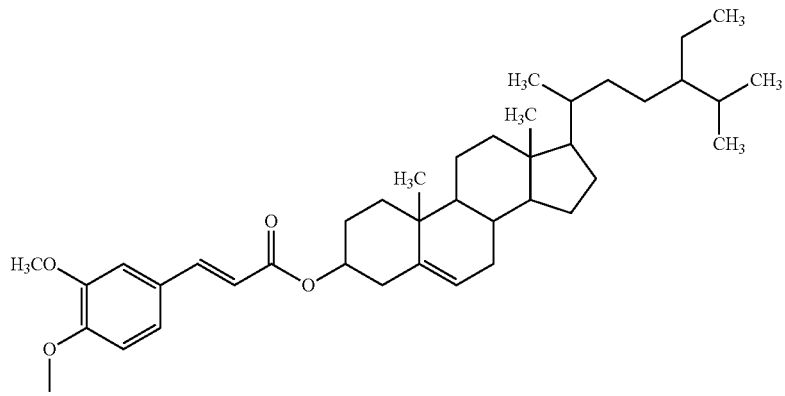
(41-26)
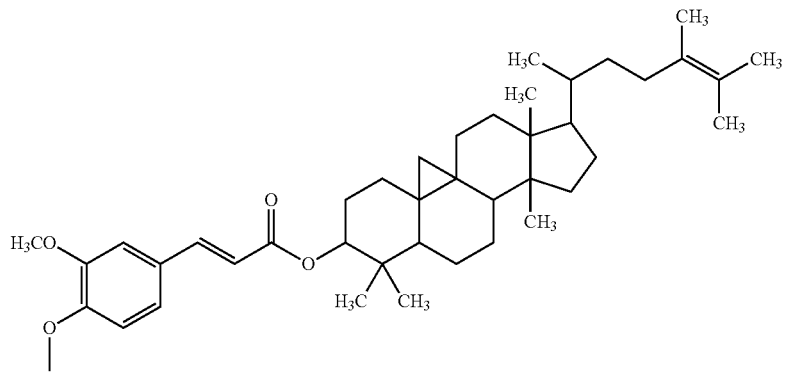
(41-27)
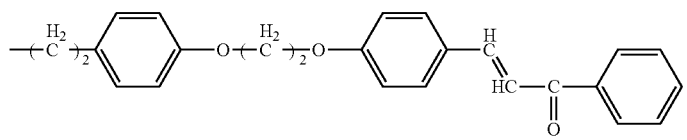
(41-28)
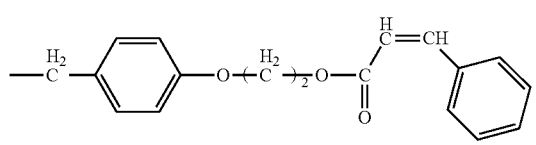
(41-29)
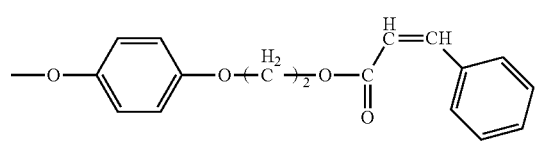
(41-30)
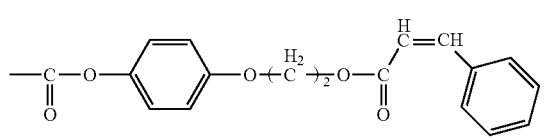
(41-31)
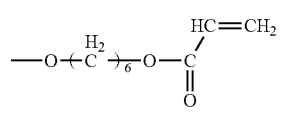
(41-32)

(41-33)

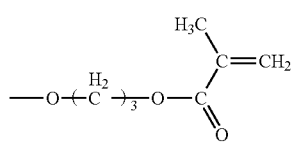

The compound before alignment processing preferably includes a structure for aligning the liquid crystal molecules 41 in vertical orientation, i.e., in the direction perpendicular to the substrate surface (hereinafter referred to as a "vertical alignment inducing structure portion"). The reason is that, even when the alignment films 22 and 32 do not contain a compound having the vertical alignment inducing structure portion (i.e., the so-called vertical alignment agent used in general) other than the compound after alignment processing, the alignment of all the liquid crystal molecules 41 can be restricted. Moreover, in comparison with the case of containing another compound having the vertical alignment inducing structure portion, it is easier to form the alignment films 22 and 32, which can more uniformly develop the alignment restriction function over the entire liquid crystal layer 40. The vertical alignment inducing structure portion may be included in one or both of the main chain and the side chain of the compound before alignment processing. Further, when the compound before alignment processing includes the polyimide structure expressed by the formula (3), it preferably includes two types of structures in R2, i.e., a structure (repeated unit) including the vertical alignment inducing structure portion and a structure (repeated unit) including the cross-linkable functional group or the polymerizable functional group. The reason is that such type of the compound before alignment processing is easily available. Be it noted that, when the vertical alignment inducing structure portion is included in the compound before alignment processing, it is included in the compound after alignment processing as well.

The vertical alignment inducing structure portion is, for example, an alkyl group having the carbon number of 10 or more, a halogenated alkyl group having the carbon number of 10 or more, an alkoxy group having the carbon number of 10 or more, a halogenated alkoxy group having the carbon number of 10 or more, or an organic group including a ring structure. More specifically, examples of the structure including the vertical alignment inducing structure portion can be expressed by the following formulae (5-1) to (5-6):

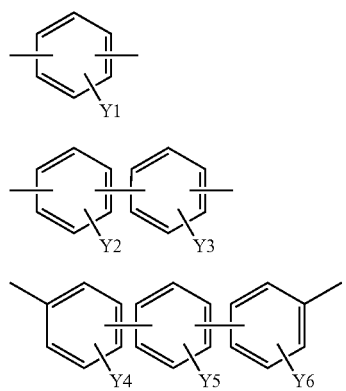

(5-1)

(5-2)

(5-3)

-continued

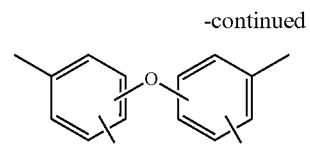

(5-4)

(5-5)

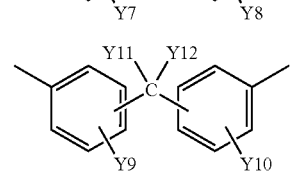

(5-6)

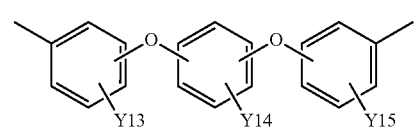

Herein, Y1 is an alkyl group having the carbon number of 10 or more, an alkoxy group having the carbon number of 10 or more, or a univalent organic group including a ring structure. Further, Y2 to Y15 are each a hydrogen atom, an alkyl group having the carbon number of 10 or more, an alkoxy group having the carbon number of 10 or more, or a univalent organic group including a ring structure. At least one of Y2 and Y3, at least one of Y4 to Y6, at least one of Y7 and Y8, at least one of Y9 to Y12, and at least one of Y13 to Y15 are each an alkyl group having the carbon number of 10 or more, an alkoxy group having the carbon number of 10 or more, or a univalent organic group including a ring structure. Additionally, Y11 and Y12 may be coupled to form a ring structure.

Examples of the univalent organic group including the ring structure, which serves as the vertical alignment inducing structure portion, include groups expressed by the following formulae (6-1) to (6-23). Examples of the bivalent organic group including the ring structure, which serves as the vertical alignment inducing structure portion, include groups expressed by the following formulae (7-1) to (7-7).

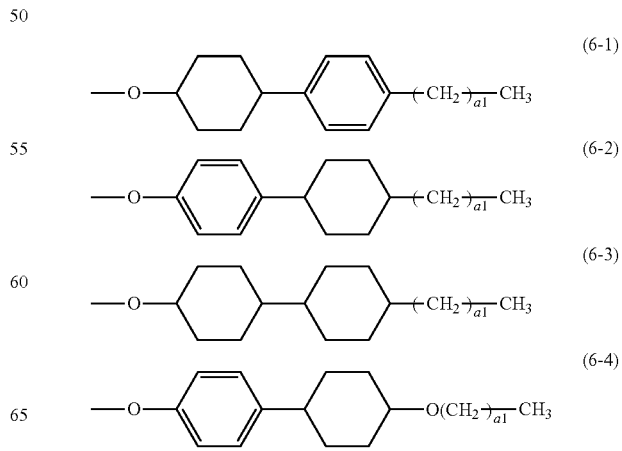

(6-1)

(6-2)

(6-3)

(6-4)

(6-5)
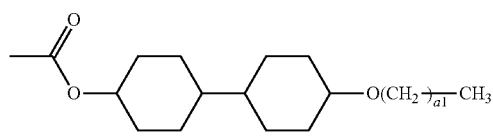
(6-6)
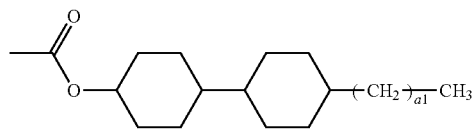
(6-7)
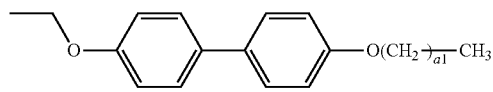
(6-8)
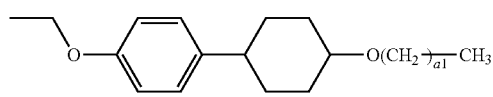
(6-9)
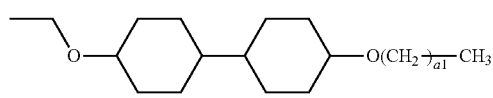
(6-10)
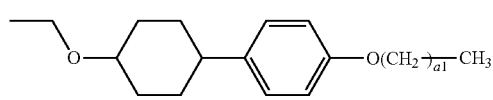
(6-11)
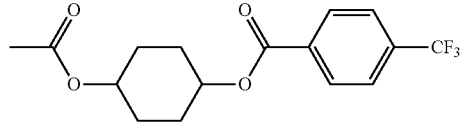
(6-12)
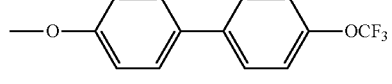
(6-13)
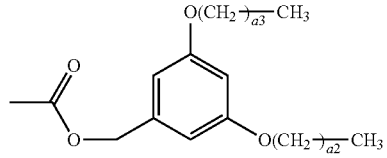
(6-14)
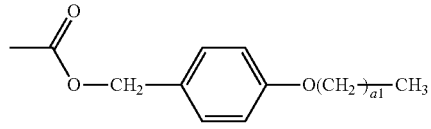
(6-15)
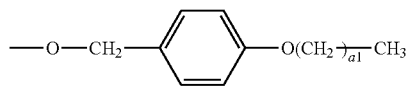
(6-16)
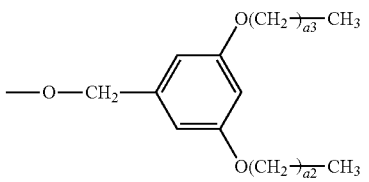
Herein, a1 to a3 are each an integer of 0 or more and 21 or less.
(6-17)
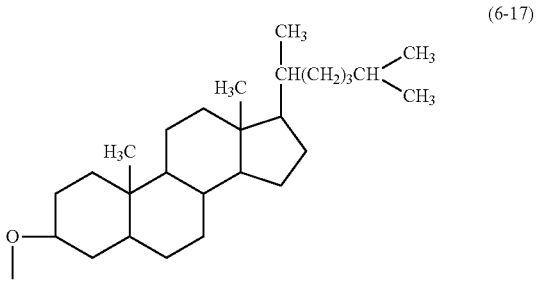
(6-18)
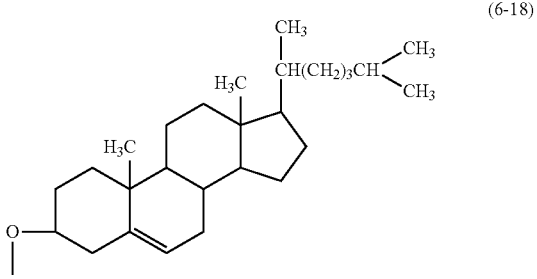
(6-19)
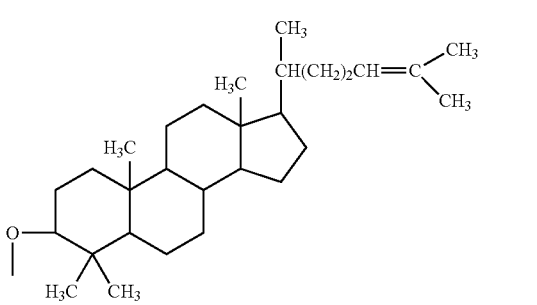
(6-20)
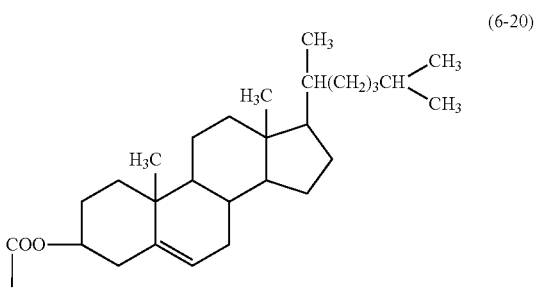

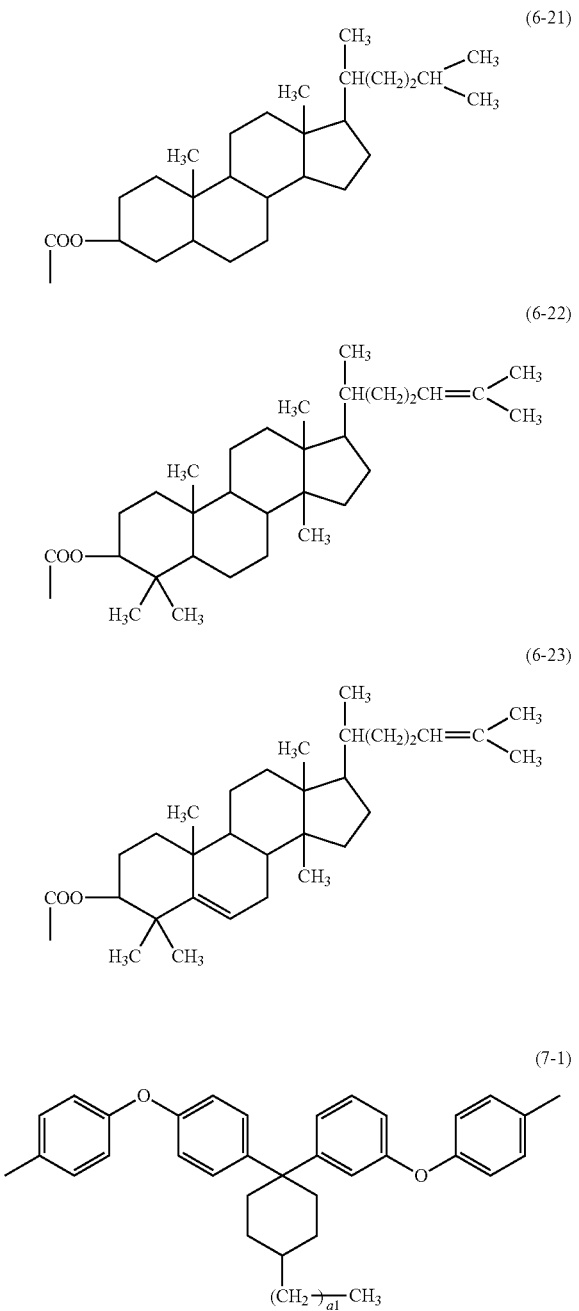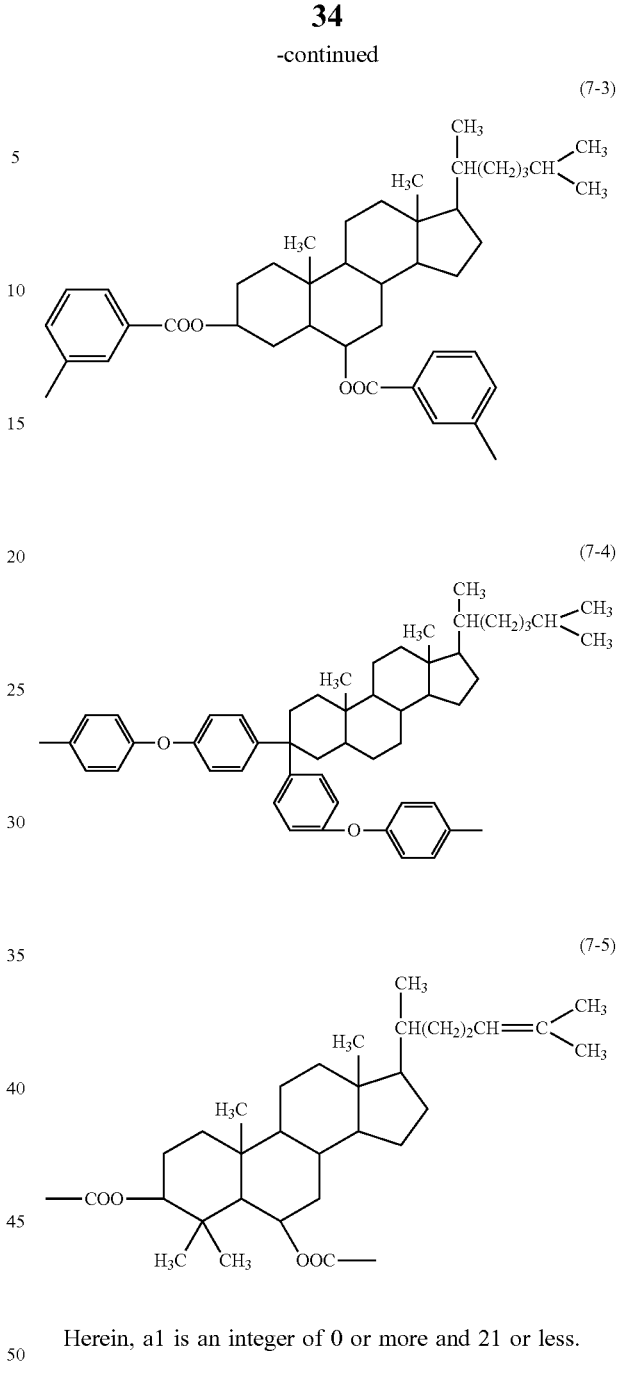
Herein, a1 is an integer of 0 or more and 21 or less.

(7-7)

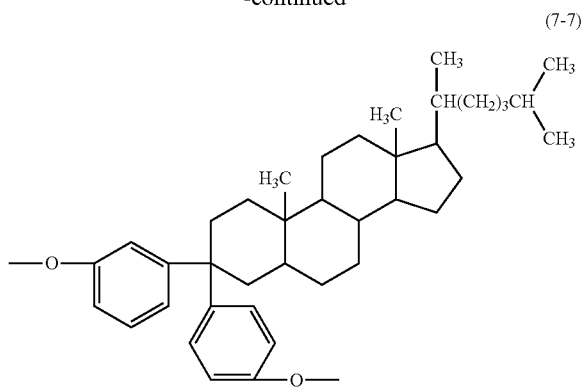

Be it noted that the vertical alignment inducing structure portion is not limited to the above-mentioned examples of groups as long as it includes a structure that functions to align the liquid crystal molecules 41 in the direction perpendicular to the substrate surface.

To describe an embodiment in accordance with the above-mentioned formation 1A, formation 2A (see the fifth embodiment described later), or formation 3A, the high-molecular compound before the cross-linking (i.e., the compound before alignment processing) is made of a compound having a group, expressed by the following formula (1), as at least one side chain in addition to the cross-linkable functional group or the polymerizable functional group. The group expressed by the formula (1) is able to move along the liquid crystal molecule 41 so that, when the compound before alignment processing is cross-linked, the group expressed by the formula (1) is fixed together with the cross-linkable functional group or the polymerizable functional group in the state positioned along the alignment direction of the liquid crystal molecules 41. Therefore, the alignment of the liquid crystal molecules 41 can be more easily restricted in the predetermined direction with the aid of the thus-fixed group expressed by the formula (1). As a result, the liquid crystal display element having satisfactory display characteristics can be more easily manufactured.

—R1-R2-R3      (1)

Herein, R1 is a linear or branched bivalent organic group having the carbon number of 1 or more, the organic group optionally including an ether group or an ester group, and it is bonded to the main chain of the high-molecular compound (i.e., the compound before alignment processing) or the cross-linked compound (i.e., the compound after alignment processing). Alternatively, R1 is at least one type of bonding group selected from among ether, ester, ether ester, acetal, ketal, hemiacetal, and hemiketal, and it is bonded to the main chain of the high-molecular compound (i.e., the compound before alignment processing) or the cross-linked compound (i.e., the compound after alignment processing). R2 is a bivalent organic group including a plurality of ring structures, and one of atoms constituting the ring structures is bonded to R1. R3 is a univalent group including a hydrogen atom, a halogen atom, an alkyl group, an alkoxy group or a carbonate group, or a derivative thereof.

In addition to fixing R2 and R3 to the main chain, R1 in the formula (1) functions as a spacer portion for giving a large pre-tilt to the liquid crystal molecule 41 when a long R1 is selected, or as a spacer portion for easily holding a pre-tilt angle constant when a short R1 is selected. One example of R1 is an alkylene group. The alkylene group may include an ether bond between intermediate carbon atoms. Such an ether bond may be included at one or more locations. Further, R1 may include a carbonyl group or a carbonate group. The carbon number of R1 is more preferably 6 or more. With R1 having the carbon number of 6 or more, the group expressed by the formula (1) interacts with the liquid crystal molecule 41 and becomes more apt to be positioned along the liquid crystal molecule 41. Preferably, the carbon number of R1 is determined such that the length of R1 is substantially equal to the length of a terminal chain of the liquid crystal molecule 41.

R2 in the formula (1) represents a portion that is positioned along a ring structure (core portion) contained in a general nematic liquid crystal molecule. R2 is, for example, a group or a skeleton similar to the ring structure contained in the liquid crystal molecule, such as a 1,4-phenylene group, a 1,4-cyclohexylene group, a pyrimidine-2,5-diyl group, a 1,6-naphthalene group, a bivalent group having a steroid skeleton, or a derivative thereof. Herein, the term "derivative" implies a group in which one or more substituents are introduced to any of the above-mentioned groups.

R3 in the formula (1) represents a portion that is positioned along the terminal chain of the liquid crystal molecule. R3 is, for example, an alkyl group or a halogenated alkyl group. When R3 is a halogenated alkyl group, it is just necessary that at least one hydrogen atom in the alkyl group is substituted by a halogen atom, and the type of the substituted halogen atom is arbitrary. The alkyl group or the halogenated alkyl group may include an ether bond between intermediate carbon atoms. Such an ether bond may be included at one or more locations. Further, R3 may include a carbonyl group or a carbonate group. The carbon number of R3 is more preferably 6 or more for the same reason as that described above in connection with R1.

More specifically, examples of the group expressed by the formula (1) are univalent groups expressed by the following formulae (1-1) to (1-12):

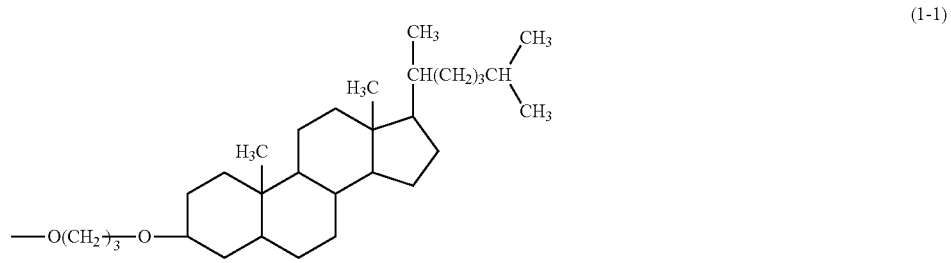

(1-1)

-continued (1-2)
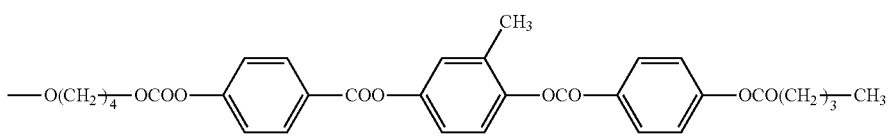

(1-3)
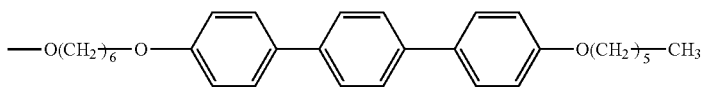

(1-4)
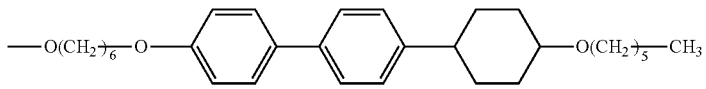

(1-5)
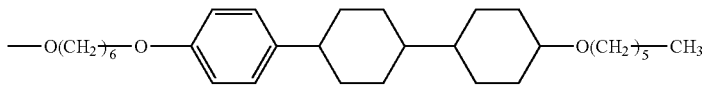

(1-6)
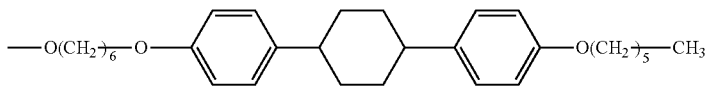

(1-7)
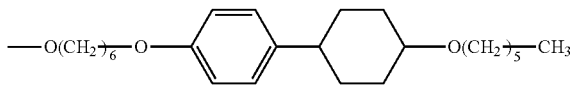

(1-8)
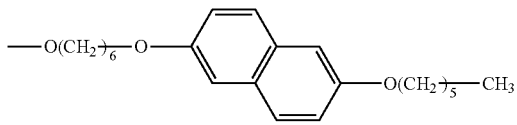

(1-9)
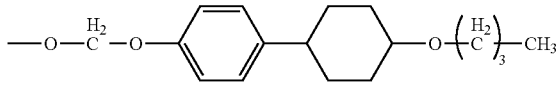

(1-10)
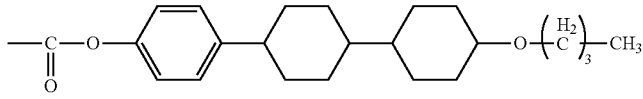

(1-11)
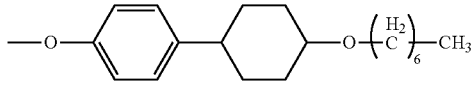

(1-12)
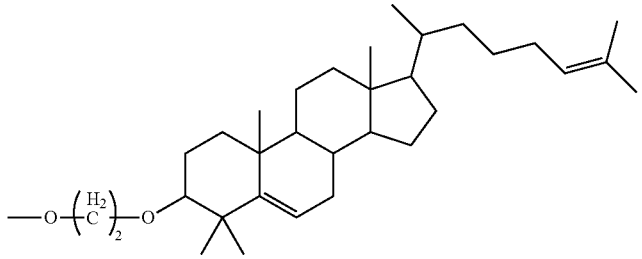

Be it noted that the group expressed by the formula (1) is not limited to the above-mentioned examples as long as it is able to move with respect to the liquid crystal molecule 41 along it.

To describe an embodiment in accordance with the above-mentioned formation 1B, formation 2B (see the fifth embodiment described later), or formation 3B, the high-molecular compound before the cross-linking (i.e., the compound before alignment processing) is made of a compound having a group, expressed by the following formula (2), as at least one side chain. Because the group expressed by the formula (2) includes, in addition to a cross-linked portion, a portion positioned along the liquid crystal molecule 41 and a portion for specifying a tilt-angle, a portion of the side chain, which is positioned along the liquid crystal molecule 41, can be fixed in a state positioned more closely along the liquid crystal molecule 41. As a result, the alignment of the liquid crystal molecules 41 can be more easily restricted in the predetermined direction, and the liquid crystal display element having satisfactory display characteristics can be more easily manufactured.

—R11-R12-R13-R14    (2)

Herein, R11 is a linear or branched bivalent organic group having the carbon number of 1 or more and 20 or less, preferably the carbon number of 3 or more and 12 or less, the organic group optionally including an ether group or an ester group, and it is bonded to the main chain of the high-molecular compound (i.e., the compound before alignment processing) or the cross-linked compound (i.e., the compound after alignment processing). Alternatively, R11 is at least one type of bonding group selected from among ether, ester, ether ester, acetal, ketal, hemiacetal, and hemiketal, and it is bonded to the main chain of t the high-molecular compound (i.e., the compound before alignment processing) or the cross-linked compound (i.e., the compound after alignment processing). R12 is, for example, a bivalent group including one type of structure selected from among those represented by chalcone, cinnamate, cinnamoyl, coumarin, maleimide, benzophenone, norbornene, orizanol, chitosan, acryloyl, methacryloyl, vinyl, epoxy and oxetane, or an ethynylene group. R13 is a bivalent organic group including a plurality of ring structures. R14 is a univalent group including a hydrogen atom, a halogen atom, an alkyl group, an alkoxy group or a carbonate group, or a derivative thereof.

R11 in the formula (2) serves as a portion for specifying a tilt angle in the compound before alignment processing, and it preferably has flexibility in the compound before alignment processing. Examples of the group of R11 are similar to those described above in connection with R1 in the formula (1). In the group expressed by the formula (2), because R12 to R14 are easily movable about R11 as an axis, R13 and R14 are more apt to be positioned along the liquid crystal molecule 41. The carbon number of R11 is more preferably 6 or more and 10 or less.

R12 in the formula (2) represents a portion including the cross-linkable functional group or the polymerizable functional group. The cross-linkable functional group or the polymerizable functional group may be, as described above, a group that forms a cross-linked structure by a photoreaction, or a group that forms a cross-linked structure by a thermal reaction. More specifically, R12 is, for example, a bivalent group including one type of structure selected from among those represented by chalcone, cinnamate, cinnamoyl, coumarin, maleimide, benzophenone, norbornene, orizanol, chitosan, acryloyl, methacryloyl, vinyl, epoxy and oxetane, or an ethynylene group.

R13 in the formula (2) represents a portion capable of being positioned along a core portion of the liquid crystal molecule 41. Examples of the group of R13 are similar to those described above in connection with R2 in the formula (1).

R14 in the formula (2) represents a portion that is positioned along a terminal chain of the liquid crystal molecule 41. Examples of the group of R14 are similar to those described above in connection with R3 in the formula (1).

More specifically, examples of the group expressed by the formula (2) are univalent groups expressed by the following formulae (2-1) to (2-11):

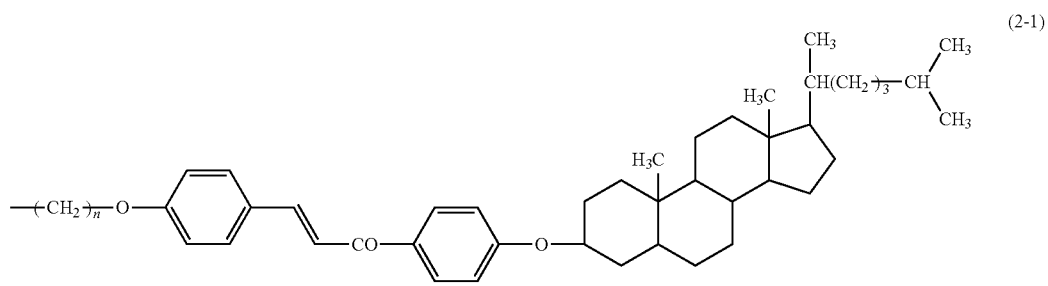

(2-1)

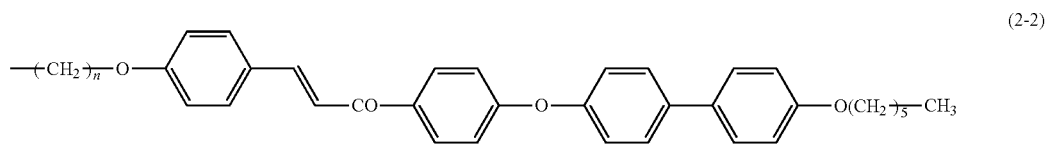

(2-2)

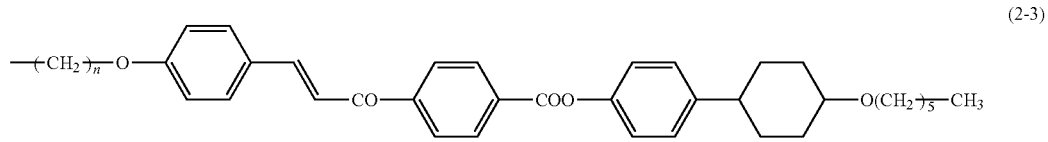

(2-3)

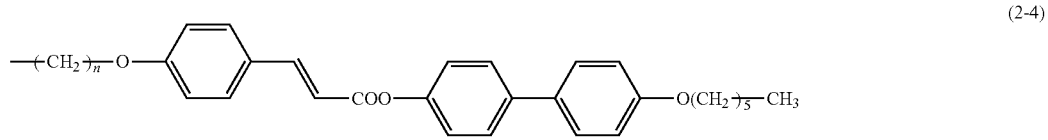

(2-4)

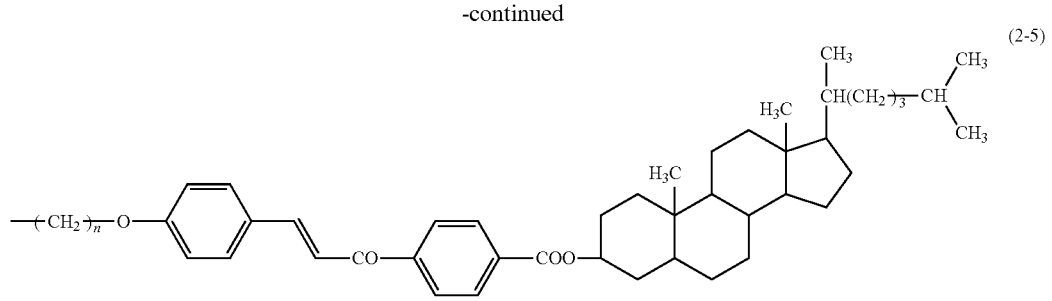
(2-5)
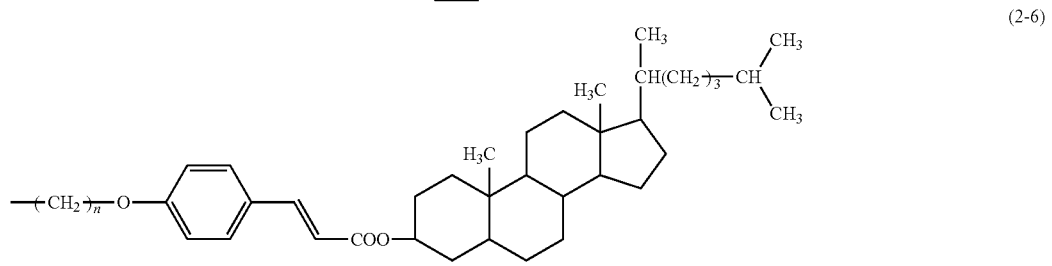
(2-6)
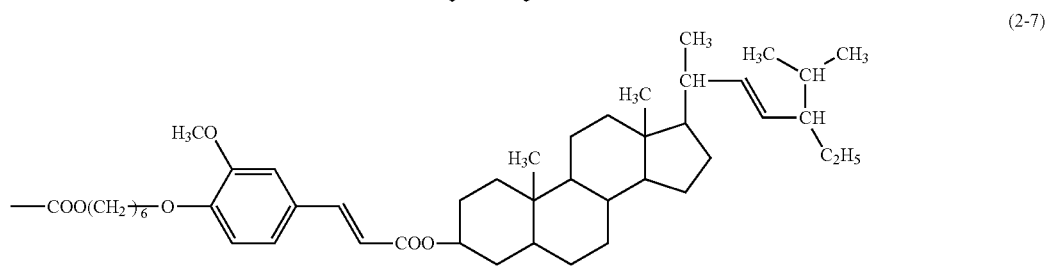
(2-7)
Herein, n is an integer of 3 or more and 20 or less.
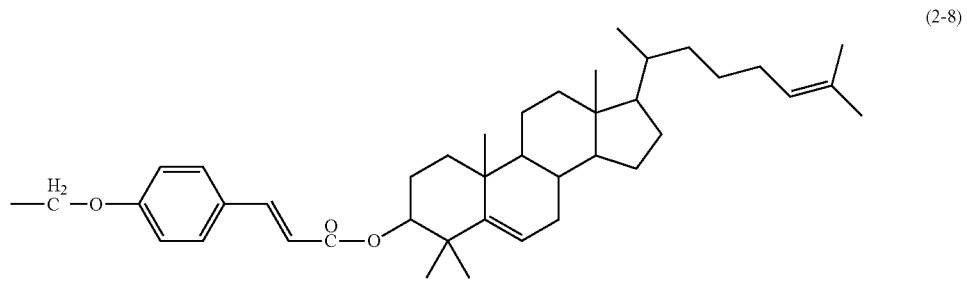
(2-8)
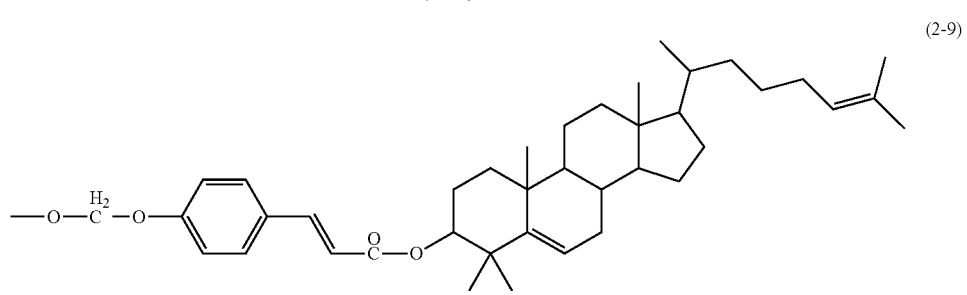
(2-9)
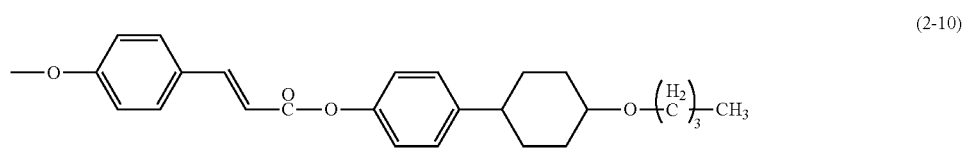
(2-10)

(2-11)

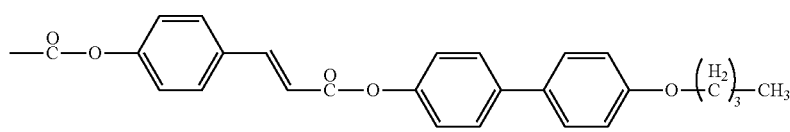

Be it noted that the group expressed by the formula (2) is not limited to the above-mentioned examples as long as it includes the above-mentioned four portions (R11 to R14).

To describe an embodiment in accordance with the above-mentioned formation 1C, the compound (i.e., the compound after alignment processing) obtained by cross-linking the high-molecular compound (i.e., the compound before alignment processing) is made of at least one side chain and a main chain supporting the side chain to the substrate, the side chain including a cross-linked portion which is bonded to the main chain and in which a part of the side chain is cross-linked, and a terminal structure portion bonded to the cross-linked portion. The liquid crystal molecule is given with a pre-tilt by being positioned along the terminal structure portion or being caught between the terminal structure portions. Also, to describe an embodiment in accordance with the above-mentioned formation 2C (see the fifth embodiment described later), the compound (i.e., the compound after alignment processing) obtained by deforming the high-molecular compound (i.e., the compound before alignment processing) is made of at least one side chain and a main chain supporting the side chain to the substrate, the side chain including a deformed portion which is bonded to the main chain and in which a part of the side chain is deformed, and a terminal structure portion bonded to the deformed portion. The liquid crystal molecule is given with a pre-tilt by being positioned along the terminal structure portion or being caught between the terminal structure portions. Further, to describe an embodiment in accordance with the above-mentioned formation 3C, the compound obtained by irradiating the high-molecular compound with an energy ray is made of at least one side chain and a main chain supporting the side chain to the substrate, the side chain including a cross-linked/deformed portion which is bonded to the main chain and in which a part of the side chain is cross-linked or deformed, and a terminal structure portion bonded to the cross-linked/deformed portion. The liquid crystal molecule is given with a pre-tilt by being positioned along the terminal structure portion or being caught between the terminal structure portions.

Figure 17:
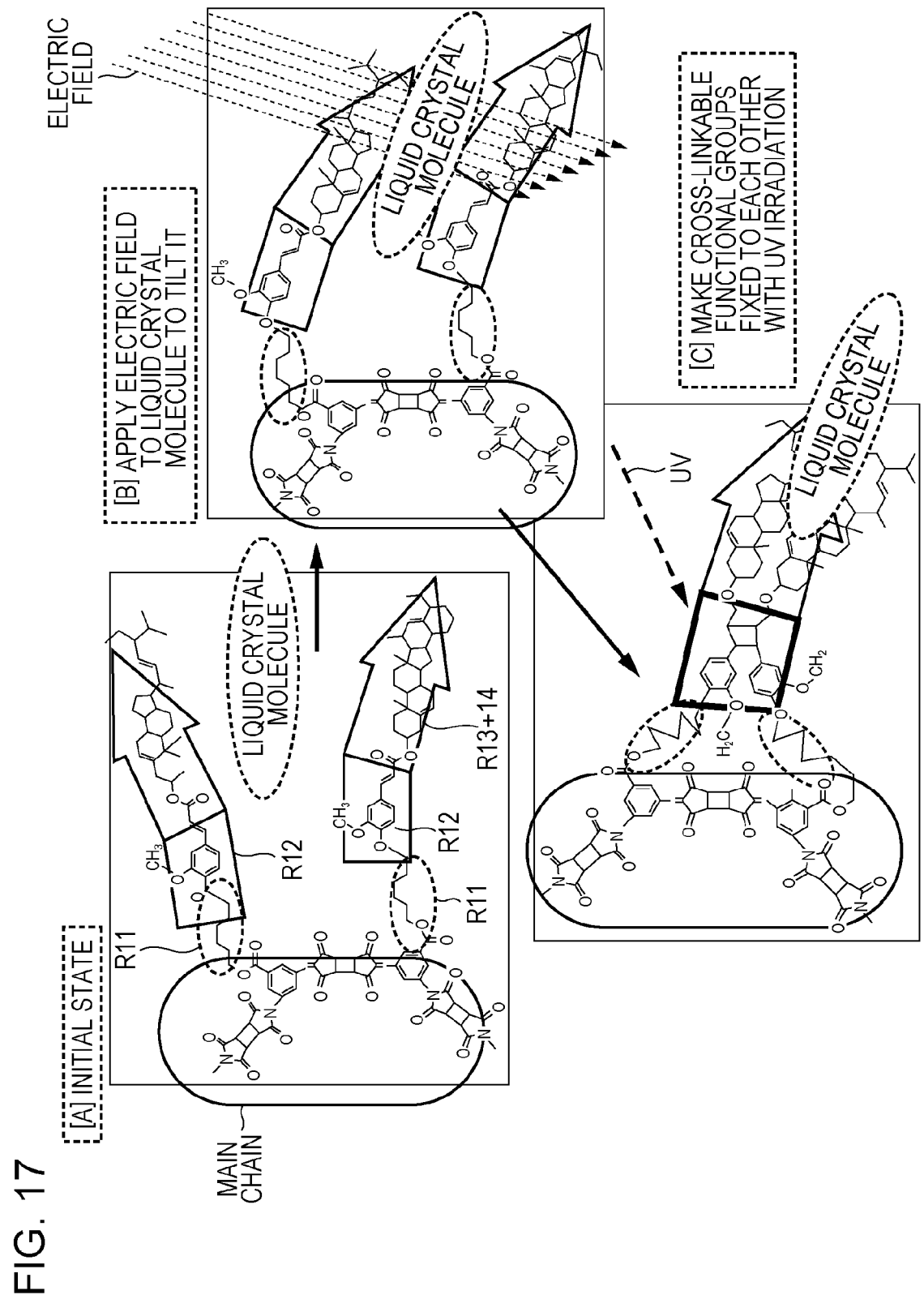
FIG. 17 is a conceptual illustration to explain the relationship between a cross-linked high-molecular compound and a liquid crystal molecule.

In the formation 1C according to the embodiment, the cross-linked portion in which a part of the side chain is cross-linked corresponds to R12 (after the cross-linking) in the formula (2). Also, the terminal structure portion corresponds to R13 and R14 in the formula (2). In the compound after alignment processing, for example, the cross-linked portions in two side chains extending from the main chain are cross-linked to each other, and the liquid crystal molecule 41 is brought into such a state that a part of the liquid crystal molecule 41 is caught between the terminal structure portion extending from one of the cross-linked portions and the terminal structure portion extending from the other cross-linkable portion. Furthermore, the terminal structure portions are fixed in a state forming a predetermined angle with respect to the substrate, whereby the liquid crystal molecule 41 is given with a pre-tilt. Such a state is illustrated in a conceptual illustration of FIG. 17.

To describe an embodiment in accordance with the above-mentioned formation 1D, the compound (i.e., the compound after alignment processing) obtained by cross-linking the high-molecular compound (i.e., the compound before alignment processing) is made of at least one side chain and a main chain supporting the side chain to the substrate, the side chain including a cross-linked portion which is bonded to the main chain and in which a part of the side chain is cross-linked, and a terminal structure portion bonded to the cross-linked portion and having a mesogenic group. The side chain may be in the form including a photodimerization photosensitive group. Moreover, the main chain and the cross-linked portion may be covalently bonded to each other, and the cross-linked portion and the terminal structure portion may be covalently bonded to each other. Also, to describe an embodiment in accordance with the above-mentioned formation 2D (see the fifth embodiment described later), the compound (i.e., the compound after alignment processing) obtained by deforming the high-molecular compound (i.e., the compound before alignment processing) is made of at least one side chain and a main chain supporting the side chain to the substrate, the side chain including a deformed portion which is bonded to the main chain and in which a part of the side chain is deformed, and a terminal structure portion bonded to the deformed portion and having a mesogenic group. Further, to describe an embodiment in accordance with the above-mentioned formation 3D, the compound (i.e., the compound after alignment processing) obtained by irradiating the high-molecular compound (i.e., the compound before alignment processing) with an energy ray is made of at least one side chain and a main chain supporting the side chain to the substrate, the side chain including a cross-linked/deformed portion which is bonded to the main chain and in which a part of the side chain is cross-linked or deformed, and a terminal structure portion bonded to the cross-linked/deformed portion and having a mesogenic group.

In the formation 1D according to the embodiment, the photodimerization photosensitive group serving as the cross-linkable functional group or the polymerizable functional group (i.e., the photosensitive functional group) is, for example, a group including, as described above, one type of structure selected from among those represented by chalcone, cinnamate, cinnamoyl, coumarin, maleimide, benzophenone, norbornene, orizanol, and chitosan. The polymerizable functional group is, for example, a group including one type of structure selected from among those represented by acryloyl, methacryloyl, vinyl, epoxy, and oxetane. The mesogenic group being stiff and constituting the terminal structure portion may develop or may not develop liquid crystallinity as the side chain. The structure of the mesogenic group can be practically given by, e.g., a steroid derivative, a cholesterol derivative, biphenyl, triphenyl, and naphthalene. The terminal structure portion can be, for example, R13 and R14 in the formula (2).

The first and second alignment films 22 and 32 may contain an additional vertical aligner other than the above-described compound after alignment processing. The additional vertical aligner can be, for example, polyimide having the vertical alignment inducing structure portion, or polysiloxane having the vertical alignment inducing structure portion.

The liquid crystal layer 40 includes the liquid crystal molecules 41 each having negative dielectric anisotropy. The liquid crystal molecule 41 has, for example, a rotationally symmetric shape about each of the major axis and the minor axis, which are orthogonal to each other, as a center axis, and it exhibits negative dielectric anisotropy.

The liquid crystal molecules 41 can be classified into liquid crystal molecules 41A that are held on the first alignment film 22 near the interface between the liquid crystal layer 40 and the first alignment film 22, liquid crystal molecules 41B that are held on the second alignment film 32 near the interface between the liquid crystal layer 40 and the second alignment film 32, and the other liquid crystal molecules 41C. The liquid crystal molecules 41C are positioned in an intermediate region of the liquid crystal layer 40 in the direction of thickness thereof. In the state where the drive voltage is turned off, the direction of the major axis (i.e., the director) of the liquid crystal molecule 41C is oriented substantially perpendicularly to the first substrate 20 and the second substrate 30. When the drive voltage is turned on, the liquid crystal molecules are aligned such that the director of the liquid crystal molecule 41C is inclined to be parallel to the first substrate 20 and the second substrate 30. Such a behavior is attributable to such a property of the liquid crystal molecule 41C that the dielectric constant in the direction of the major axis is smaller than that in the direction of the minor axis. Because the liquid crystal molecules 41A and 41B have a similar property, they also behave basically in a similar way to the liquid crystal molecule 41C. In the state where the drive voltage is turned off, however, a pre-tilt $\theta_1$ is given to the liquid crystal molecule 41A by the first alignment film 22, and the liquid crystal molecule 41A is in a posture that the director thereof is inclined by the pre-tilt $\theta_1$ from the direction normal to the first substrate 20 and the second substrate 30. Similarly, a pre-tilt $\theta_2$ is given to the liquid crystal molecule 41B by the second alignment film 32, and the liquid crystal molecule 41B is in a posture that the director thereof is inclined by the pre-tilt $\theta_2$ from the direction normal to the first substrate 20 and the second substrate 30. Herein, the expression "held" implies that the liquid crystal molecules 41A and 41B are not fixed to the first and second alignment films 22 and 32, and that the alignment of those liquid crystal molecules 41 are restricted by the alignment films 22 and 32. Further, the expression "pre-tilt $\theta$ ($\theta_1$, $\theta_2$)" implies, as illustrated in FIG. 6, an angle at which, assuming a direction perpendicular (normal) to the surfaces of the first substrate 20 and the second substrate 30 to be Z, the director D of the liquid crystal molecule 41 (41A, 41B) is inclined with respect to the direction Z when the drive voltage is turned off.

In the liquid crystal layer 40, each of the pre-tilts $\theta_1$ and $\theta_2$ has a value larger than 0°. In the liquid crystal layer 40 according to the embodiment, the pre-tilts $\theta_1$ and $\theta_2$ may be the same angle ($\theta_1=\theta_2$) or may differ from each other ($\theta_1 \neq \theta_2$). Preferably, the pre-tilts $\theta_1$ and $\theta_2$ differ from each other. With such a feature, a response speed to the application of the drive voltage is increased in comparison with the case where the pre-tilts $\theta_1$ and $\theta_2$ are both 0°, and contrast can be obtained at a level comparable to that in the case where the pre-tilts $\theta_1$ and $\theta_2$ are both 0°. Thus, it is possible not only to improve a response characteristic, but also to reduce the amount of light transmitted in the black mode, thereby increasing the contrast. When the pre-tilts $\theta_1$ and $\theta_2$ are set different from each other, larger one $\theta$ of the pre-tilts $\theta_1$ and $\theta_2$ is more preferably 1° or larger and 4° or smaller. By setting the larger pre-tilt $\theta$ to fall within such a range, a significantly excellent effect can be obtained.

Figure 7:
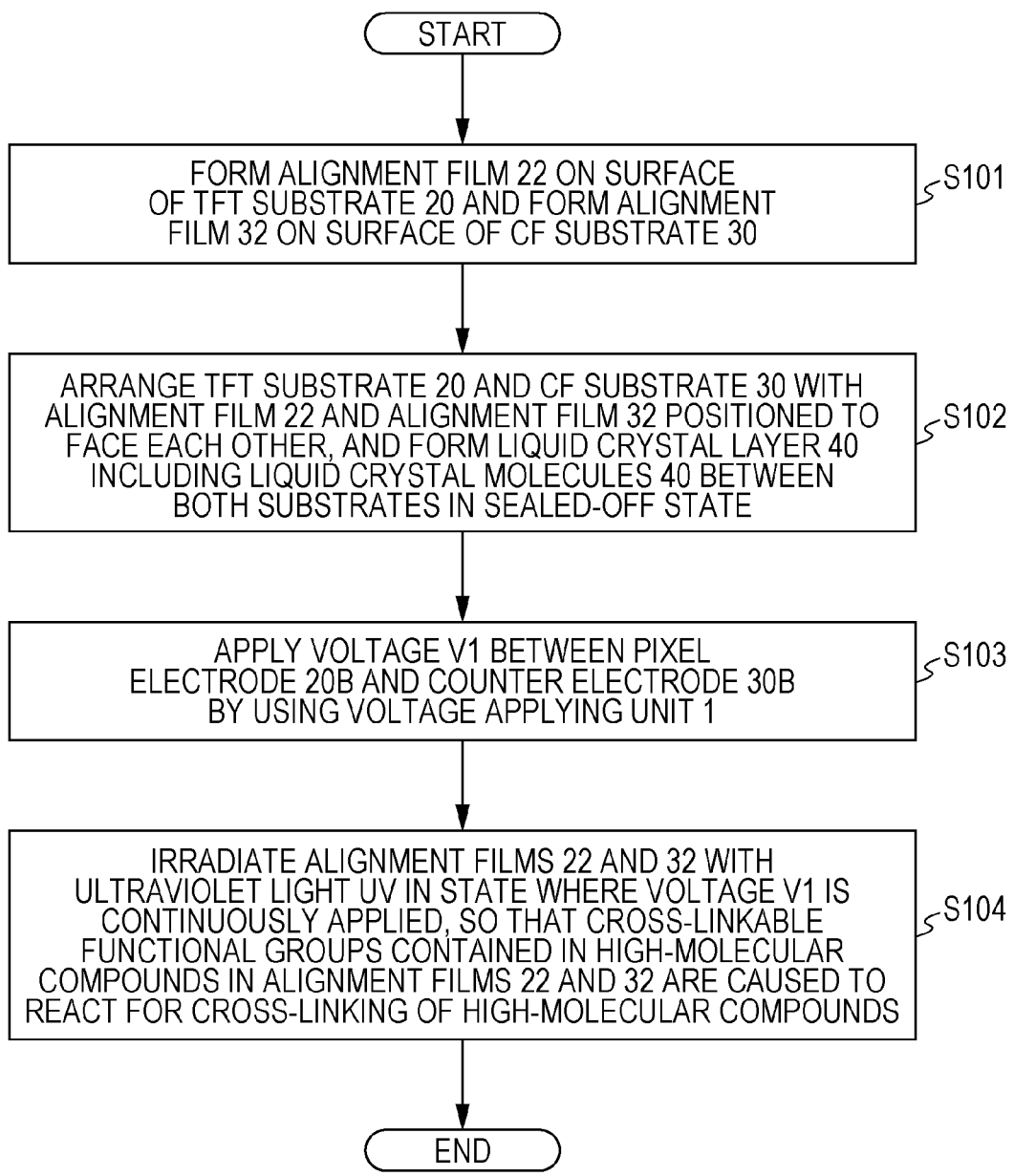
FIG. 7 is a flowchart to explain a method of manufacturing the liquid crystal display device illustrated in FIG. 1.
Figure 9:
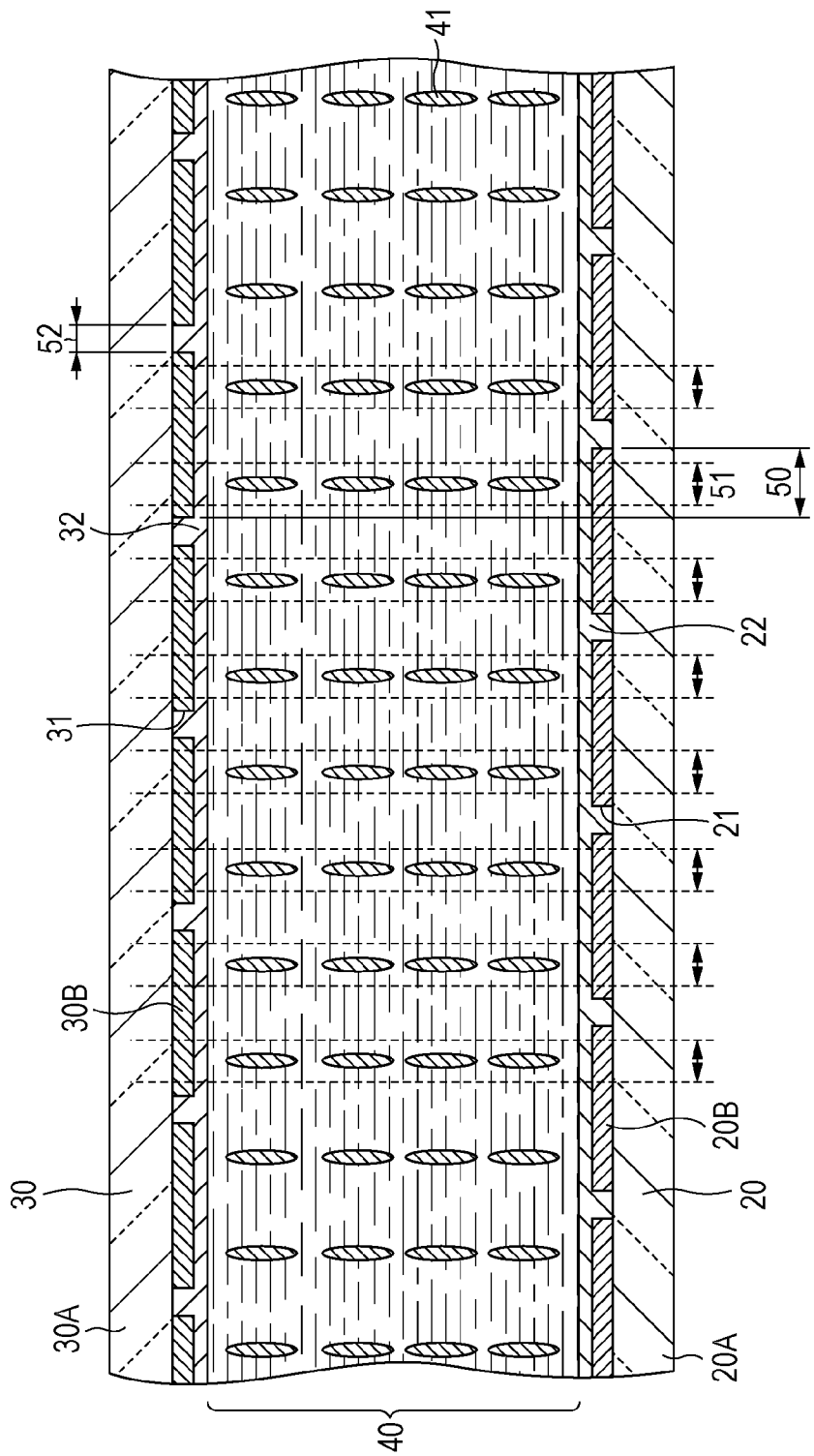
FIG. 9 is a schematic partial sectional view of the substrates, etc. to explain the method of manufacturing the liquid crystal display device illustrated in FIG. 1.
Figure 10:
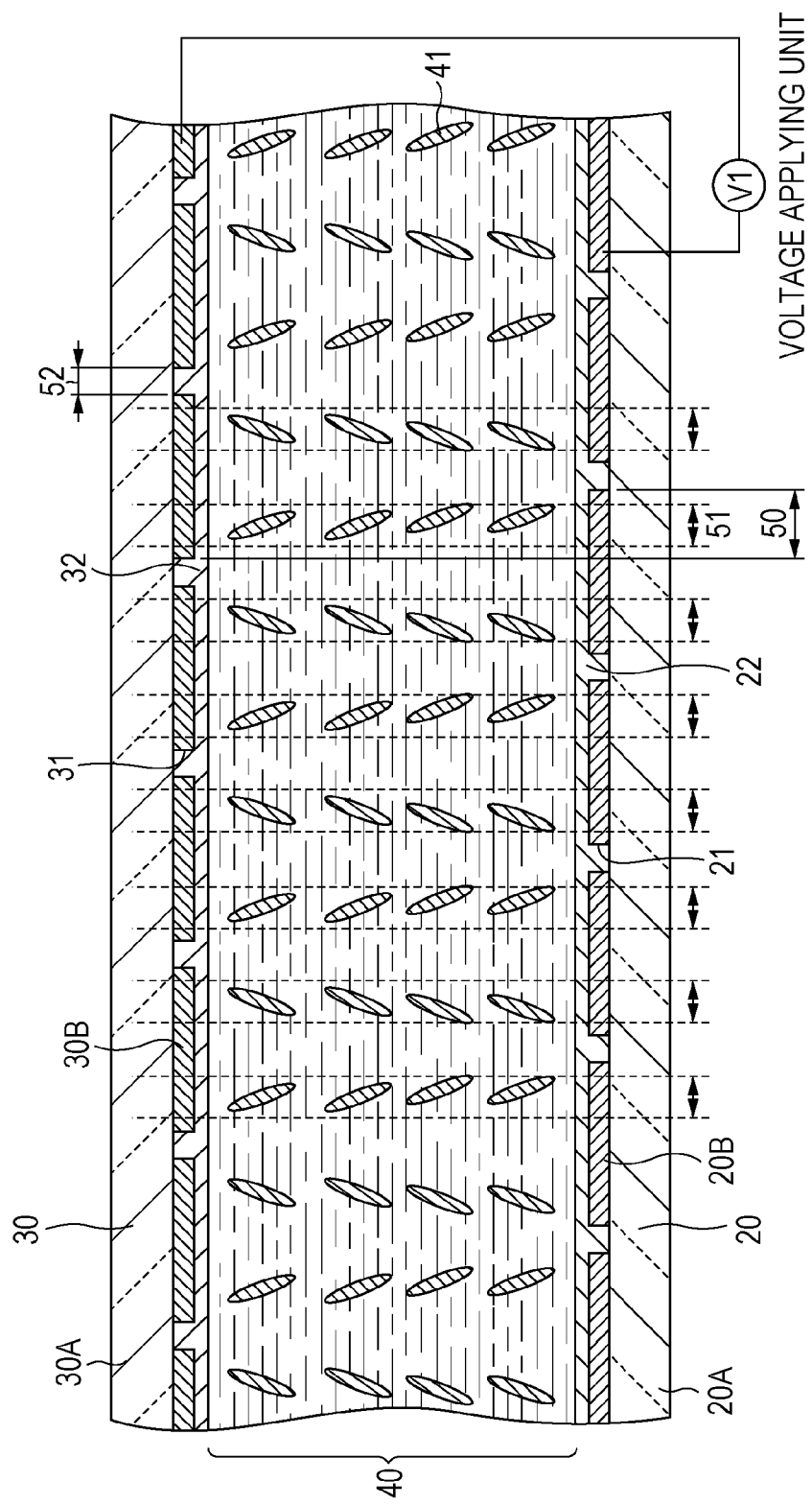
FIG. 10 is a schematic partial sectional view of the substrates, etc. to explain a step subsequent to the step illustrated in FIG. 9.
Figure 11:
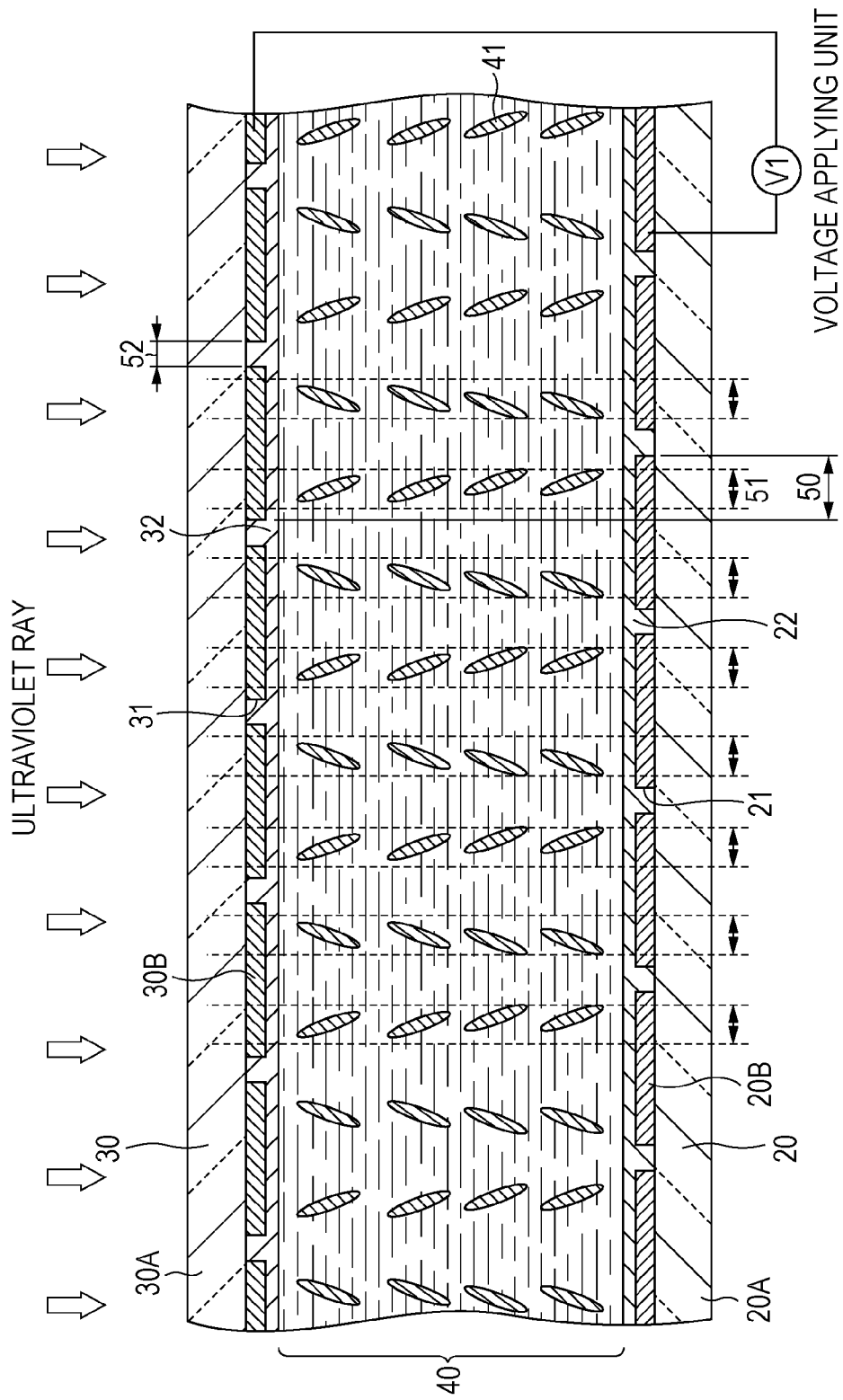
FIG. 11 is a schematic partial sectional view of the substrates, etc. to explain a step subsequent to the step illustrated in FIG. 10.

A method for manufacturing the liquid crystal display device (liquid crystal display element) will be described with reference to a flowchart illustrated in FIG. 7, an illustration of FIG. 8 to explain the states of the first and second alignment films 22 and 32, and schematic partial sectional views of the liquid crystal display devices illustrated in FIGS. 9, 10 and 11. Be it noted that, for simplicity of the drawings, each of FIGS. 9, 10 and 11 illustrates the structure of only one pixel.

First, the first alignment film 22 is formed on the surface of the first substrate (TFT substrate) 20, and the second alignment film 32 is formed on the surface of the second substrate (CF substrate) 30 (step S101).

In more detail, the TFT substrate 20 is fabricated by forming the pixel electrodes 20B in a matrix pattern on the surface of the first substrate 20, for example, with the predetermined first slit portions 21 formed in each of the pixel electrodes 20B. Also, the CF substrate 30 is fabricated by forming the counter electrodes 30B, each including the predetermined second slit portions 31, on a color filter that is formed on the second substrate 30.

On the other hand, an alignment film material in liquid phase is prepared by mixing the compound before alignment processing or a high-molecular compound precursor that serves as the compound before alignment processing, a solvent, and a vertical aligner, when necessary.

When the high-molecular compound having the cross-linkable functional group or the polymerizable functional group in at least one side chain includes the polyimide structure expressed by the formula (3), the high-molecular compound precursor serving as the compound before alignment processing is, for example, polyamic acid having the cross-linkable functional group or the polymerizable functional group. The polyamic acid used as the high-molecular compound precursor is synthesized, for example, by reacting a diamine compound with tetracarboxylic dianhydride. At least one of the diamine compound and the tetracarboxylic dianhydride used here has the cross-linkable functional group or the polymerizable functional group. Examples of the diamine compound include compounds expressed by the following formulae (A-1) to (A-21) and having the cross-linkable functional group or the polymerizable functional group. Examples of the tetracarboxylic dianhydride include compounds expressed by the following formulae (a-1) to (a-10) and having the cross-linkable functional group or the polymerizable functional group. The compounds expressed by the formulae (A-9) to (A-21) are compounds each constituting the cross-linked portion and the terminal structure portion of the cross-linked high-molecular compound in the formation 1C according to the embodiment. Alternatively, compounds expressed by the following formulae (F-1) to (F-22) may be the compounds each constituting the cross-linked portion and the terminal structure portion of the cross-linked high-molecular compound in the formation 1C according to the embodiment. Of the compounds expressed by the formulae (F-1) to (F-18), it is thought that the liquid crystal molecule is given with the pre-tilt by being positioned along the terminal structure portion in each of the compounds expressed by the formulae (F-1) to (F-3), the formulae (F-7) to (F-9), and the formulae (F-13) to (F-15). On the other hand, it is thought that the liquid crystal molecule is given with the pre-tilt by being caught between the terminal structure portions in each of the compounds expressed by the formulae (F-4) to (F-6), the formulae (F-10) to (F-12), and the formulae (F-16) to (F-18). Further, it is estimated that the liquid crystal molecule is given with the pre-tilt by being positioned along the terminal structure portion in each of the compounds expressed by the formulae (F-19) to (F-22), or that the liquid crystal molecule is given with the pre-tilt by being caught between the terminal structure portions in each of the compounds expressed by the formulae (F-19) to (F-22).

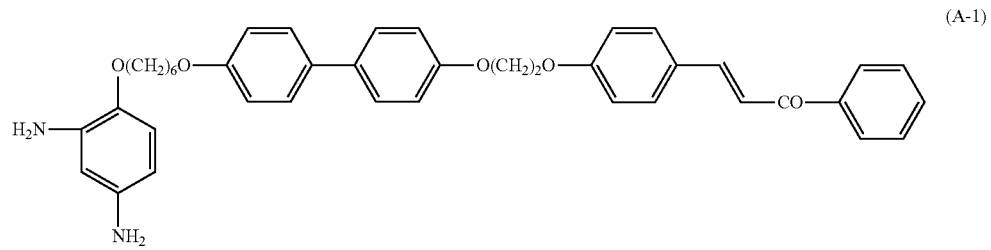
(A-1)

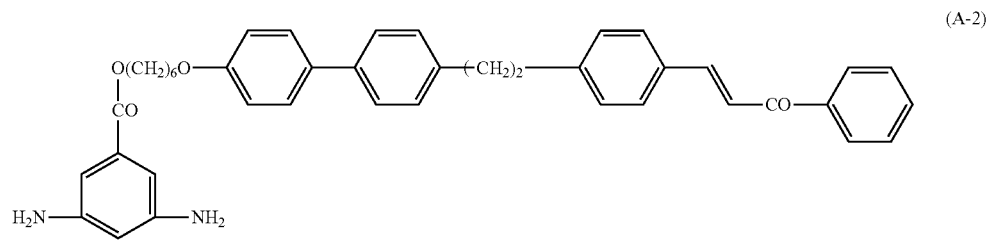
(A-2)

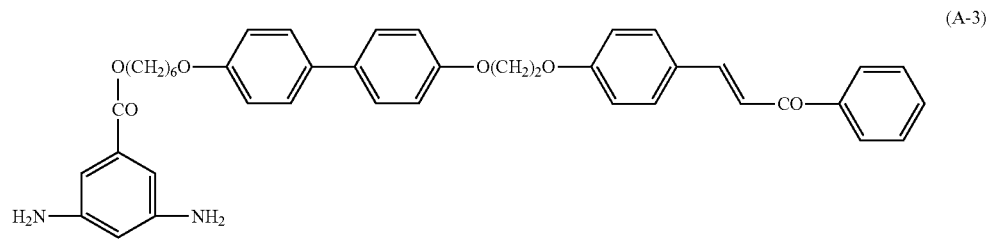
(A-3)

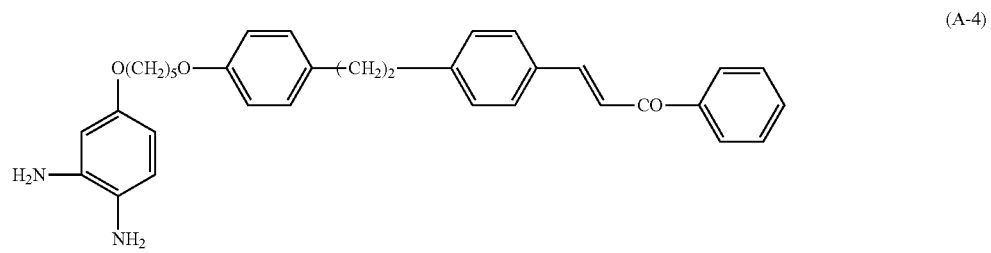
(A-4)

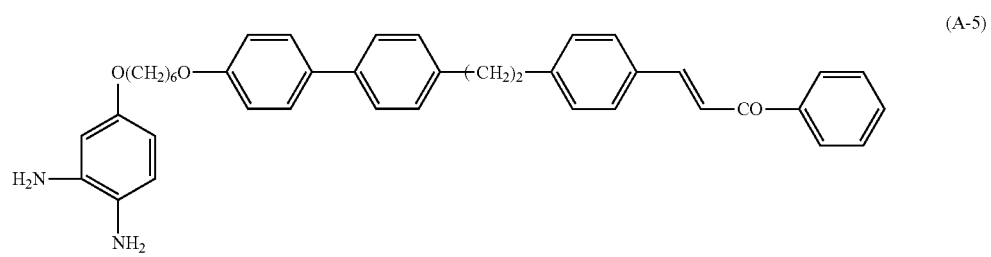
(A-5)

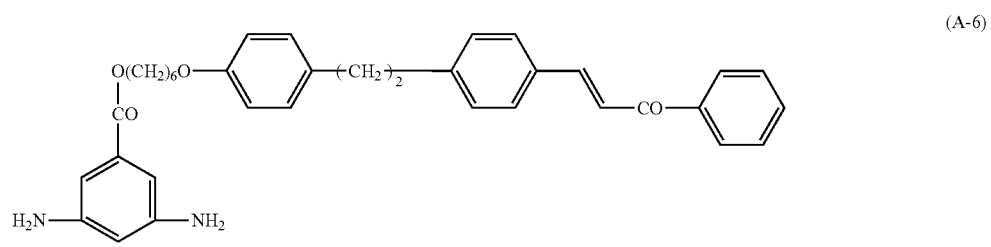
(A-6)

-continued
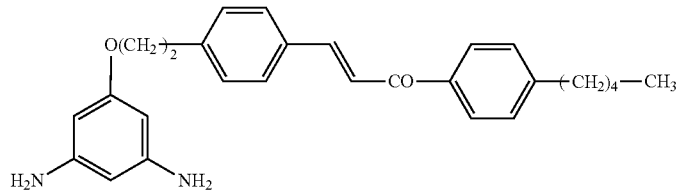
(A-7)
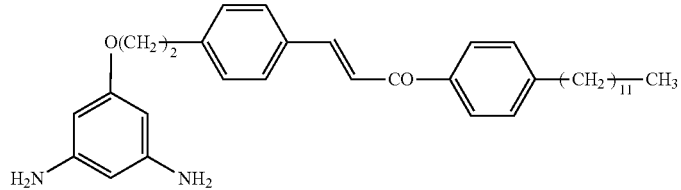
(A-8)
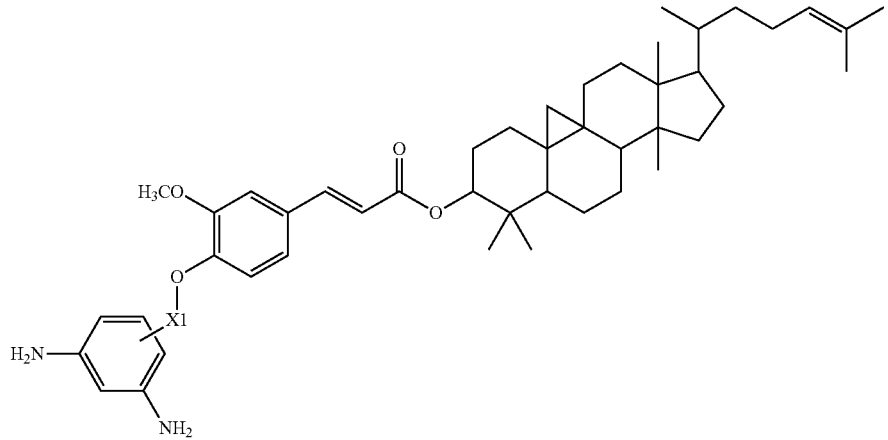
(A-9)
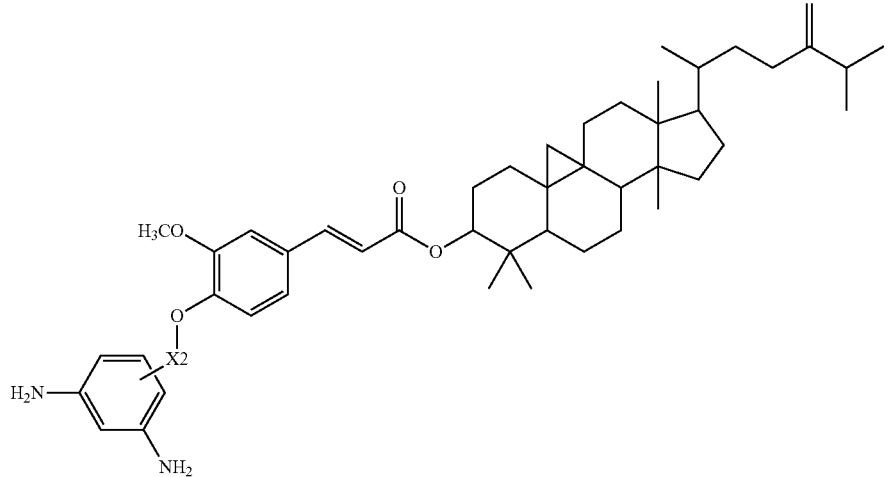
(A-10)

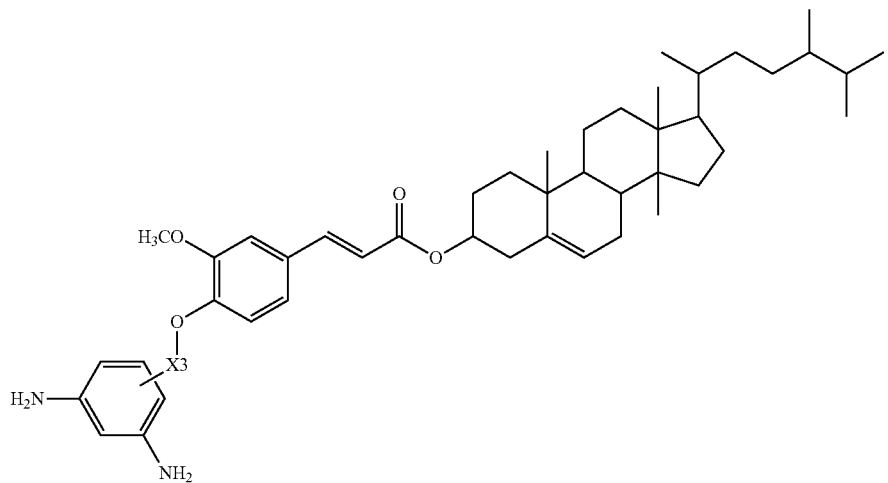
(A-11)
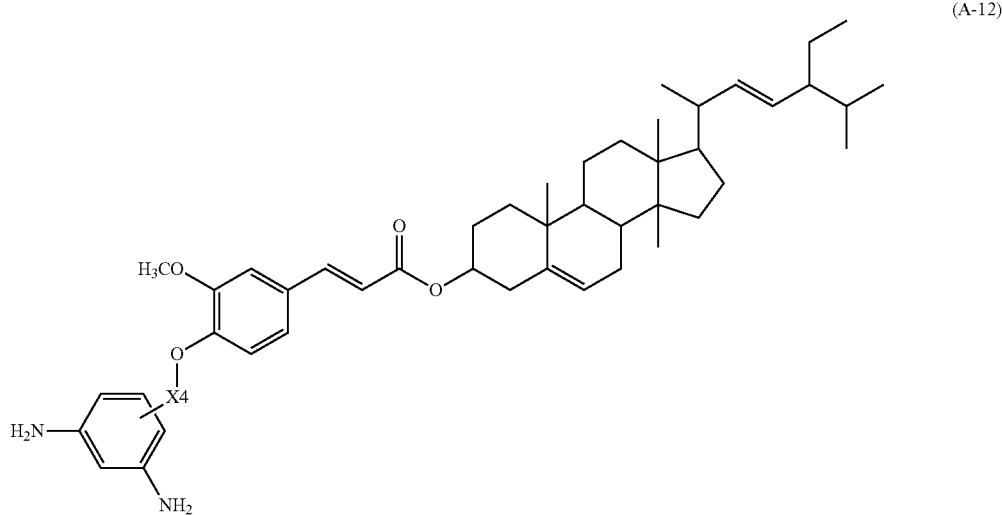
(A-12)
Herein, X1 to X4 are each a single-bonded or bivalent organic group.
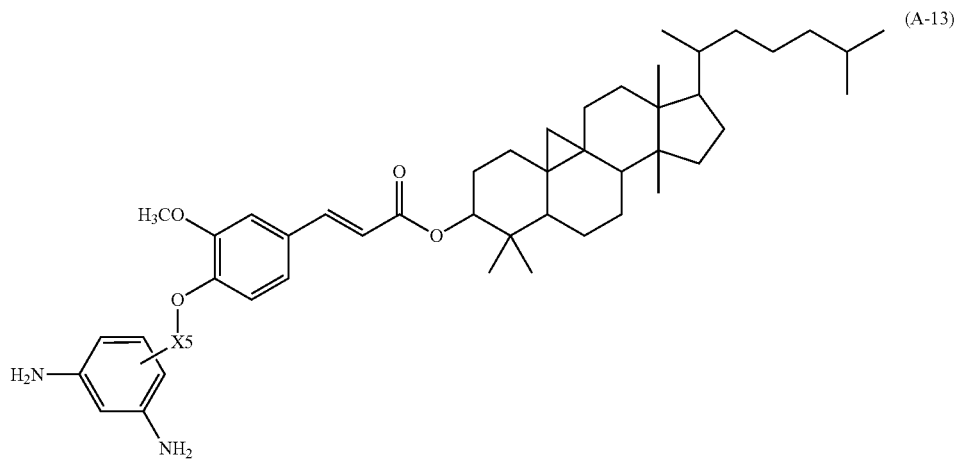
(A-13)

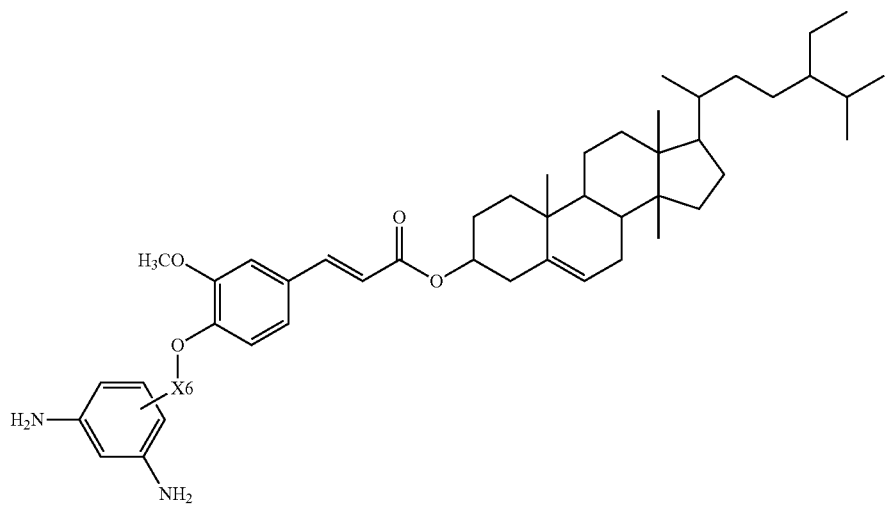
(A-14)
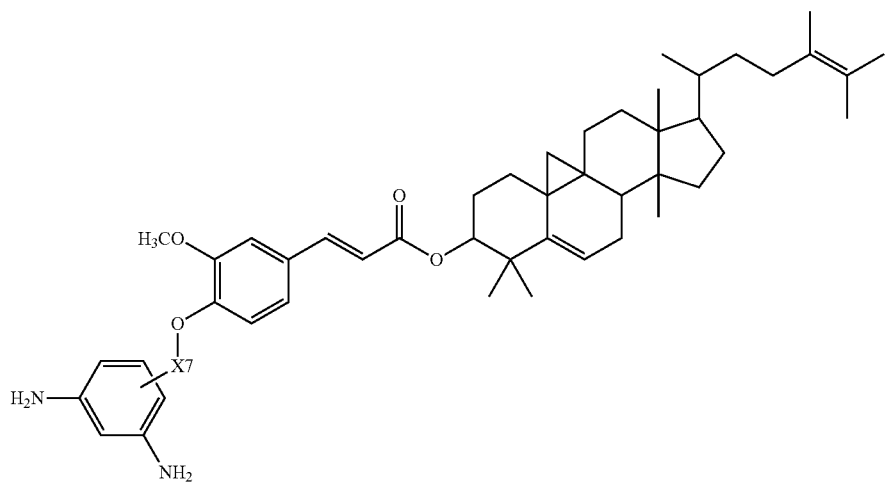
(A-15)
Herein, X5 to X7 are each a single-bonded or bivalent organic group.
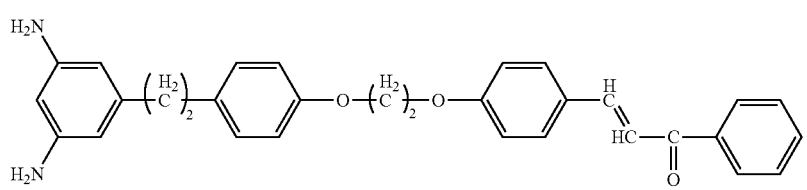
(A-16)
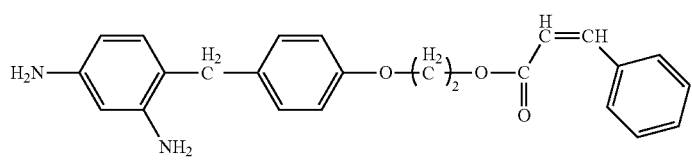
(A-17)

-continued
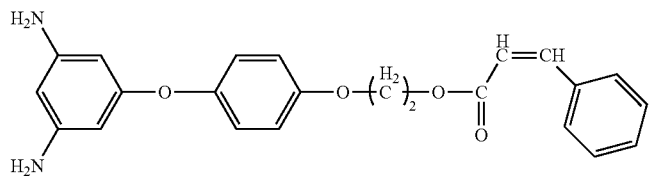
(A-18)
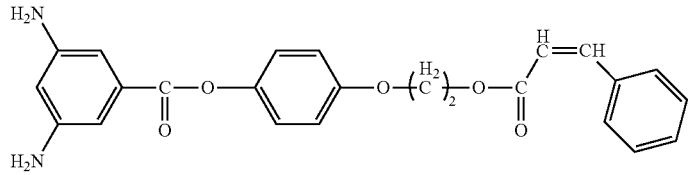
(A-19)
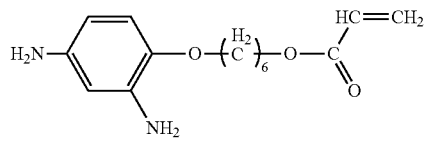
(A-20)
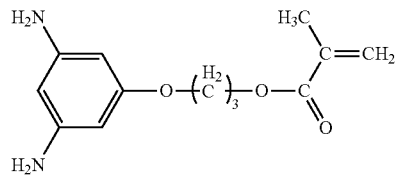
(A-21)
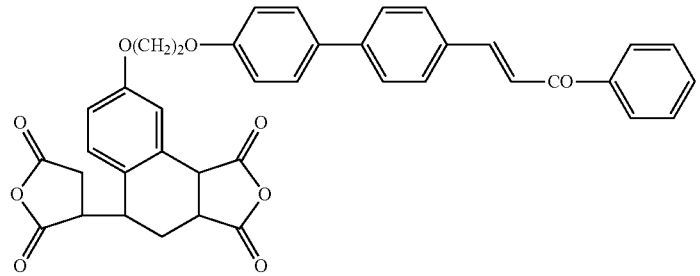
(a-1)
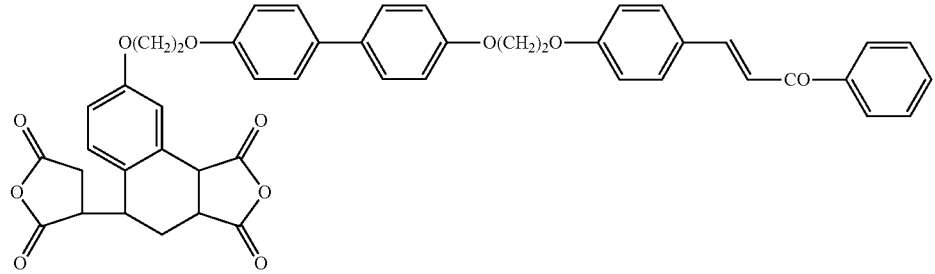
(a-2)
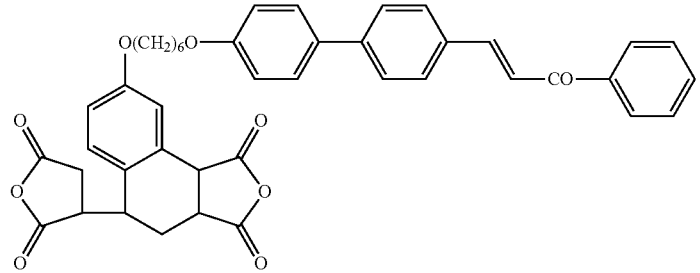
(a-3)

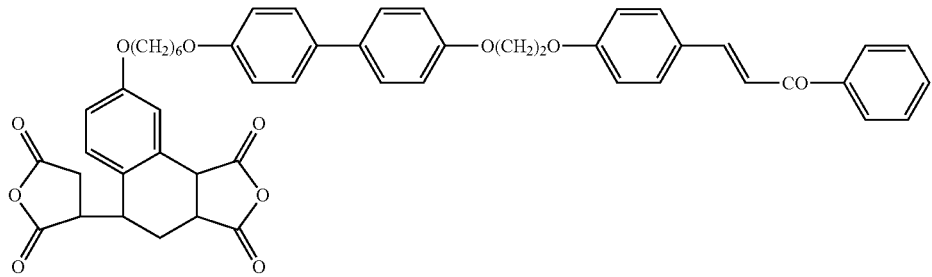
(a-4)
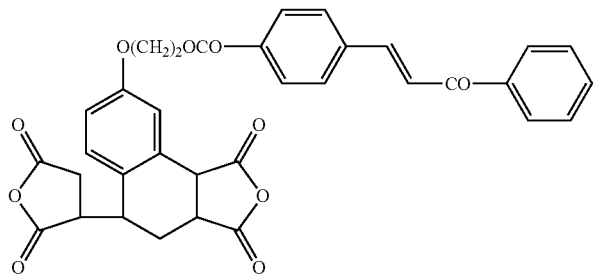
(a-5)
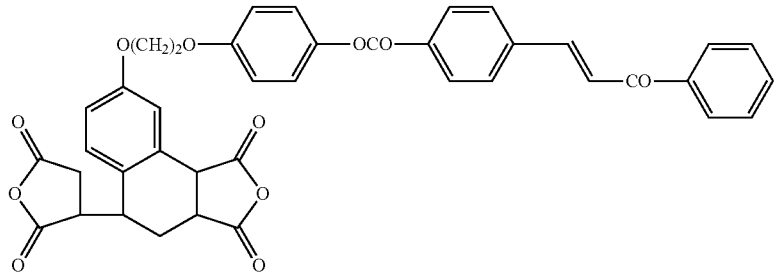
(a-6)
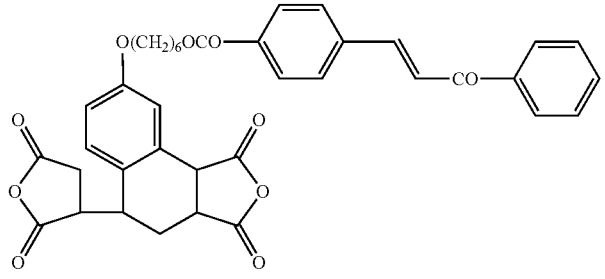
(a-7)
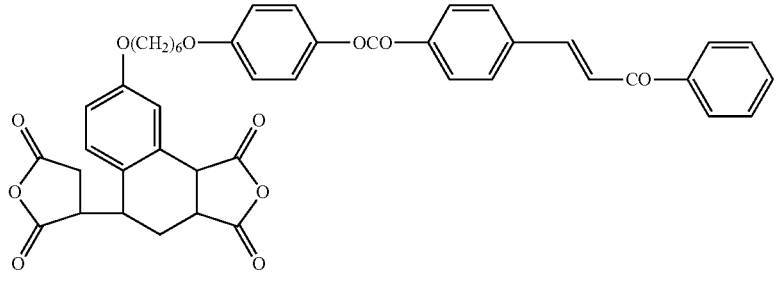
(a-8)

-continued
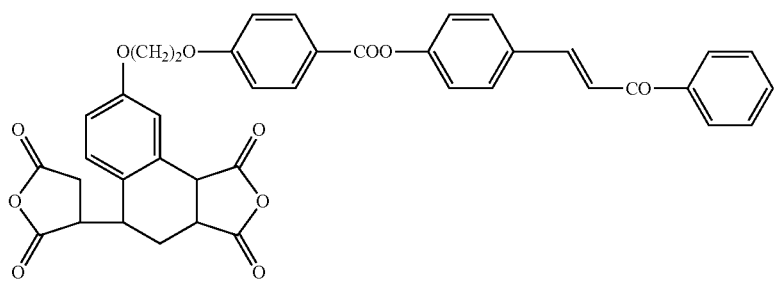
(a-9)
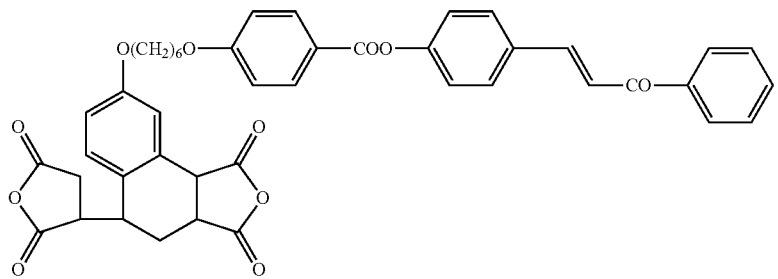
(a-10)
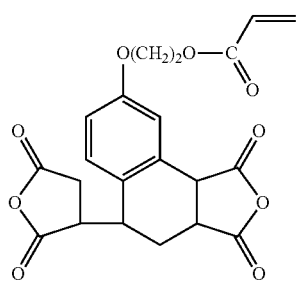
(a-11)
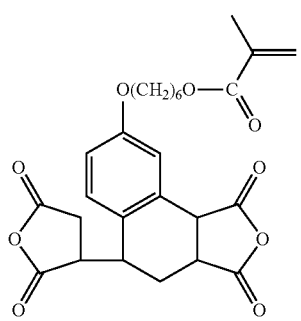
(a-12)
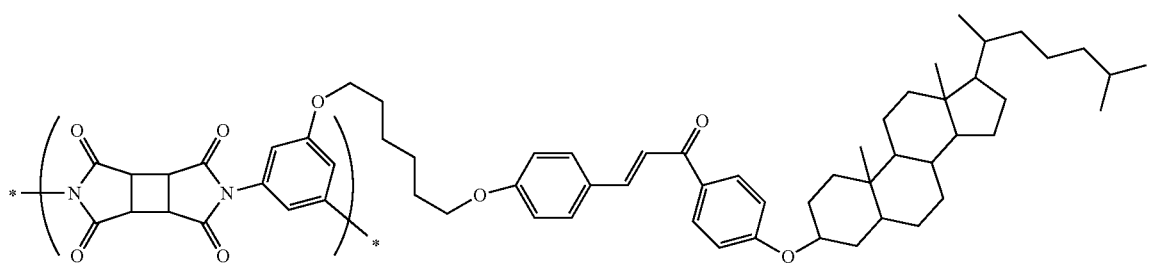
(F-1)
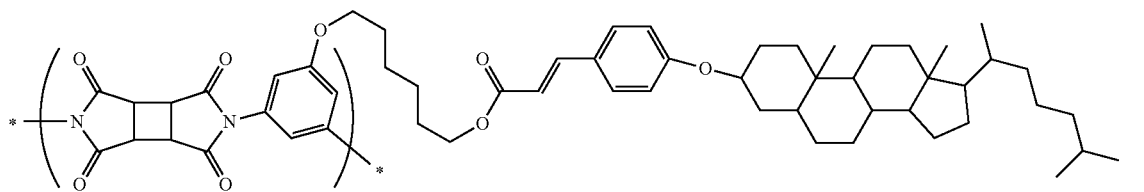
(F-2)
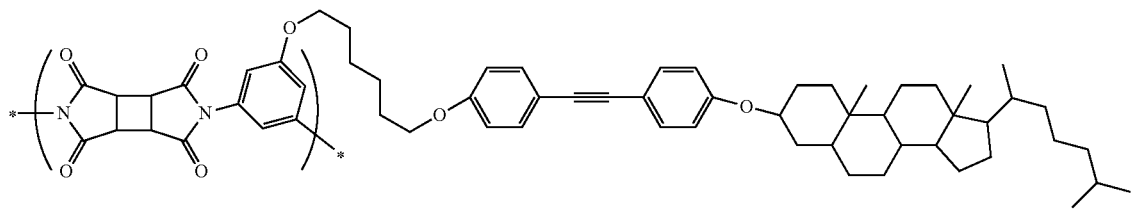
(F-3)

(F-4)
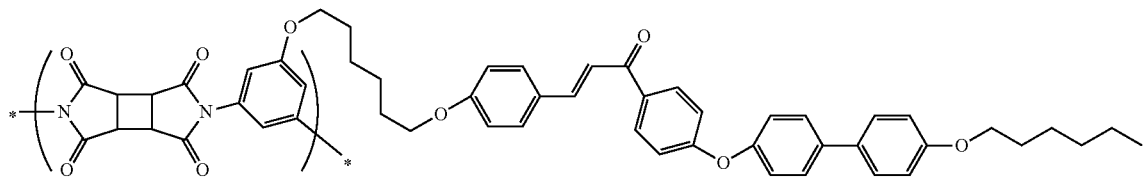
(F-5)
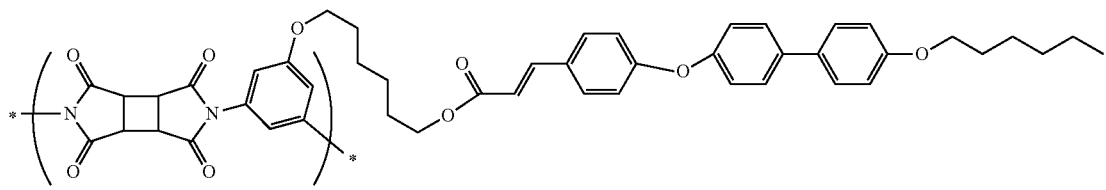
(F-6)
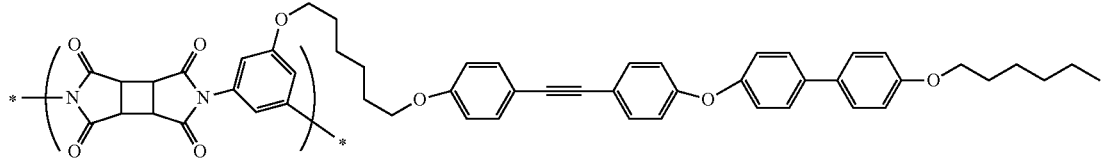
(F-7)
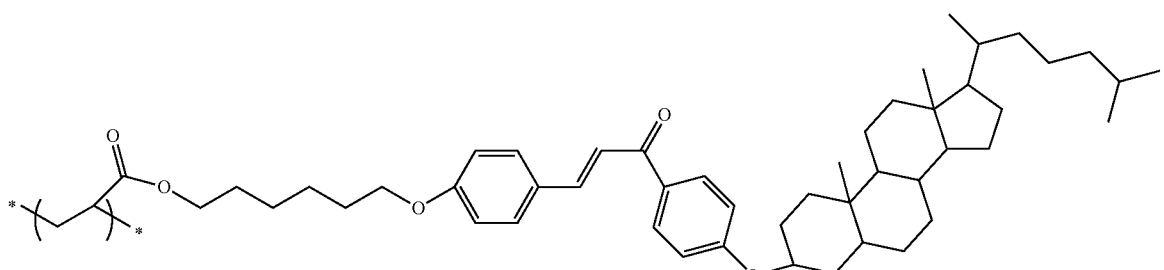
(F-8)
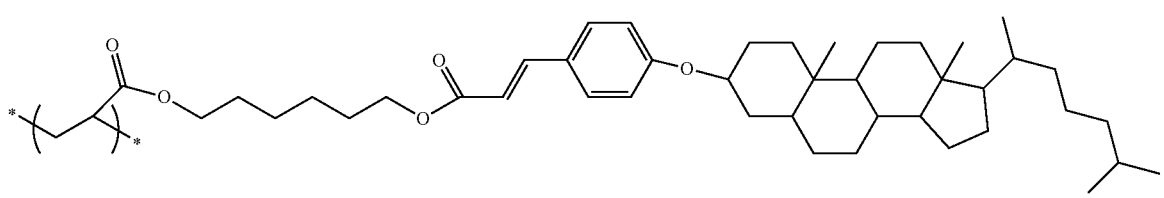
(F-9)
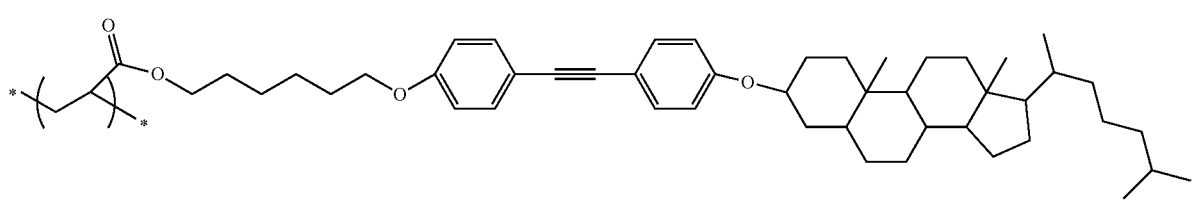
(F-10)
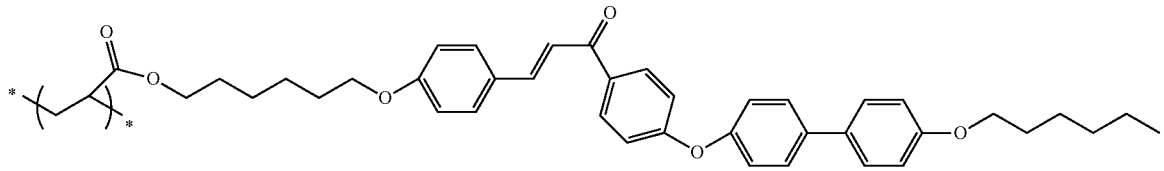

-continued
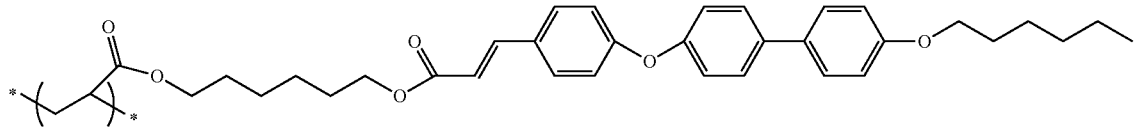
(F-11)
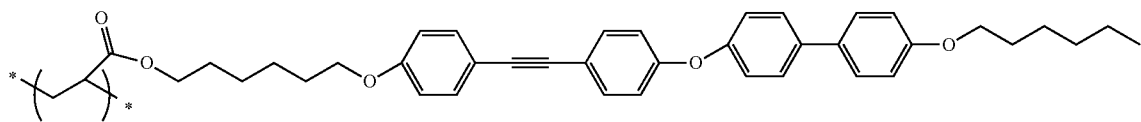
(F-12)
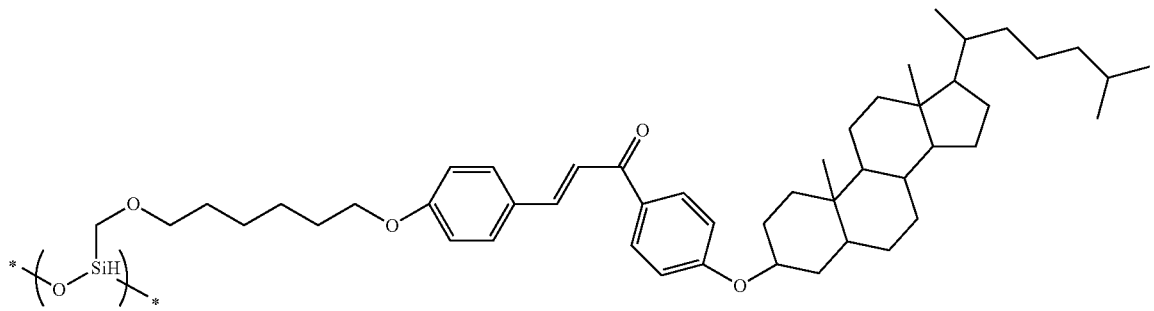
(F-13)
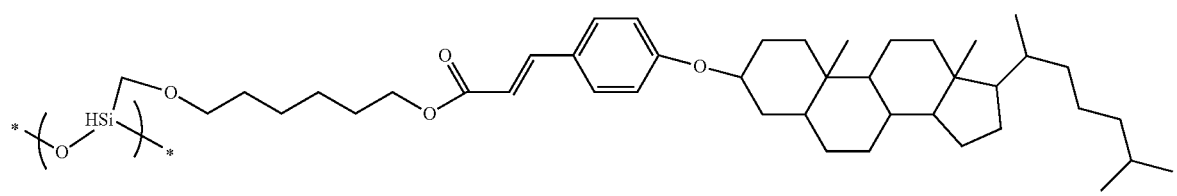
(F-14)
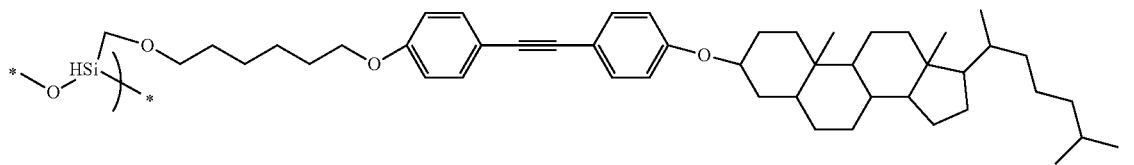
(F-15)
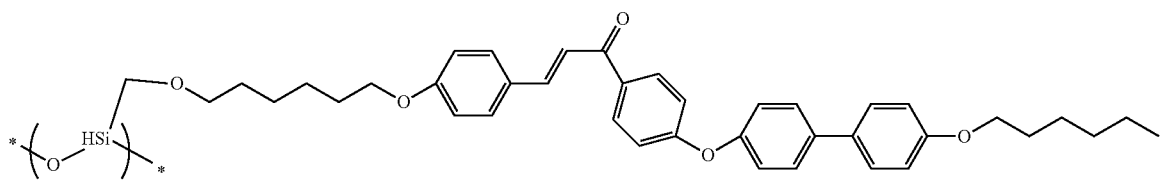
(F-16)
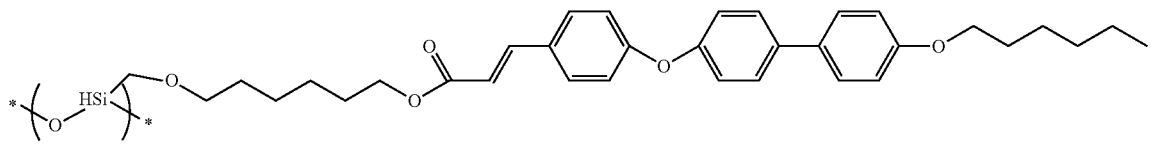
(F-17)

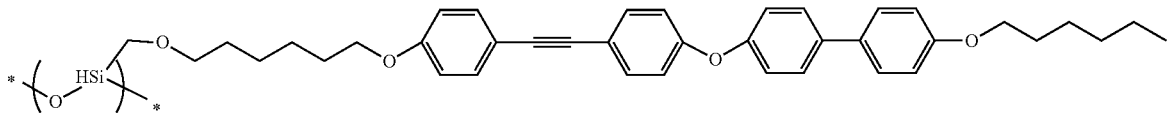

(F-18)

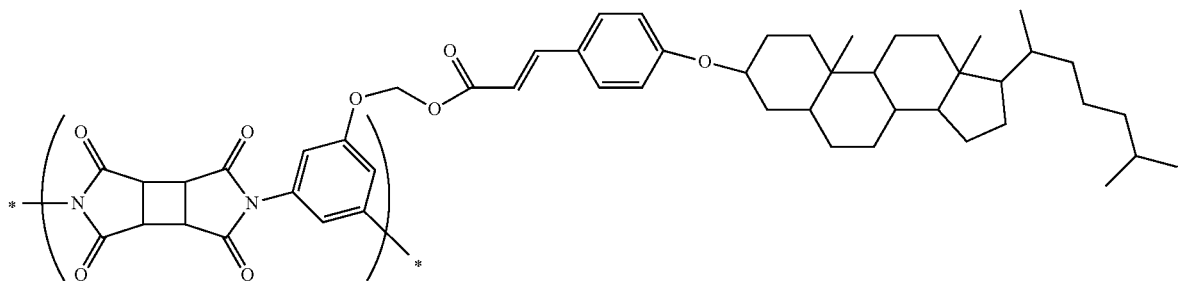

(F-19)

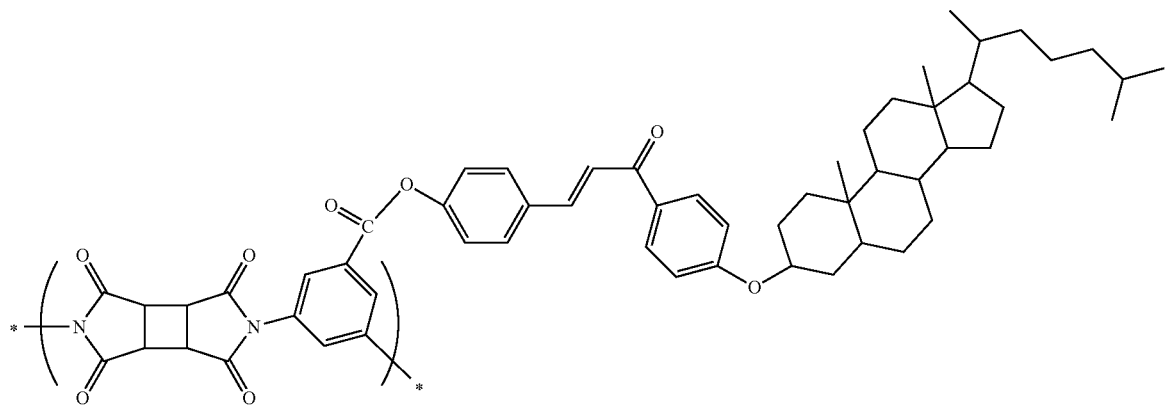

(F-20)

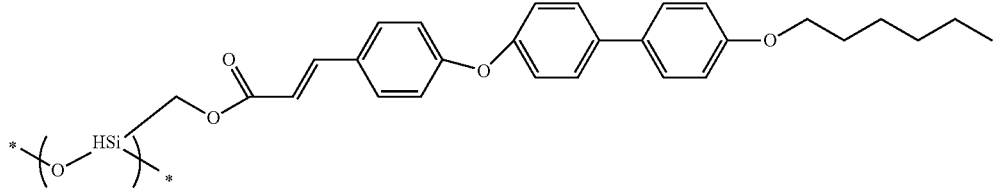

(F-21)

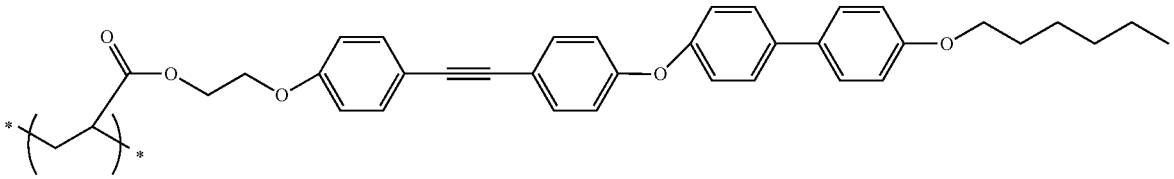

(F-22)

When the polyamic acid serving as the high-molecular compound precursor is synthesized such that the compound before alignment processing includes the vertical alignment inducing structure portion, any of compounds expressed by the formulae (B-1) to (B-36) and having the vertical alignment inducing structure portions may be used as the diamine compound and any of compounds having the vertical alignment inducing structure portions and expressed by the formulae (b-1) to (b-3) may be used as the tetracarboxylic dianhydride, in addition to the above-described compound having the cross-linkable functional group or the polymerizable functional group.

(B-1) 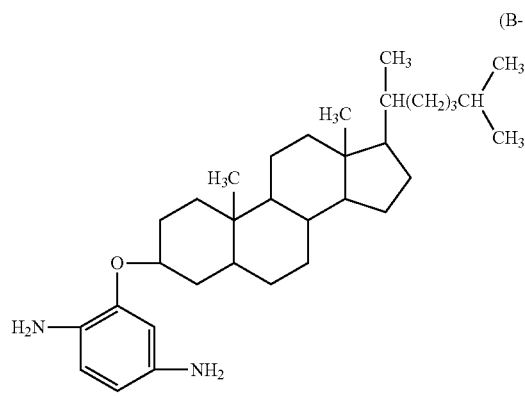
(B-2) 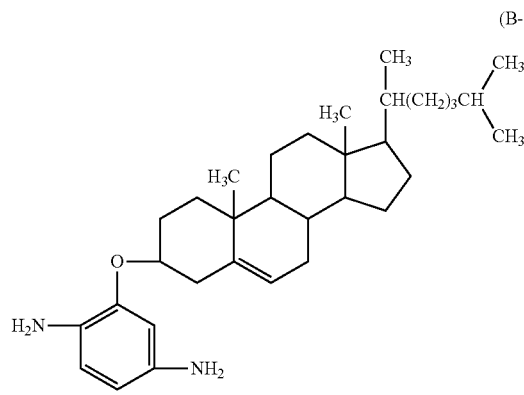
(B-3) 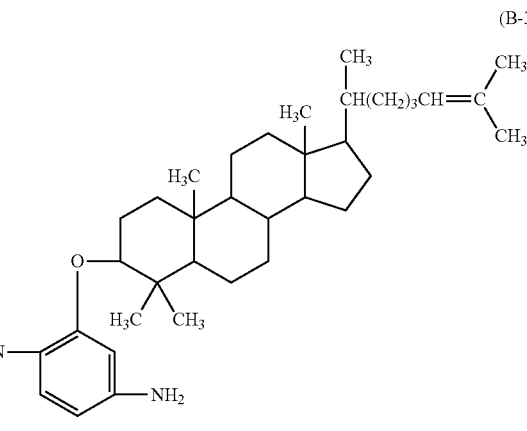
(B-4) 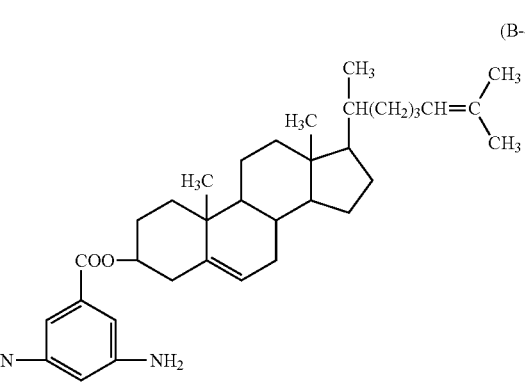
-continued
(B-5) 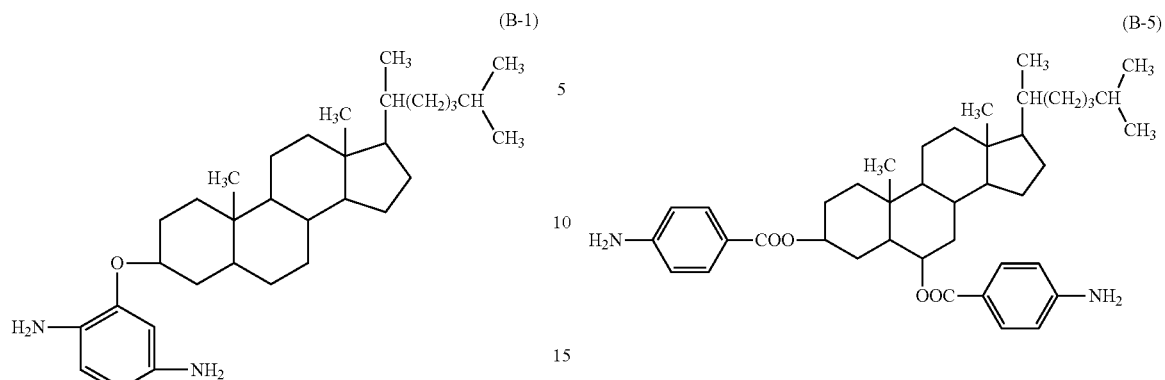
(B-6) 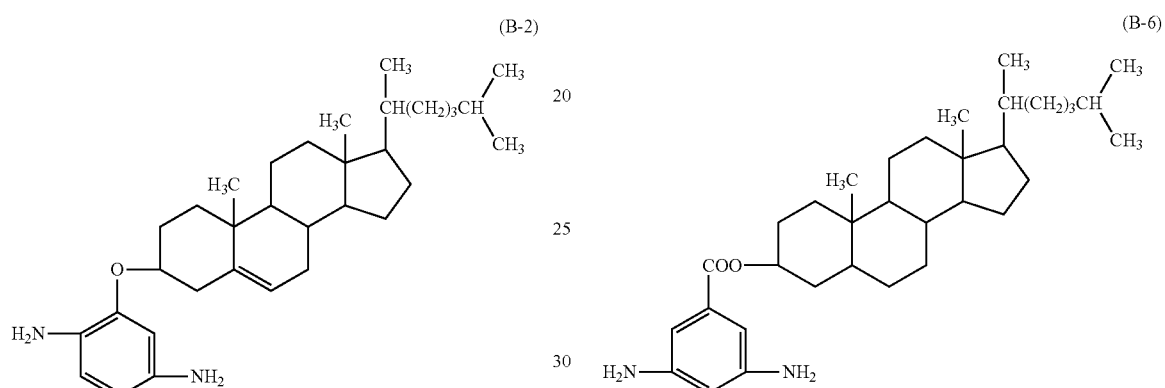
(B-7) 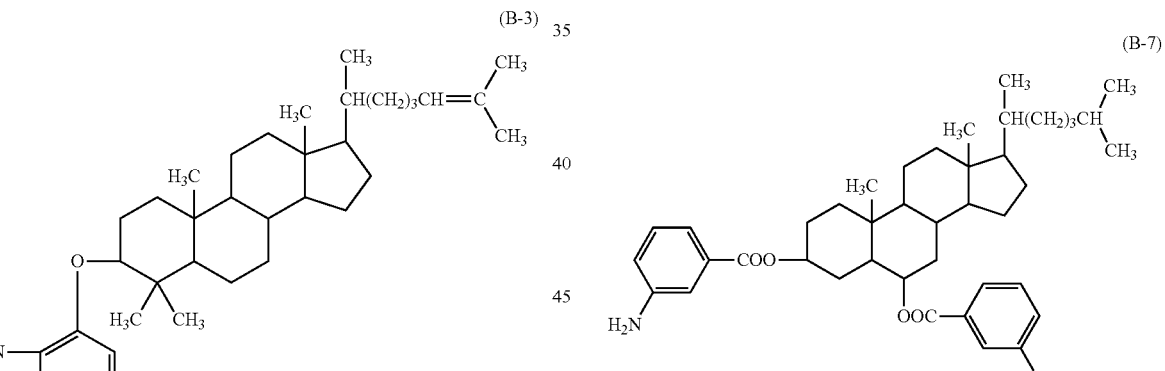
(B-8) 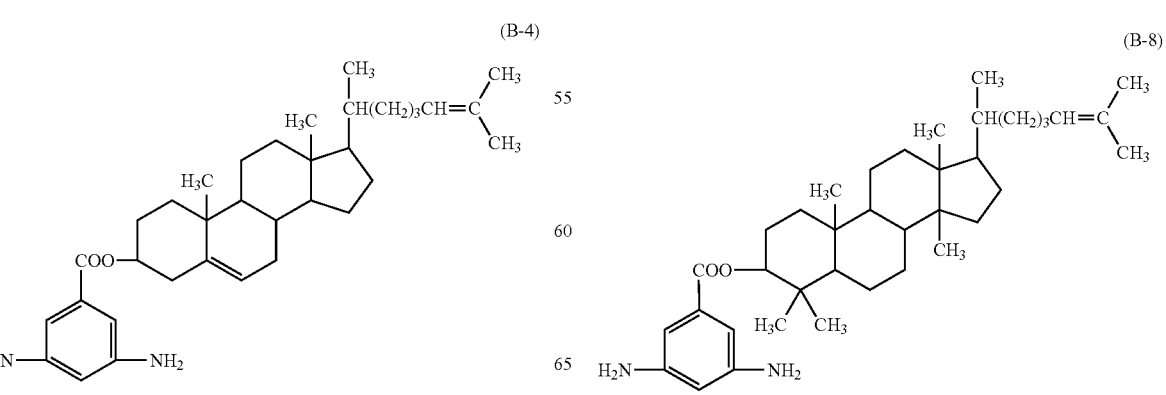

Herein, a4 to a6 are each an integer of 0 or more and 21 or less.

Herein, a4 is an integer of 0 or more and 21 or less.

(B-22) 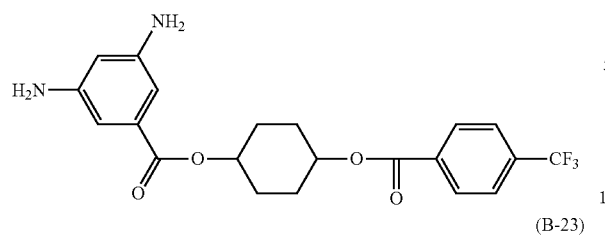
(B-26) 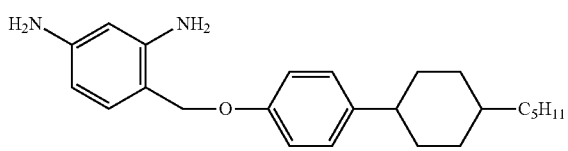
(B-23) 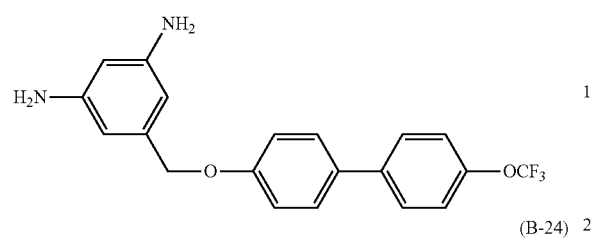
(B-27) 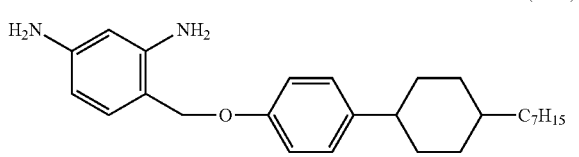
(B-24) 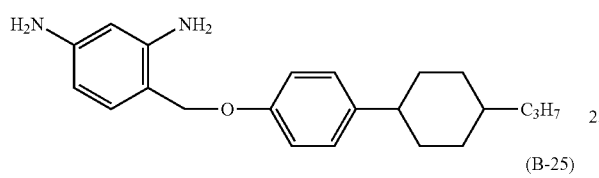
(B-28) 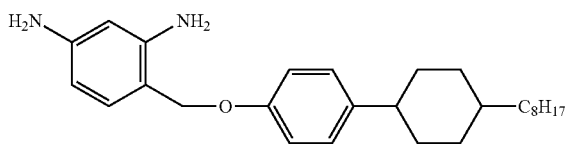
(B-25) 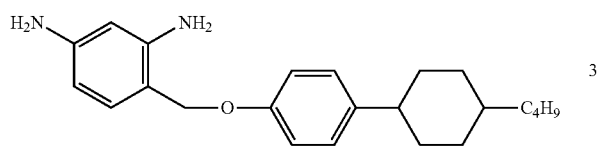
Herein, a4 is an integer of 0 or more and 21 or less.
(B-29) 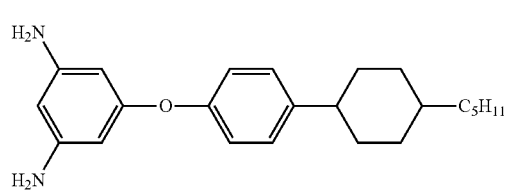
(B-30) 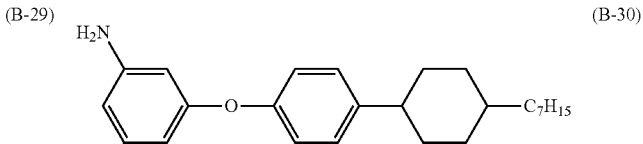
(B-31) 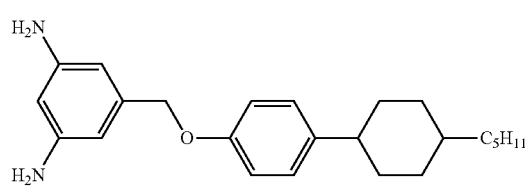
(B-32) 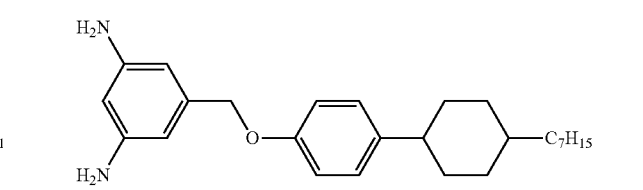
(B-33) 
(B-34) 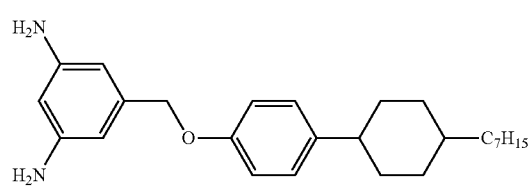
(B-35) 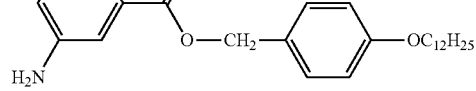
(B-36) 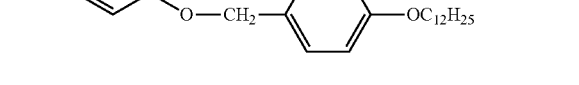
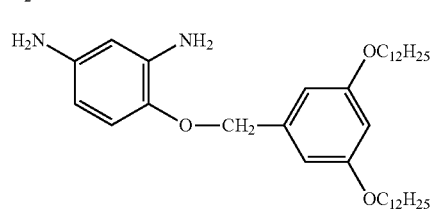

-continued

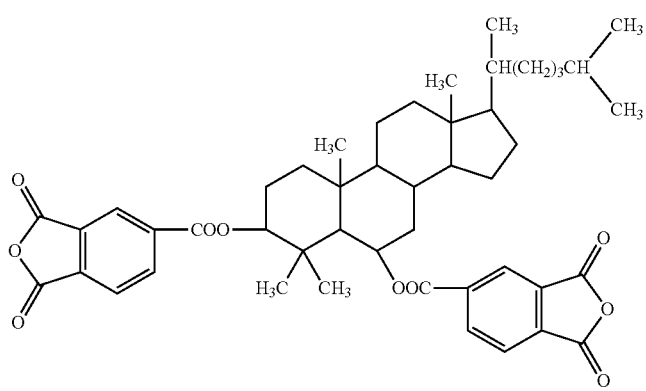

(b-1)

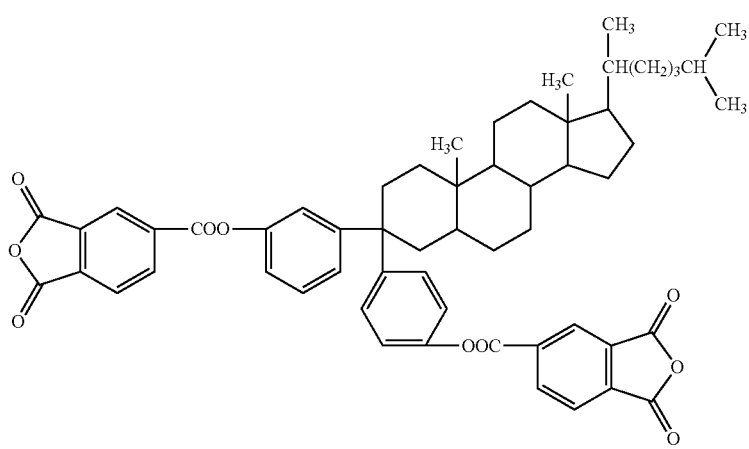

(b-2)

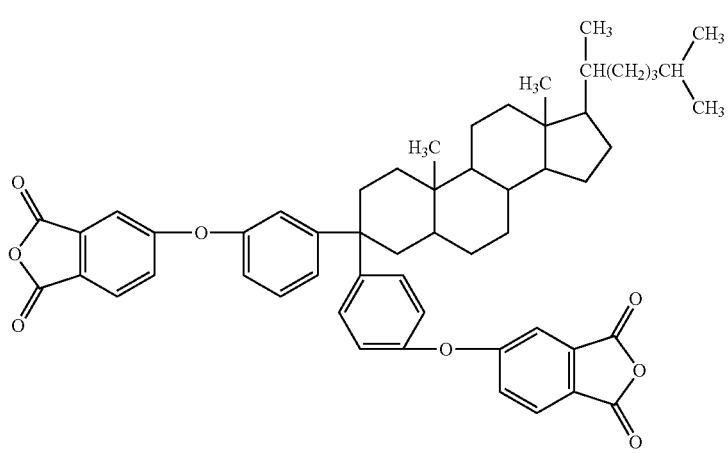

(b-3)

Also, when the polyamic acid serving as the high-molecular compound precursor is synthesized such that the compound before alignment processing includes the group expressed by the formula (1) together with the cross-linkable functional group or the polymerizable functional group, any of compounds expressed by the formulae (C-1) to (C-24) and being capable of being positioned along the liquid crystal molecule 41 may be used as the diamine compound in addition to the above-described compound having the cross-linkable functional group or the polymerizable functional group.

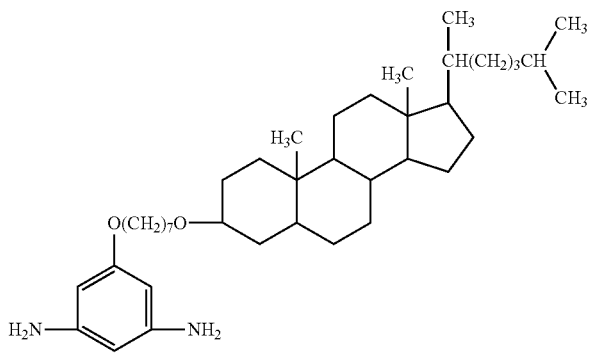
(C-1)
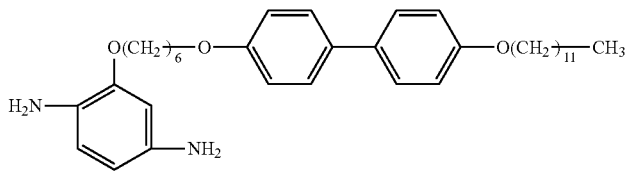
(C-2)
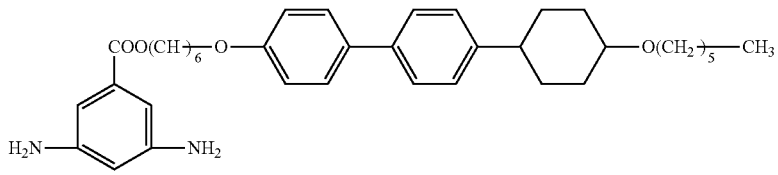
(C-3)
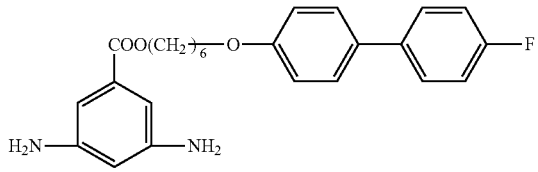
(C-4)
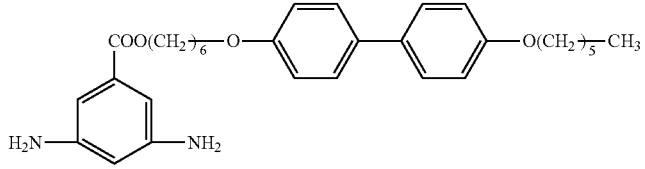
(C-5)
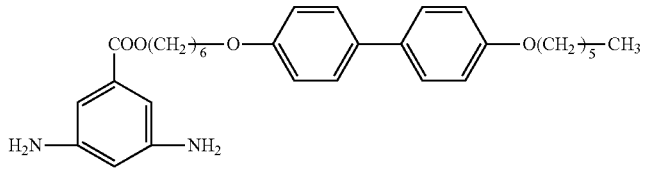
(C-6)
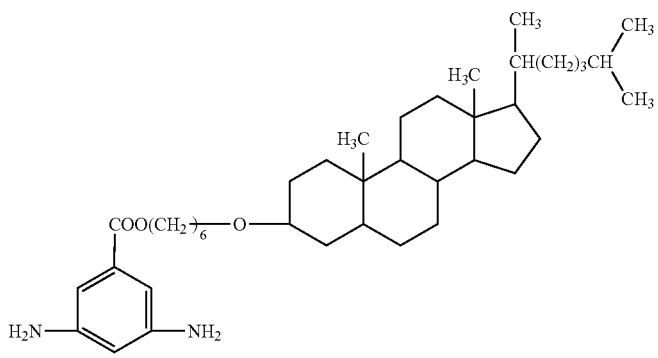
(C-7)

-continued
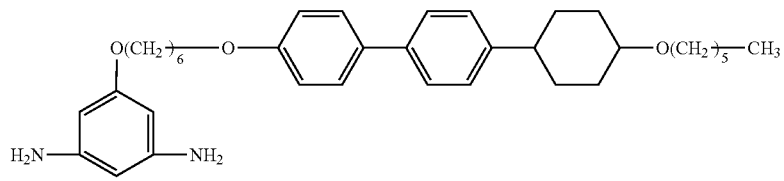 (C-8)
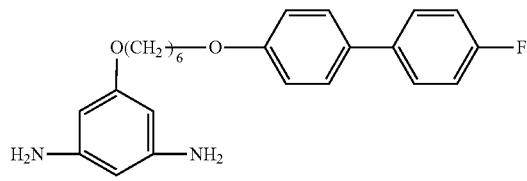 (C-9)
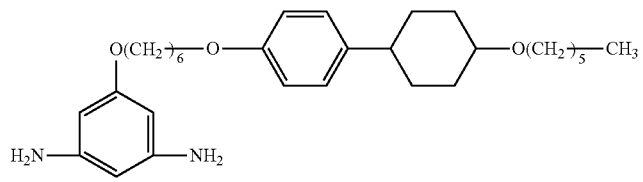 (C-10)
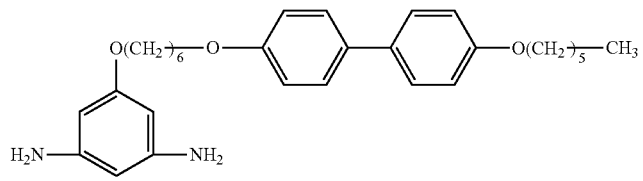 (C-11)
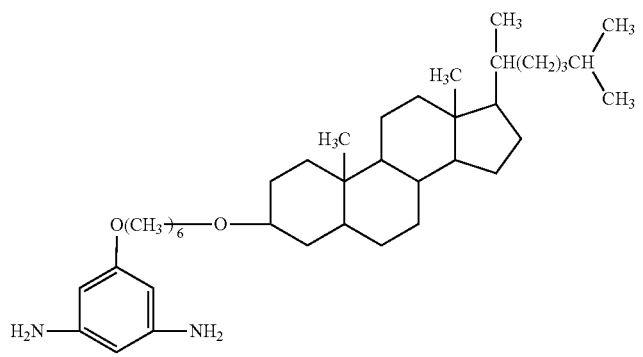 (C-12)
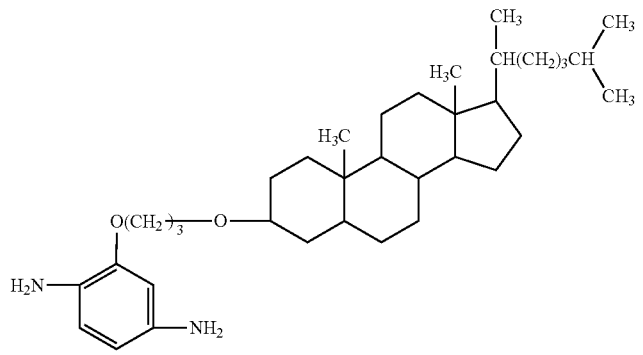 (C-13)

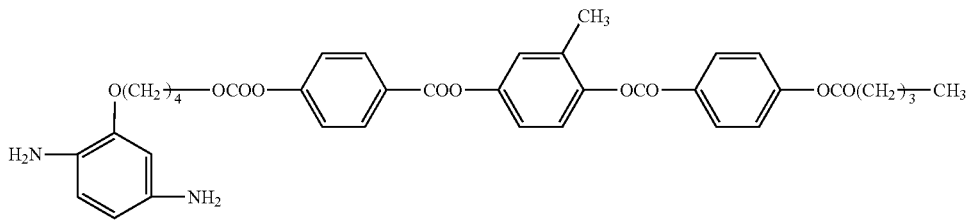
(C-14)
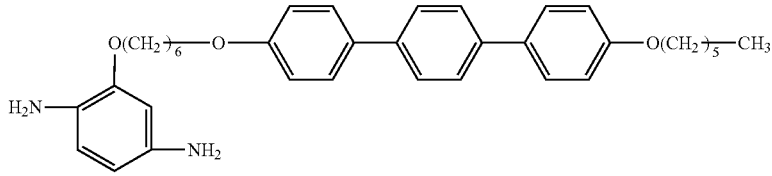
(C-15)
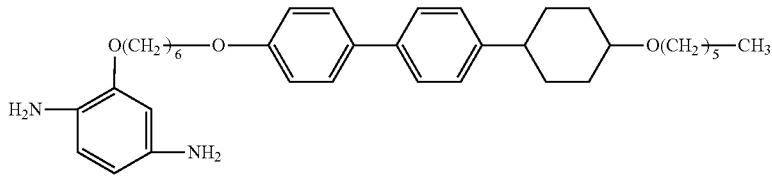
(C-16)
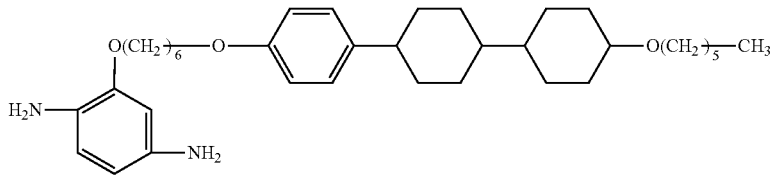
(C-17)
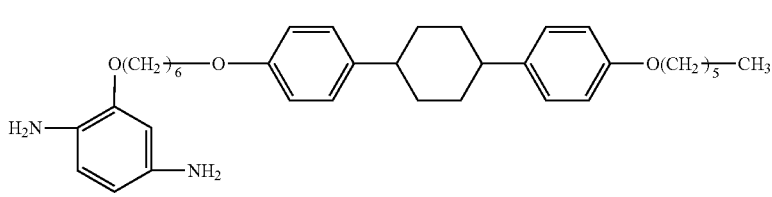
(C-18)
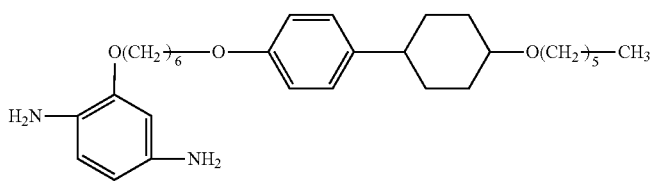
(C-19)
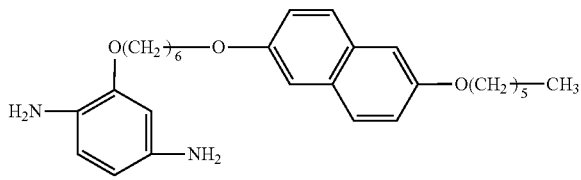
(C-20)
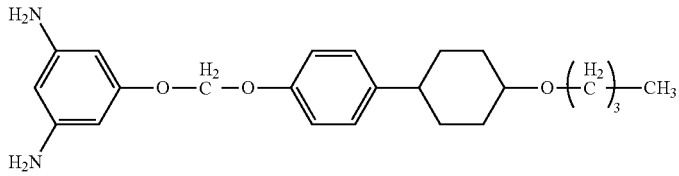
(C-21)

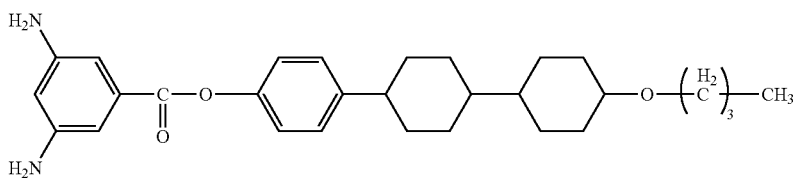
(C-22)

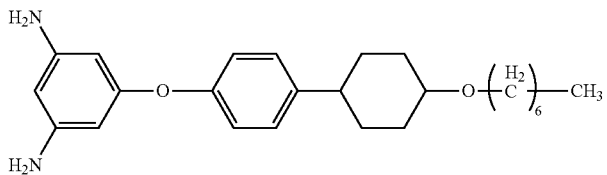
(C-23)

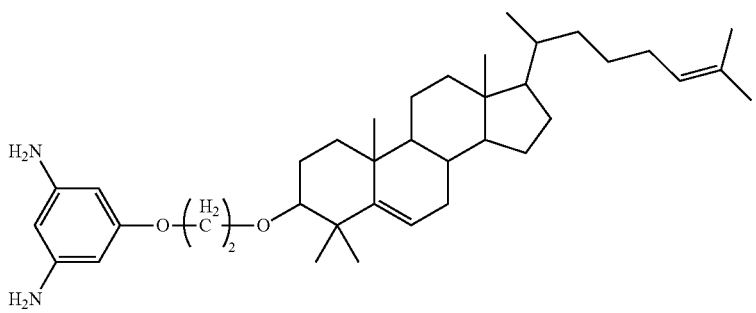
(C-24)

Further, when the polyamic acid serving as the high-molecular compound precursor is synthesized such that the compound before alignment processing includes the group expressed by the formula (2), any of compounds expressed by the formulae (D-1) to (D-11) and being capable of being positioned along the liquid crystal molecule 41 may be used as the diamine compound in addition to the above-described compound having the cross-linkable functional group or the polymerizable functional group.

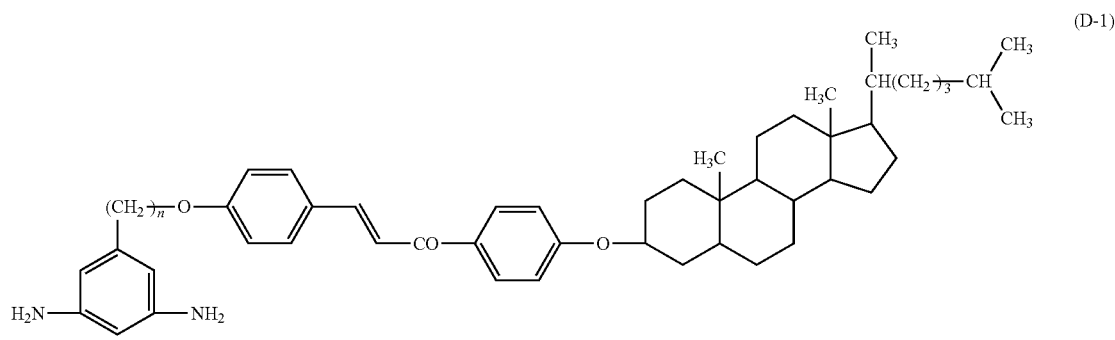
(D-1)

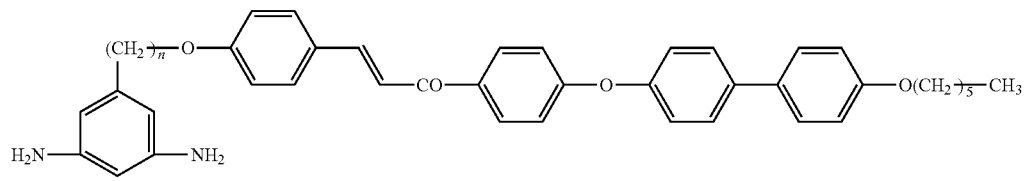
(D-2)

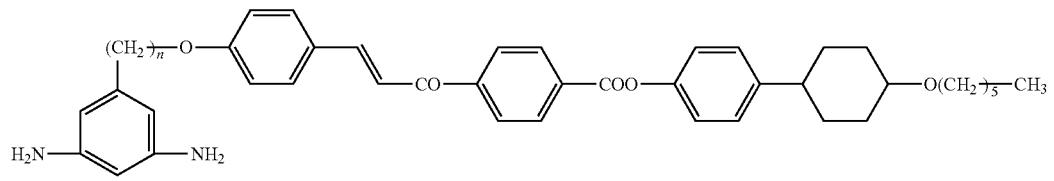
(D-3)

(D-4)
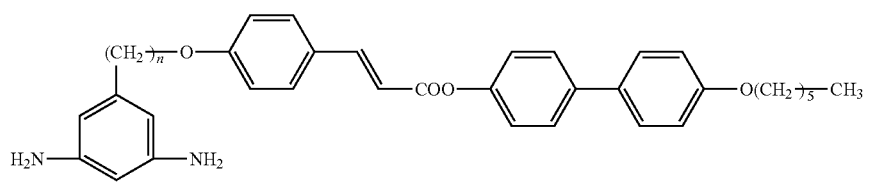
(D-5)
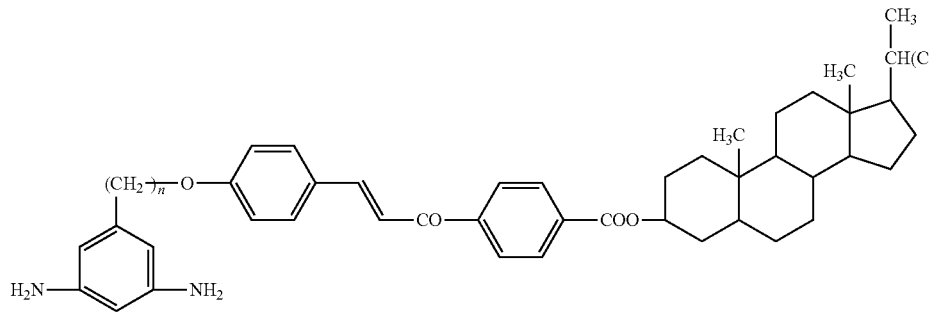
(D-6)
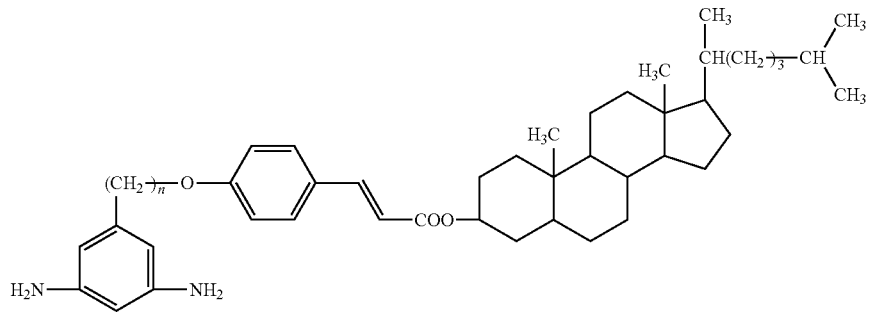
(D-7)
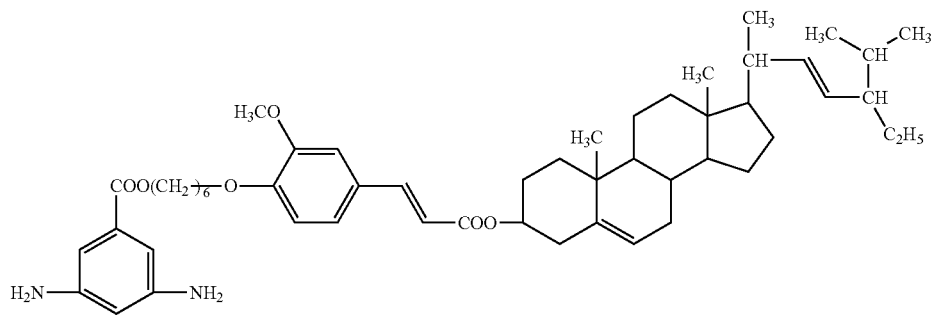
Herein, n is an integer of 3 or more and 20 or less.
(D-8)
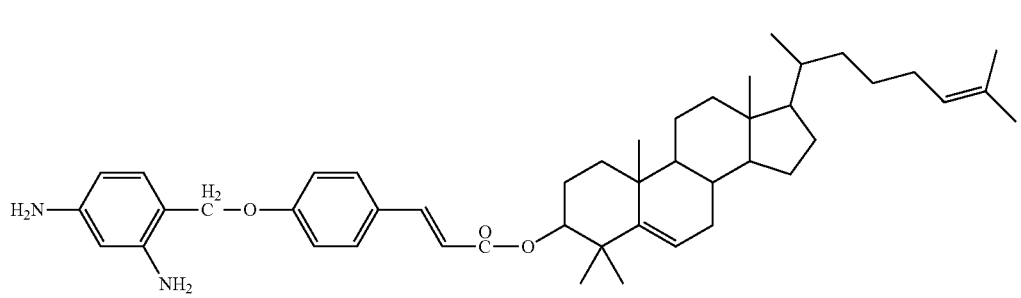

-continued

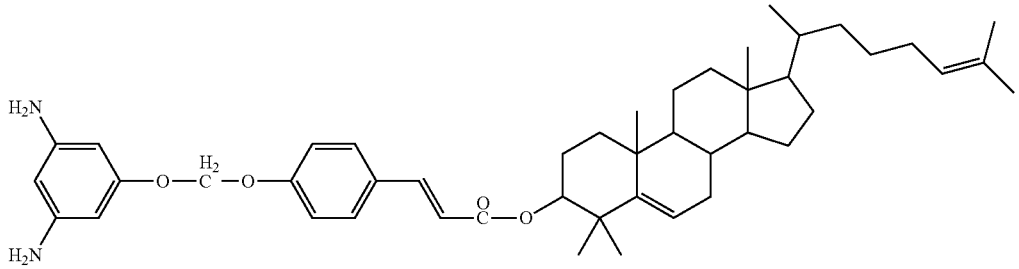
(D-9)

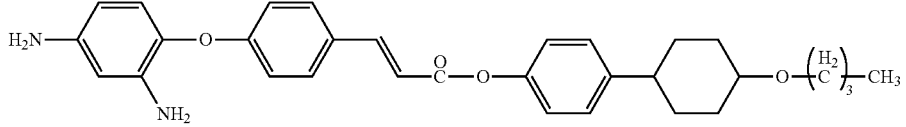
(D-10)

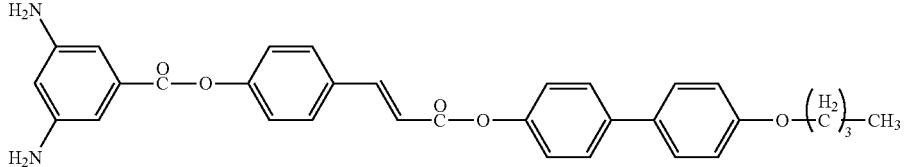
(D-11)

Moreover, when the polyamic acid serving as the high-molecular compound precursor is synthesized such that the compound before alignment processing includes, as R2 in the formula (3), two types of structures, i.e., the structure including the vertical alignment inducing structure portion and the structure including the cross-linkable functional group or the polymerizable functional group, the diamine compound and the tetracarboxylic dianhydride are selected, by way of example, as follows. At least one type of the compounds expressed by the formulae (A-1) to (A-21) and each having the cross-linkable functional group or the polymerizable functional group, at least one type of the compounds expressed by the formulae (B-1) to (B-36) and (b-1) to (b-3) and each having the vertical alignment inducing structure portion, and at least one type of the tetracarboxylic dianhydrides expressed by the following formulae (E-1) to (E-28) are used. Be it noted that R1 and R2 in the formula (E-23) are the same or different alkyl groups, alkoxy groups, or halogen atoms. The type of halogen atom is arbitrary.

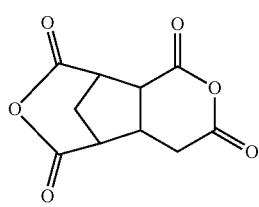
(E-1)

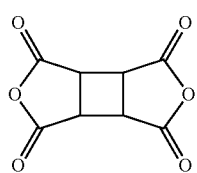
(E-2)

-continued

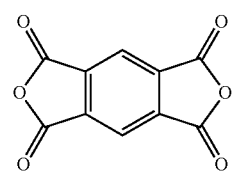
(E-3)

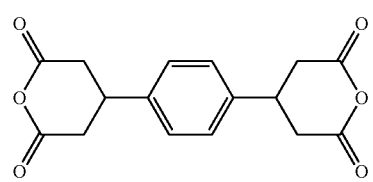
(E-4)

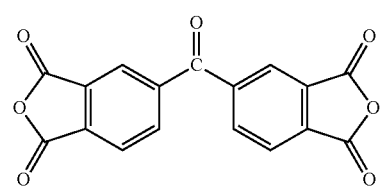
(E-5)

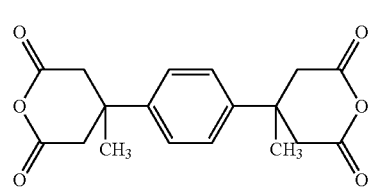
(E-6)

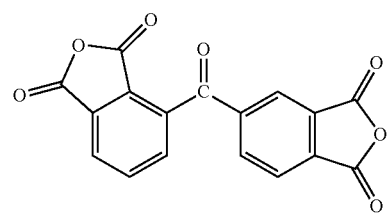
(E-7)

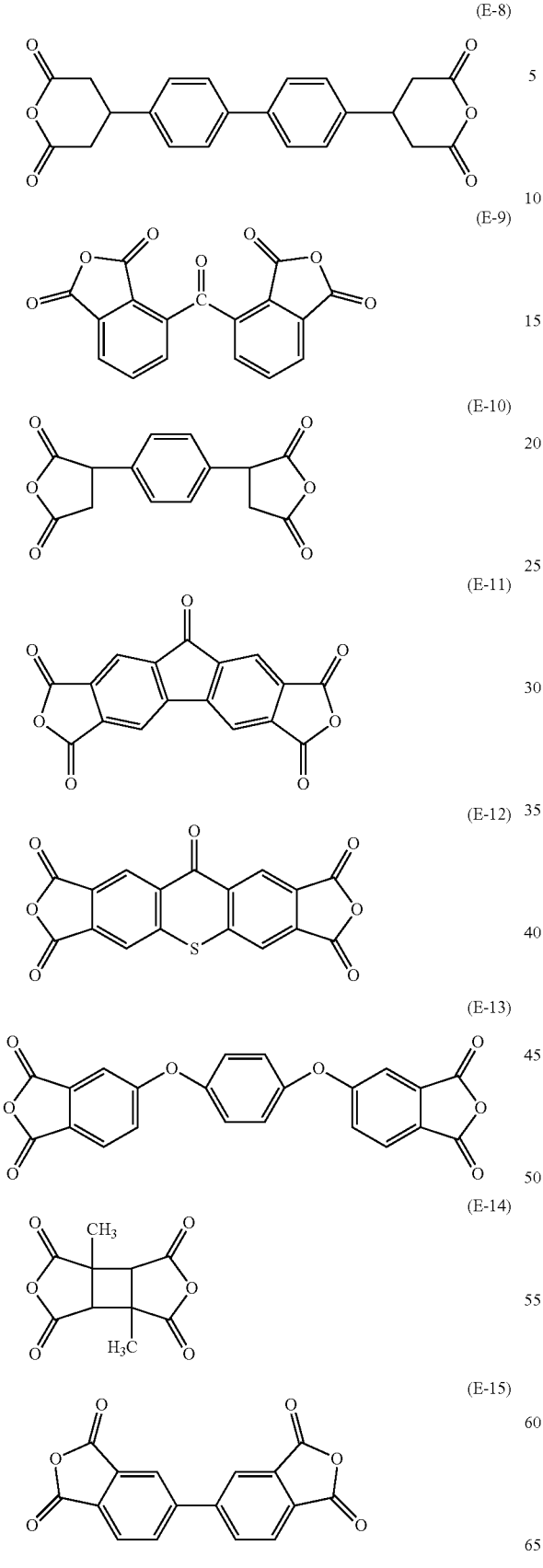
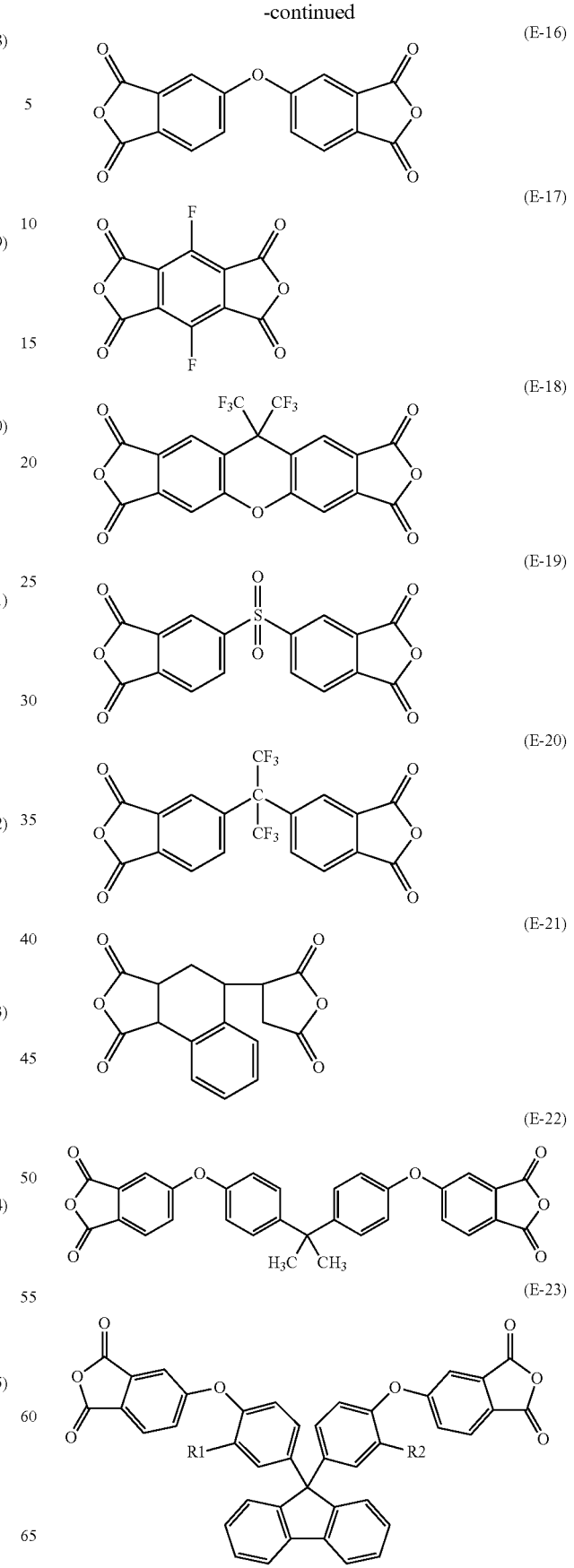

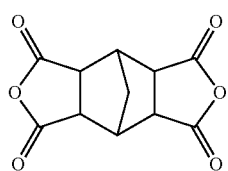

(E-24)

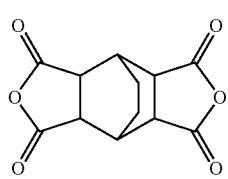

(E-25)

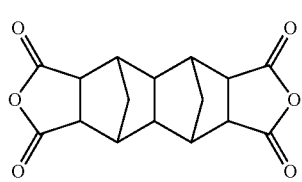

(E-26)

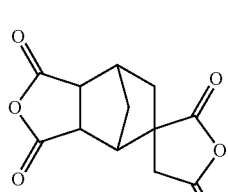

(E-27)

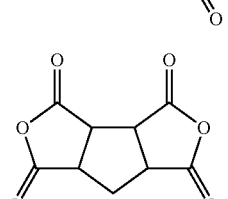

(E-28)

Herein, R1 and R2 are each an alkyl group, an alkoxy group, or a halogen atom.

Still further, when the polyamic acid serving as the high-molecular compound precursor is synthesized such that the compound before alignment processing includes, as R2 in the formula (3), two types of structures, i.e., the structure including the group expressed by the formula (1) and the structure including the cross-linkable functional group or the polymerizable functional group, the diamine compound and the tetracarboxylic dianhydride are selected, by way of example, as follows. At least one type of the compounds expressed by the formulae (A-1) to (A-21) and each having the cross-linkable functional group or the polymerizable functional group, at least one type of the compounds expressed by the formulae (C-1) to (C-24), and at least one type of the tetracarboxylic dianhydrides expressed by the formulae (E-1) to (E-28) are used.

Still further, when the polyamic acid serving as the high-molecular compound precursor is synthesized such that the compound before alignment processing includes, as R2 in the formula (3), two types of structures, i.e., the structure including the group expressed by the formula (2) and the structure including the cross-linkable functional group or the polymerizable functional group, the diamine compound and the tetracarboxylic dianhydride are selected, by way of example, as follows. At least one type of the compounds expressed by the formulae (A-1) to (A-21) and each having the cross-linkable functional group or the polymerizable functional group, at least one type of the compounds expressed by the formulae (D-1) to (D-11), and at least one type of the tetracarboxylic dianhydrides expressed by the formulae (E-1) to (E-28) are used.

The content of the compound before alignment processing or the high-molecular compound precursor serving as the compound before alignment processing, which is contained in the alignment film material, is preferably 1% by weight or more and 30% by weight or less and more preferably 3% by weight or more and 10% by weight or less. Additionally, a photopolymerization initiator, etc. may be mixed in the alignment film material, when necessary.

The prepared alignment film material is coated or printed on the TFT substrate 20 and the CF substrate 30 so as to cover the pixel electrodes 20B, the first slit portions 21, the counter electrodes 30B, and the second slit portions 31, and is then subjected to heat treatment. The temperature of the heat treatment is preferably 80° C. or higher and more preferably 150° C. or higher and 200° C. or lower. In the heat treatment, the heating temperature may be changed step by step. With the heat treatment, the solvent contained in the coated or printed alignment film material is evaporated, and the alignment films 22 and 32 each including the high-molecular compound (i.e., the compound before alignment processing), which has the cross-linkable functional group or the polymerizable functional group in at least one side chain, are formed. Thereafter, the alignment films may be further subjected to additional treatment, such as rubbing, when necessary.

Figure 8:
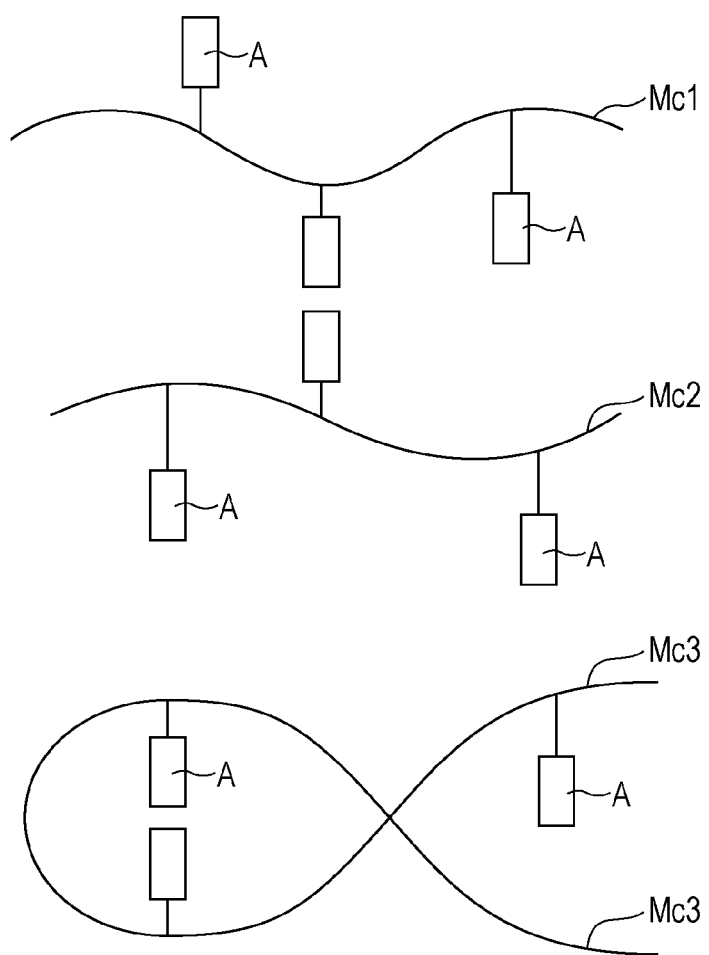
FIG. 8 illustrates states of high-molecular compounds (compounds before alignment processing) in an alignment film to explain the method of manufacturing the liquid crystal display device illustrated in FIG. 1.

It is here thought that the compound before alignment processing in each of the alignment films 22 and 32 is in the state illustrated in FIG. 8. More specifically, the compound before alignment processing includes a main chain Mc (one of Mc1 to Mc3) and cross-linkable functional groups A or polymerizable functional groups A bonded as side chains to the main chain Mc. The main chains Mc1 to Mc3 are present in the state not coupled to each other. In that state, the cross-linkable functional groups A or the polymerizable functional groups A are oriented at random due to thermal motion.

Next, the TFT substrate 20 and the CF substrate 30 are arranged such that the alignment films 22 and 32 are positioned to face each other. The liquid crystal layer 40 including the liquid crystal molecules 41 is formed in a sealed-off state between the alignment films 22 and 32 (step S102). In more detail, spacer projections, such as plastic beads, for securing a cell gap are applied (sprayed) to the surface of one of the TFT substrate 20 and the CF substrate 30 on which the alignment films 22 or 32 is formed, and a sealing portion is printed on the substrate surface by using, e.g., an epoxy adhesive, by screen printing, for example. Thereafter, as illustrated in FIG. 9, the TFT substrate 20 and the CF substrate 30 are attached to each other with the spacer projections and the sealing portion interposed therebetween such that the alignment films 22 and 32 are positioned to face each other. A liquid crystal material including the liquid crystal molecules 41 is poured into a space between both the substrates. The liquid crystal material is then sealed in between the TFT substrate 20 and the CF substrate 30 by curing the sealing portion with heating, for example. FIG. 9 illustrates the structure along a cross-section of the liquid crystal layer 40 formed in the sealed-off state between the alignment films 22 and 32.

Next, as illustrated in FIG. 10, a voltage V1 is applied between the pixel electrodes 20B and the counter electrodes 30B by using a voltage applying unit (step S103). The voltage V1 is, e.g., 3 V to 30 V. As a result, an electric field is generated in a direction forming a predetermined angle with respect to the surfaces of the first substrate 20 and the second substrate 30, whereby the liquid crystal molecules 41 are aligned in the state inclined toward a predetermined direction from the direction perpendicular to the first substrate 20 and the second substrate 30. More specifically, the azimuth angle (deflection angle) of the liquid crystal molecule 41 in such a state is specified depending on the intensity and the direction of the electric field and the molecular structure of the alignment film material, and a polar angle (zenithal angle) thereof is specified depending on the intensity of the electric field and the molecular structure of the alignment film material. The inclination angle of the liquid crystal molecule 41 is substantially equal to each of the pre-tilts $\theta_1$ or $\theta_2$ that are given respectively, in a later-described step, to the liquid crystal molecule 41A held on the first alignment film 22 near the interface between the liquid crystal layer 40 and the first alignment film 22 and to the liquid crystal molecule 41B held on the second alignment film 32 near the interface between the liquid crystal layer 40 and the second alignment film 32. Accordingly, values of the pre-tilts $\theta_1$ and $\theta_2$ given to the liquid crystal molecules 41A and 41B can be controlled by appropriately adjusting a value of the voltage V1.

Further, as illustrated in FIG. 11, in the state where the voltage V1 is continuously applied, the alignment films 22 and 32 are irradiated with an energy ray (e.g., an ultraviolet ray UV) from the outer side of the TFT substrate 20, for example. In other words, the alignment films 22 and 32 are irradiated with the ultraviolet ray under application of an electric field or a magnetic field to the liquid crystal layer 40 so that the liquid crystal molecules 41 are aligned in an oblique direction with respect to the surfaces of the pair of substrates 20 and 30. With the UV irradiation, the cross-linkable functional groups or the polymerizable functional groups contained in the compounds before alignment processing in the alignment films 22 and 32 are caused to develop a reaction to cross-link the compounds before alignment processing (step S104). In such a way, the directions in which the liquid crystal molecules 41 are to make response are memorized in the compounds after alignment processing, and the pre-tilts are given to the liquid crystal molecules 41 near the alignment films 22 and 32. As a result, the compounds after alignment processing are formed in the alignment films 22 and 32, and the pre-tilts $\theta_1$ and $\theta_2$ are given in the non-driven state to the liquid crystal molecules 41A and 41B that are positioned respectively in the liquid crystal layer 40 near the interfaces between the liquid crystal layer 40 and the alignment films 22, 32. The ultraviolet ray UV is preferably an ultraviolet ray containing light components at wavelengths of about 295 nm to 365 nm at a higher proportion. The reason is that, if an ultraviolet ray containing light components at wavelengths shorter than the above-mentioned range in larger amount is used, there is a risk that the liquid crystal molecules 41 may be photo-decomposed and degraded. While the ultraviolet ray UV is cast for irradiation to the liquid crystal layer 40 from the outer side of the TFT substrate 20 in the illustrated example, it may be cast from the outer side of the CF substrate 30 or from the outer sides of both the TFT substrate 20 and the CF substrate 30. Anyway, the ultraviolet ray UV is preferably cast from the outer side of the substrate, which has a higher transmittance. When the ultraviolet ray UV is cast from the outer side of the CF substrate 30, there is a risk that the cross-linking reaction may become hard to develop depending on the wavelength range of the ultraviolet ray UV because the ultraviolet ray UV is absorbed by the color filter. For that reason, the ultraviolet ray UV is preferably cast from the outer side of the TFT substrate 20 (i.e., the substrate including the pixel electrodes).

Figure 12:
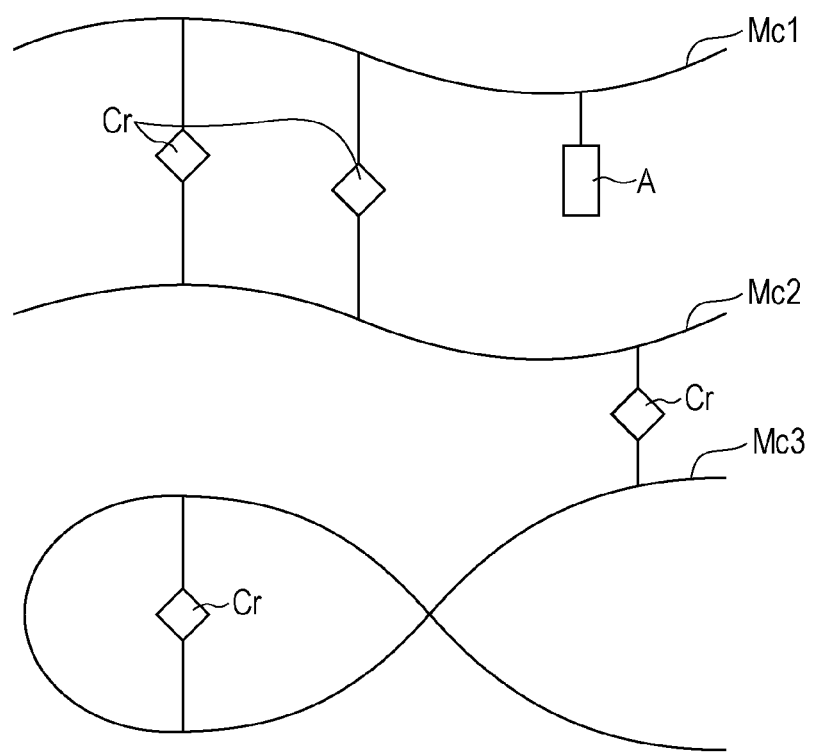
FIG. 12 illustrates states of the high-molecular compounds (compound after alignment processing) in the alignment film.

At this time, the compounds after alignment processing in the alignment films 22 and 32 are in the state illustrated in FIG. 12. More specifically, the orientations of the cross-linkable functional groups A or the polymerizable functional groups A introduced to the main chain(s) Mc of the compound(s) before alignment processing are changed in accordance with the alignment direction of the liquid crystal molecules 41, and the cross-linkable functional groups A or the polymerizable functional groups A positioned at short physical distances therebetween are caused to react with each other to form coupled portions Cr. It is thought that, with the function of the thus-produced compounds after alignment processing, the alignment films 22 and 32 give the pre-tilts $\theta_1$ and $\theta_2$ to the liquid crystal molecules 41A and 41B, respectively. The coupled portions Cr may be formed between the compounds before alignment processing or within the compound before alignment processing. In more detail, as illustrated in FIG. 12, the coupled portion Cr may be formed by the reaction, for example, between the cross-linkable functional group A or the polymerizable functional group A of the compound before alignment processing, which has the main chain Mc1, and the cross-linkable functional group A or the polymerizable functional group A of the compound before alignment processing, which has the main chain Mc2. As another example, like the high-molecular compound having the main chain Mc3, the coupled portion Cr may be formed by the reaction, for example, between the cross-linkable functional groups A or the polymerizable functional groups A, which are introduced to the same main chain Mc3. In the case of the polymerizable functional groups being introduced to the main chain, two or more polymerizable functional groups A are coupled together.

Through the steps described above, the liquid crystal display device (liquid crystal display element) illustrated in FIG. 1 can be completed.

In the operation of the liquid crystal display device (liquid crystal display element), when the drive voltage is applied in a selected pixel 10, the aligned state of the liquid crystal molecules 41 in the liquid crystal layer 40 is changed depending on the potential difference between the pixel electrode 20B and the counter electrode 30B. More specifically, in the liquid crystal layer 40, with the application of the drive voltage, the liquid crystal molecules 41A and 41B positioned near the alignment films 22 and 32 are tipped down in their pre-tilt directions from the state, illustrated in FIG. 1, before the application of the drive voltage, and the tipping motions of the liquid crystal molecules 41A and 41B are propagated to the other liquid crystal molecules 41C. Thus, the liquid crystal molecules 41 respond to the application of the drive voltage such that the molecules take postures substantially horizontal (parallel) to the TFT substrate 20 and the CF substrate 30. As a result, the optical characteristic of the liquid crystal layer 40 is changed and incident light upon the liquid crystal display element exits as modulated emergent light, whereby an image is displayed with half toning based on the emergent light.

On the other hand, in a liquid crystal display element fabricated without carrying out the pre-tilt processing and in a liquid crystal display device employing such a liquid crystal display element, when the drive voltage is applied, liquid crystal molecules having been aligned in a direction perpendicular to substrates are tipped down such that the director of each molecule is oriented to an arbitrary azimuth in the in-plane direction parallel to the substrate surfaces, even with the substrates each including an alignment restricting portion, e.g., a slit portion, which serves to restrict alignment of the liquid crystal molecules. Thus, the liquid crystal molecules after responding to the drive voltage are brought into the state where the azimuths of the directors of the individual liquid crystal molecules are not uniform, and the alignment of the liquid crystal molecules is disturbed when viewed in entirety. Consequently, a response speed is reduced and a response characteristic is degraded, thereby causing degradation of display characteristics. Further, if the liquid crystal display device (element) is operated by setting the initial drive voltage to be higher than the drive voltage in the display state (i.e., in the overdrive mode), the liquid crystal molecules are grouped into liquid crystal molecules that have responded to the application of the initial drive voltage, and liquid crystal molecules that have hardly responded thereto, and a large difference is generated in inclination of the director between those two groups of liquid crystal molecules. When the drive voltage for the display state is applied thereafter, the liquid crystal molecules having responded to the application of the initial drive voltage are tipped down such that their directors are inclined corresponding to the drive voltage for the display state before the tipping motions of those molecules are propagated to the other liquid crystal molecules. Thus, after the tipping-down, the inclinations of the directors of those molecules are propagated to the other liquid crystal molecules. Looking at the entire pixels, therefore, brightness reaches a level in the display state at the time of the application of the initial drive voltage, but the brightness then drops temporarily, followed by reaching the level in the display state again. Stated another way, the overdrive mode causes the problem that the apparent response speed is increased in comparison with the case not employing the overdrive mode, but a difficulty arises in obtaining display quality at a satisfactory level. It is thought that the above-mentioned problems are hardly caused in the liquid crystal display element of the IPS (In Plane Scanning) mode or the FFS (Fringe Field Scanning) mode, and are specific to the liquid crystal display element of the VA mode.

In contrast, in the liquid crystal display device (liquid crystal display element) and the method for manufacturing the same according to the first embodiment, the alignment films 22 and 32 give the predetermined pre-tilts $\theta_1$ and $\theta_2$ to the liquid crystal molecules 41A and 41B, respectively. Therefore, the problems caused in the case not carrying out the pre-tilt processing are substantially avoided, whereby the response speed to the drive voltage is greatly increased and the display quality in the overdrive mode is also improved. In addition, since the TFT substrate 20 and the CF substrate 30 include respectively the first slit portions 21 and the second slit portions 31 which serve as the alignment restricting portions for restricting the alignment of the liquid crystal molecules 41, the display characteristics, such as a viewing angle characteristic, are ensured and the response characteristic is improved while the display characteristics are maintained at a satisfactory level. Moreover, in the central region 51 of the overlapped region 50, the group of liquid crystal molecules in the liquid crystal layer 40 is not in the twisted state. Therefore, when the voltage is applied between the pair of electrodes 20B and 30B, the major axes of the group of liquid crystal molecules do not taken a time to release from the twisted state, and the response characteristic can be further improved. FIGS. 5A and 5B are illustrations to explain the twisted state of the major axes of the group of liquid crystal molecules. More specifically, the liquid crystal molecule 41B illustrated at an uppermost stage in FIGS. 5A and 5B represents the liquid crystal molecule positioned near the second substrate 30B, the liquid crystal molecule 41A illustrated at a lowermost stage in FIGS. 5A and 5B represents the liquid crystal molecule positioned near the first substrate 20B, and the liquid crystal molecule 41C illustrated at a middle stage in FIGS. 5A and 5B represents the liquid crystal molecule positioned intermediate between the first substrate 20B and the second substrate 30B. Further, a dotted line extending through each liquid crystal molecule represents the major axis of the relevant liquid crystal molecule. In the state illustrated in FIG. 5A, the group of liquid crystal molecules in the liquid crystal layer 40 is not in the twisted state. On the other hand, in the state illustrated in FIG. 5B, the group of liquid crystal molecules in the liquid crystal layer 40 is in the twisted state.

In the related-art method (photo-alignment technique) for manufacturing the liquid crystal display device, the alignment film is formed by irradiating a precursor film, which is disposed on the substrate surface and which includes a predetermined high-molecular material, with linearly-polarized light or light cast to be obliquely incident on the substrate surface (which light will be referred to as "oblique light" hereinafter), whereby the pre-tilt processing is carried out. This causes the problem that an elaborate light irradiation apparatus, such as an apparatus capable of casting linearly-polarized parallel light obliquely with respect to the substrate surface, is necessary in forming the alignment film. Further, when a pixel having multiple domains is formed to realize a wider viewing angle, a mask is necessary and a manufacturing process is complicated. When forming the alignment film by using the oblique light, in particular, if there are structures or concave-convex components, such as spacers, on the substrate, there occur regions which are positioned in the shades of the structures, etc. and which are not exposed to the oblique light. In those regions, it is difficult to desirably restrict the alignment of the liquid crystal molecules. For example, when the oblique light is cast by using a photo mask to form multiple domains in the pixel under such a situation, pixel design is to be carried out in consideration of light coming around the structures, etc. Stated another way, when the alignment film is formed by using the oblique light, a difficulty arises in forming pixels with high precision.

Moreover, when a cross-linkable high-molecular compound is used as a high-molecular material in the related-art photo-alignment technique, cross-linkable functional groups or polymerizable functional groups contained in the cross-linkable high-molecular compounds in a precursor film are oriented in random azimuths (directions) due thermal motions, and hence a probability that the cross-linkable functional groups or the polymerizable functional groups come close to each other in terms of physical distance is low. When random light (non-polarized light) is cast for irradiation, the cross-linkable functional groups or the polymerizable functional groups develop reactions as the physical distance between the groups come so short. However, the cross-linkable functional groups or the polymerizable functional groups, which are caused to react with each other upon casting of the linearly-polarized light, necessitate such a condition that the direction of polarization of the polarized light and the direction of a reacting portion are aligned in a predetermined direction. Further, an irradiation amount per unit area with the oblique light is reduced in comparison with that with vertical light because the oblique light is cast over a wider irradiation area. In other words, a proportion of the cross-linkable functional groups or the polymerizable functional groups, which react to the linearly-polarized light or the oblique light, is smaller than that in the case where random light (non-polarized light) is cast for irradiation to the substrate surface in the direction perpendicular thereto. Accordingly, the cross-linking density (degree of cross-linking) in the formed alignment film tends to become lower.

In contrast, in the first embodiment, after forming the alignment films 22 and 32 containing the compounds before alignment processing, the liquid crystal layer 40 is formed in the sealed-off state between the alignment films 22 and 32. Then, the voltage is applied to the liquid crystal layer 40 to align the liquid crystal molecules 41 in the predetermined directions, and the compounds before alignment processing in the alignment films 22 and 32 are cross-linked while the directions of the terminal structure portions in the side chains with respect to the substrates or the electrodes are specified by the liquid crystal molecules 41. As a result, the alignment films 22 and 32 can be formed to be capable of giving the respective pre-tilts θ to the liquid crystal molecules 41A and 41B. Thus, with the liquid crystal display device (liquid crystal display element) and the method for manufacturing the same according to the first embodiment, the response characteristic can be easily improved without employing an elaborate apparatus. In addition, when the compounds before alignment processing are cross-linked, the pre-tilt θ can be given to the liquid crystal molecules 41 without depending on the direction in which the alignment films are irradiated with the ultraviolet ray, and hence the pixels can be formed with high precision. Further, since the compounds after alignment processing are generated in the state where the directions of the terminal structure portions in the side chains are aligned in the compounds before alignment processing, the degree of cross-linking of the compounds after alignment processing is to be higher than that in the alignment film formed according to the related-art manufacturing method described above. Therefore, even when the liquid crystal display device (liquid crystal display element) is driven for a long time, new cross-linked structures are hardly formed during the driving and the pre-tilts $θ_1$ and $θ_2$ given to the liquid crystal molecules 41A and 41B are maintained in the same states as those obtained in the manufacturing, whereby reliability can be improved.

In the first embodiment, since the compounds before alignment processing in the alignment films 22 and 32 are cross-linked after forming the liquid crystal layer 40 in the sealed-off state between the alignment films 22 and 32, the transmittance of the liquid crystal display element can be changed so as to increase continuously when the liquid crystal display element is driven.

Figure 14:
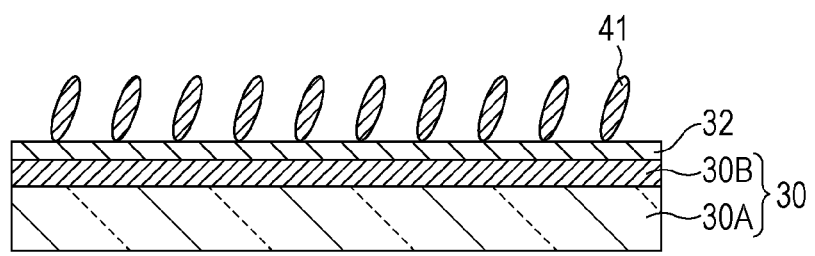
FIG. 14 is a schematic sectional view to explain an order parameter.

More specifically, in the first embodiment in which the pre-tilt processing is carried out with the cross-linking of the compounds before alignment processing after forming the liquid crystal layer 40 in the sealed-off state, the pre-tilts are specified by the first slit portions 21 and the second slit portions 31, which serve to restrict the alignment of the liquid crystal molecules 41 near the alignment films 22 and 32, depending on the alignment direction of the liquid crystal molecules 41 in the driven state. Accordingly, as illustrated in FIG. 14, the liquid crystal molecules 41 are more apt to become evener in the direction of the pre-tilt, and an order parameter is increased (closer to 1). Thus, when the liquid crystal display element is driven, the liquid crystal molecules 41 behave in a more uniform way and the transmittance is continuously increased.

In particular, when the compound before alignment processing includes the group expressed by the formula (1) together with the cross-linkable functional group or the polymerizable functional group, or when the compound before alignment processing includes the group expressed by the formula (2) as the cross-linkable functional group or the polymerizable functional group, each of the alignment films 22 and 32 can more easily apply the pre-tilt θ. As a result, the response speed can be further increased.

While the first embodiment has been described above in connection with the case of using the alignment films 22 and 32 each containing the compound before alignment processing, which has the main chain primarily including the polyimide structure, the main chain of the compound before alignment processing is not limited to the one including the polyimide structure. The main chain may include, e.g., the polysiloxane structure, the polyacrylate structure, the polymethacrylate structure, the maleinimide copolymer structure, the styrene copolymer structure, the styrene/maleinimide copolymer structure, the polysaccharide structure, or the polyvinyl alcohol structure. Among those examples, the compound before alignment processing, which has the main chain including the polysiloxane structure, is preferable. This is because that type of the compound before alignment processing can provide similar advantages to those obtained with the above-described high-molecular compound including the polyimide structure. One example of the compound before alignment processing, which has the main chain including the polysiloxane structure, is a high-molecular compound including the polysilane structure expressed by the following formula (9). R10 and R11 in the formula (9) are each an arbitrary as long as it is a univalent group containing carbon. It is, however, preferable that at least one of R10 and R11 contains the cross-linkable functional group or the polymerizable functional group as a side chain and a side chain made of the group expressed by the formula (1). The reason is that such a feature enables the alignment restricting ability to be easily obtained at a satisfactory level in the compound after alignment processing. One example of the cross-linkable functional group or the polymerizable functional group in such a case is the group expressed by the foregoing formula (41).

(9)

where R10 and R11 are each a univalent organic group, and m1 is an integer of 1 or more.

Further, while the first embodiment has been described above as providing the first slit portions 21 and the second slit portions 31 to improve the viewing angle characteristic with division of the alignment, the arrangement of the alignment restricting portions is not limited to the illustrated one. For example, projections serving as the alignment restricting portions may be provided on each of the pixel electrodes 20B instead of the first slit portions 21. The provision of those projections can also ensure similar advantages obtained with the provision of the first slit portions 21. In addition, projections serving as the alignment restricting portions may be provided on each of the counter electrodes 30B on the CF substrate 30. In that case, the projections on the TFT substrate 20 and the projections on the CF substrate 30 are arranged not to face each other between both the substrates. Similar advantages to those described above can also be obtained with the provision of those two types of projections.

Although other embodiments will be described below, components common to those in the first embodiment are denoted by the same symbols and descriptions of those components are omitted. Also, similar operations and advantages to those in the first embodiment are omitted to avoid duplicate descriptions. Further, various technical matters described above in the first embodiment are likewise applied, as appropriate, to the following embodiments.

Second Embodiment

A second embodiment is a modification of the first embodiment. While the first embodiment has been described in connection with the liquid crystal display device (liquid crystal display element) in which the alignment films 22 and 32 are formed such that substantially equal pre-tilts $\theta_1$ and $\theta_2$ are given respectively to the liquid crystal molecules 41A and 41B positioned near the alignment films 22 and 32, the pre-tilts $\theta_1$ and $\theta_2$ are set different from each other in the second embodiment.

More specifically, in the second embodiment, the TFT substrate 20 including the first alignment film 22 and the CF substrate 30 including the second alignment film 32 are first fabricated as in step S101 described above. Next, the liquid crystal layer 40 is formed in the sealed-off state with, e.g., an ultraviolet ray absorber included in the liquid crystal layer 40. Subsequently, a predetermined voltage is applied between the pixel electrodes 20B and the counter electrodes 30B, and an ultraviolet ray is cast from the outer side of the TFT substrate 20 for irradiation to cross-link the compound before alignment processing in the first alignment film 22. At that time, because the liquid crystal layer 40 includes the ultraviolet ray absorber, the ultraviolet ray incident from the outer side of the TFT substrate 20 is absorbed by the ultraviolet ray absorber in the liquid crystal layer 40, and hence it hardly reaches the CF substrate 30. Therefore, the compound after alignment processing is produced only in the first alignment film 22. Subsequently, a voltage differing from the above-mentioned predetermined voltage is applied between the pixel electrodes 20B and the counter electrodes 30B, and an ultraviolet ray is cast from the outer side of the CF substrate 30 for irradiation to cause the compound before alignment processing in the second alignment film 32 to develop a reaction, thus producing the compound after alignment processing. Accordingly, the pre-tilts $\theta_1$ and $\theta_2$ of the liquid crystal molecules 41A and 41B positioned near the alignment films 22 and 32 can be set, respectively, depending on the voltage applied when the ultraviolet ray is cast from the outer side of the TFT substrate 20 and the voltage applied when the ultraviolet ray is cast from the outer side of the CF substrate 30. In other words, the pre-tilts $\theta_1$ and $\theta_2$ can be set different from each other. However, the TFT substrate 20 includes TFT switching elements and various bus lines, and hence various transverse electric fields are generated on the TFT substrate 20 in the driven state. For that reason, the first alignment film 22 on the TFT substrate 20 is desirably formed such that the pre-tilt $\theta_1$ given to the liquid crystal molecules 41A positioned near the first alignment film 22 is larger than the pre-tilt $\theta_2$ given to the liquid crystal molecules 41B positioned near the second alignment film 32. As a result, disturbance in the alignment of the liquid crystal molecules 41A caused by the transverse electric fields can be reduced effectively.

Third Embodiment

Figure 15:
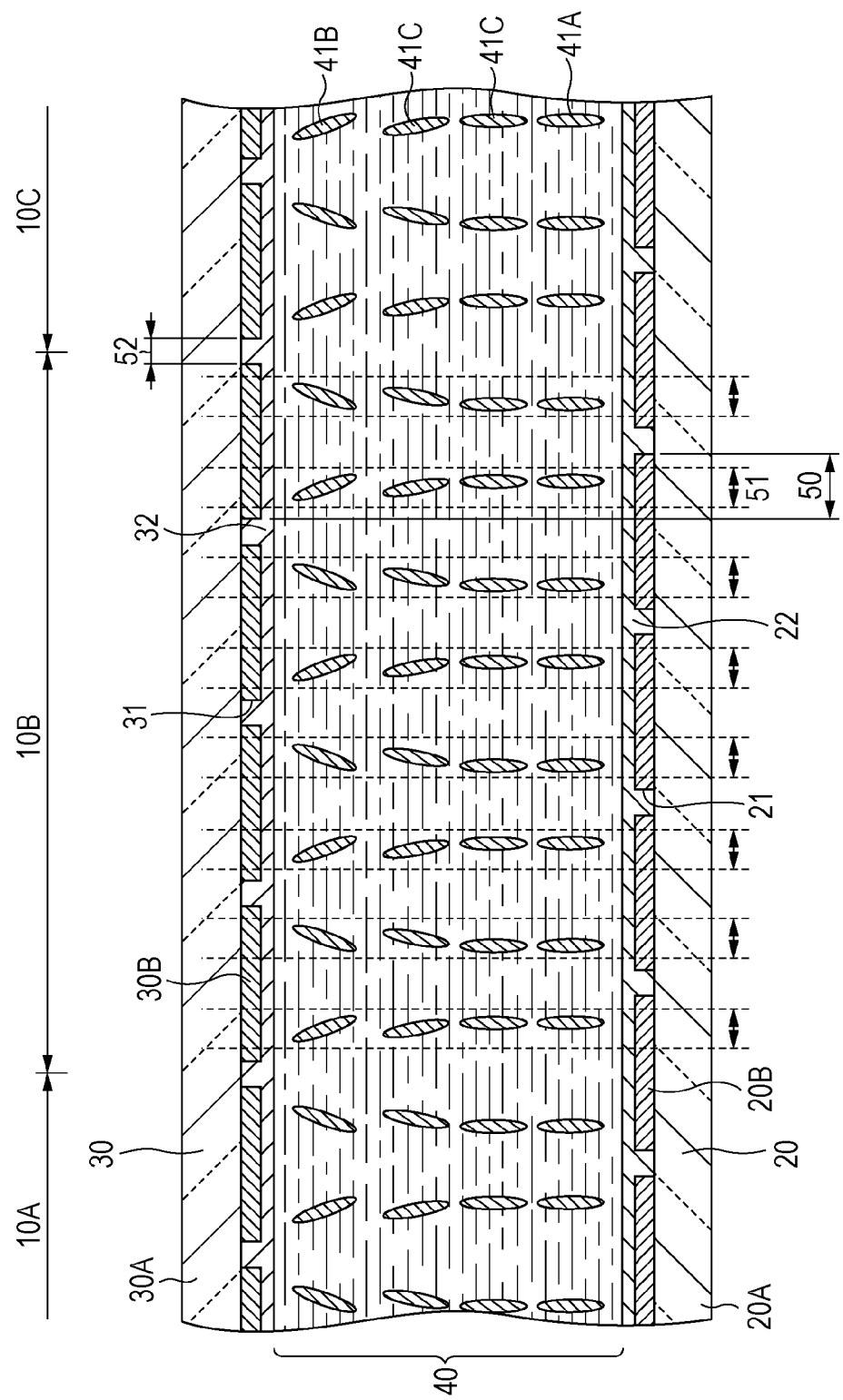
FIG. 15 is a schematic partial sectional view of a modification of the liquid crystal display device according to the embodiment.

A third embodiment is a modification of the first embodiment and the second embodiment. FIG. 15 is a schematic partial sectional view of a liquid crystal display device (liquid crystal display element) according to the third embodiment. In the third embodiment, unlike the first embodiment, the first alignment film 22 is formed without including the compound after alignment processing. Stated another way, in the third embodiment, the pre-tilt $\theta_2$ given to the liquid crystal molecules 41B positioned near the second alignment film 32 has a larger value than 0°, whereas the pre-tilt $\theta_1$ given to the liquid crystal molecules 41A positioned near the first alignment film 22 is set to 0°.

Herein, the first alignment film 22 is formed by using the above-mentioned additional vertical aligner.

The liquid crystal display device (liquid crystal display element) according to the third embodiment can be manufactured by, in forming the first alignment film 22 on the TFT substrate 20 (i.e., in step S101 of FIG. 7), using the above-mentioned additional vertical aligner instead of the compound before alignment processing or the high-molecular compound precursor serving as the compound before alignment processing.

In the liquid crystal display device (liquid crystal display element) according to the third embodiment, the pre-tilt $\theta_1$ given to the liquid crystal molecules 41A in the liquid crystal layer 40 is 0° and the pre-tilt $\theta_2$ given to the liquid crystal molecules 41B therein is larger than 0°. Comparing with the liquid crystal display element in which the pre-tilt processing is not carried out, therefore, the response speed to the drive voltage is significantly increased. Further, since the liquid crystal molecules 41A are aligned substantially in the direction normal to the first substrate 20 and the second substrate 30, the amount of light transmitted in the black mode can be reduced and the contrast can be improved in comparison with the liquid crystal display devices (liquid crystal display elements) according to the first and second embodiments. Stated another way, in the liquid crystal display device (liquid crystal display element) according to the third embodiment, the contrast can be improved by setting the pre-tilt $\theta_1$ of the liquid crystal molecules 41A positioned near the TFT substrate 20 to 0°, for example, while the response speed can be increased by setting the pre-tilt $\theta_2$ of the liquid crystal molecules 41B positioned near the CF substrate 30 to be larger than 0°. As a result, the response speed to the drive voltage and the contrast can be improved in a well balanced way.

Moreover, with the liquid crystal display device (liquid crystal display element) and the method for manufacturing the same according to the third embodiment, the first alignment film 22 not including the compound before alignment processing is formed on the TFT substrate 20, and the second alignment film 32 including the compound before alignment processing is formed on the CF substrate 30. After forming the liquid crystal layer 40 in the sealed-off state between the TFT substrate 20 and the CF substrate 30, the compound after alignment processing is produced by causing the compound before alignment processing in the second alignment film 32 to develop a reaction. As a result, the second alignment film 32 giving the pre-tilt $\theta$ to the liquid crystal molecules 41B can be formed without using an elaborate light irradiation apparatus, and the response characteristic can be easily improved.

The other advantages obtained with the third embodiment are similar to those obtained with the first embodiment.

Figure 16:
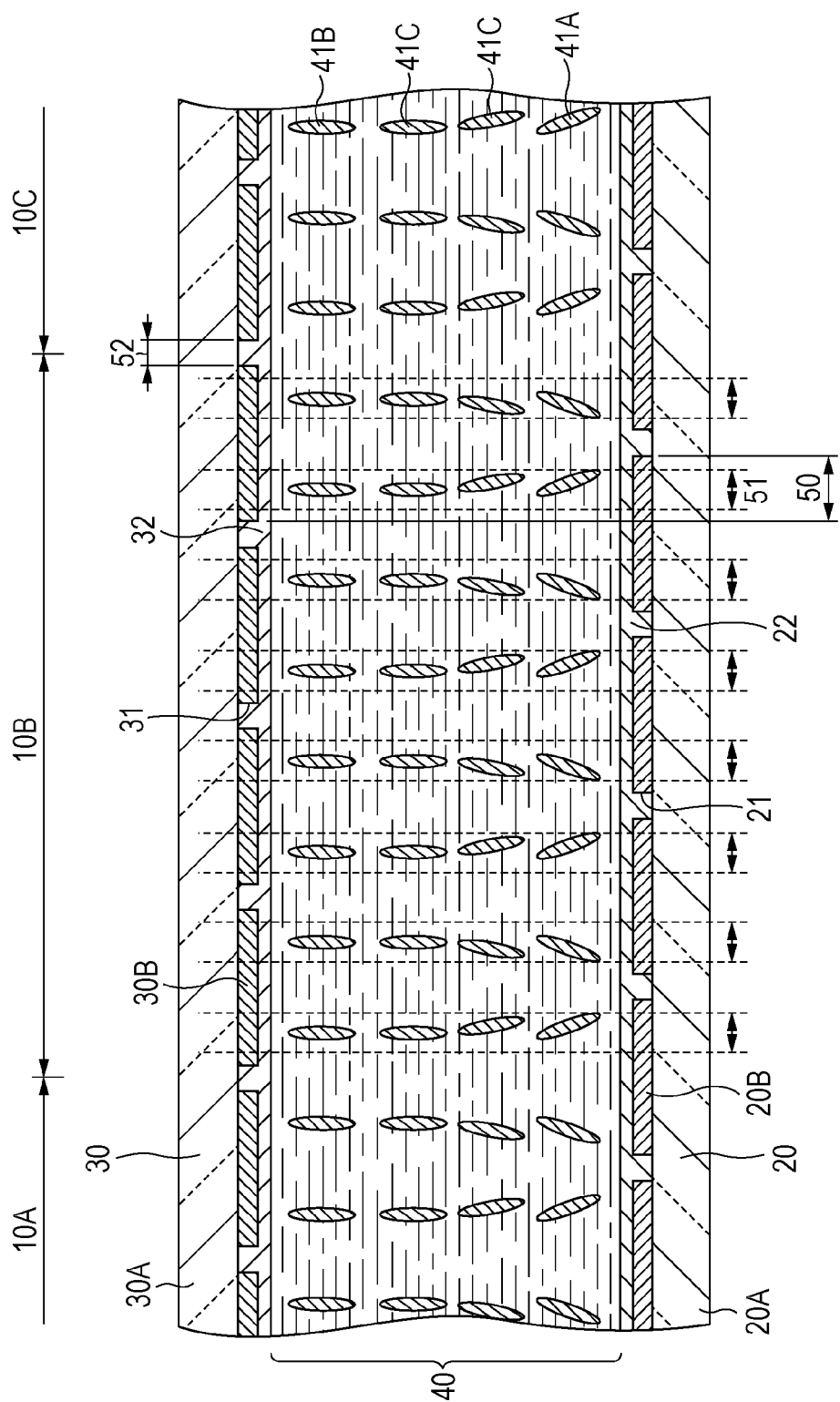
FIG. 16 is a schematic partial sectional view of the modification, illustrated in FIG. 15, of the liquid crystal display device.

While in the third embodiment, as illustrated in FIG. 15, the second alignment film 32 covering the CF substrate 30 contains the compound after alignment processing and the pre-tilt $\theta_2$ is given to the liquid crystal molecules 41B that are positioned in the liquid crystal layer 40 near the CF substrate 30, the arrangement is not limited to the illustrated one. More specifically, the third embodiment may be modified, as illustrated in FIG. 16, such that the first alignment film 22 covering the TFT substrate 20 contains the compound after alignment processing, while the second alignment film 32 does not contain the compound after alignment processing, and the pre-tilt $\theta_1$ is given to the liquid crystal molecules 41A positioned in the liquid crystal layer 40 near the TFT substrate 20. In such a modification, similar operation and similar advantages to those in the third embodiment can also be obtained. Anyway, because various transverse electric fields are generated on the TFT substrate 20 in the driven state as described above, it is desirable that the first alignment film 22 on the TFT substrate 20 is formed so as to give the pre-tilt $\theta_1$ to the liquid crystal molecules 41A positioned near the first alignment film 22. As a result, disturbance in the alignment of the liquid crystal molecules 41A caused by the transverse electric fields can be reduced effectively.

Fourth Embodiment

In the first to third embodiments, the compound before alignment processing is caused to develop a reaction in at least one of the alignment films 22 and 32 in the state after forming the liquid crystal layer 40, thus producing the compound after alignment processing such that the pre-tilt is given to the liquid crystal molecules 41 near the at least one alignment film. In contrast, in the fourth embodiment, the structure of a high-molecular compound is decomposed in at least one of the alignment films 22 and 32 in the state after forming the liquid crystal layer 40, thereby giving the pre-tilt to the liquid crystal molecules 41 near the at least one alignment film. In other words, the liquid crystal display device (liquid crystal display element) according to the fourth embodiment has a similar structure to those according to the first to third embodiments except that the method of forming the alignment films 22 and 32 differ therebetween.

When the liquid crystal molecules 41A and 41B have the predetermined pre-tilts $\theta_1$ and $\theta_2$, respectively, the liquid crystal display device (liquid crystal display element) according to the fourth embodiment is manufactured, for example, as follows. First, the alignment films 22 and 23 containing the high-molecular compounds, e.g., the above-described additional vertical aligners, are formed respectively on the TFT substrate 20 the CF substrate 30. Next, the TFT substrate 20 and the CF substrate 30 are arranged such that the alignment films 22 and 32 are positioned to face each other, and the liquid crystal layer 40 is formed in the sealed-off state between the alignment films 22 and 32. Next, a voltage is applied between the pixel electrodes 20B and the counter electrodes 30B. In the state where the voltage is continuously applied, the alignment films 22 and 32 are irradiated with an ultraviolet ray UV that includes a light component in a short wavelength range of about 250 nm at a higher proportion. At that time, with the ultraviolet ray UV in the short wavelength range, the high-molecular compounds in the alignment films 22 and 32 are changed in structure through decomposition thereof, for example. As a result, the predetermined pre-tilts $\theta_1$ and $\theta_2$ can be given respectively to the liquid crystal molecules 41A positioned near the alignment film 22 and the liquid crystal molecules 41B positioned near the alignment film 32.

The high-molecular compound contained in each of the alignment films 22 and 32 before forming the liquid crystal layer 40 in the sealed-off state is, for example, a high-molecular compound having the polyimide structure expressed by the following formula (10). As represented by the following chemical reaction formula (1), the polyimide structure expressed by the formula (10) is changed into a structure expressed by the following formula (11) through cleavage of the cyclobutane structure in the formula (10) due to the irradiation with the ultraviolet ray UV.

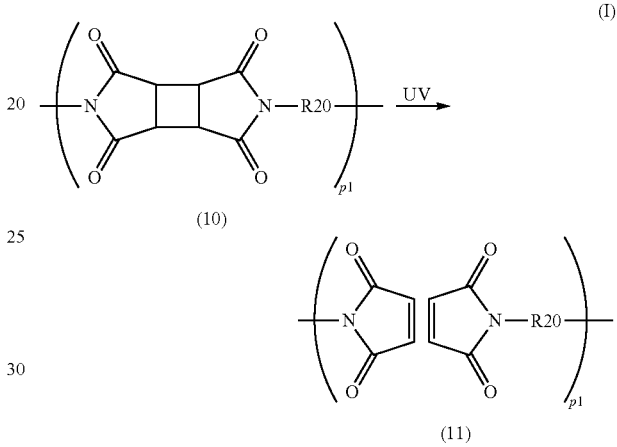

where R20 is a bivalent organic group and p1 is an integer of 1 or more.

According to the fourth embodiment, since the liquid crystal molecules 41A positioned near the first alignment film 22 and the liquid crystal molecules 41B positioned near the second alignment film 32 have respectively the predetermined pre-tilts $\theta_1$ and $\theta_2$, the response speed to the drive voltage can be greatly increased in comparison with the liquid crystal display element in which the pre-tilt processing is not carried out. Further, at least one of the alignment films 22 and 32, which one is capable of giving the pre-tilt $\theta$ to the liquid crystal molecules 41, can be formed without using an elaborate apparatus. Hence, the response characteristic can be easily improved. However, because the fourth embodiment accompanies with a risk that the ultraviolet ray cast for irradiation to the alignment films 22 and 32 may cause, e.g., decomposition of the liquid crystal molecules 41, the first to third embodiments can more easily ensure higher reliability than the fourth embodiment.

Fifth Embodiment

A fifth embodiment concerns with the liquid crystal display device according to the second feature of an embodiment and with the method for manufacturing the liquid crystal display devices according to the second and third features of an embodiment.

In the first to third embodiments, the compound after alignment processing is obtained by cross-linking the cross-linkable functional group or the polymerizable functional group in the compound before alignment processing, which contains the cross-linkable functional group or the polymerizable functional group in at least one side chain thereof.

On the other hand, in the fifth embodiment, the compound after alignment processing is obtained from the compound before alignment processing, which contains, in at least one side chain thereof, a photosensitive functional group causing a deformation when it is irradiated with an energy ray.

Figure 18:
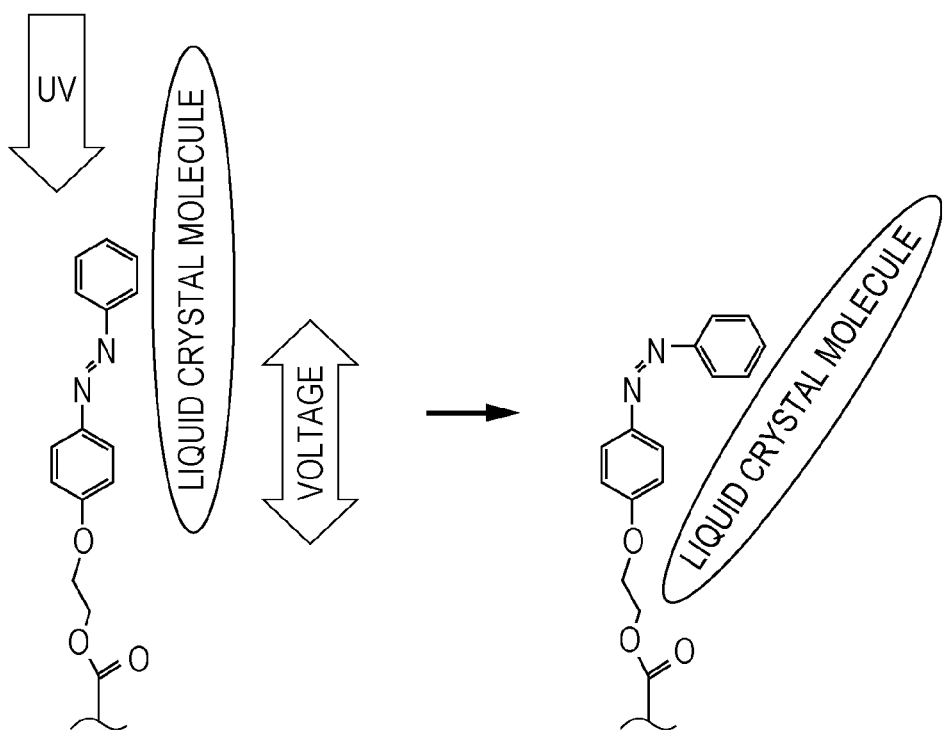
FIG. 18 is a conceptual illustration to explain the relationship between a deformed high-molecular compound and a liquid crystal molecule.

In the fifth embodiment, each of the alignment films 22 and 32 similarly contains one or more types of high-molecular compounds (compounds after alignment processing) each having the cross-linked structure in at least one side chain thereof, or one or more types of high-molecular compounds (compounds after alignment processing) each including the terminal group, which is expressed by the formula (1) and which is positioned along the liquid crystal molecule, in at least one side chain thereof in addition to one or more types of the cross-linkable functional group or the polymerizable functional group. Further, a pre-tilt is given to the liquid crystal molecule by the deformed compound. Herein, the compounds after alignment processing is produced by forming the alignment films 22 and 32 in the state where each alignment film contains one or more types of high-molecular compounds (compounds before alignment processing) having the main chains and the side chains, then forming the liquid crystal layer 40 in the sealed-off state, and further by deforming the high-molecular compounds or irradiating the high-molecular compounds with an energy ray, more specifically, by deforming the photosensitive functional groups contained in the side chains under application of an electric field or a magnetic field. Such a process is represented in a conceptual illustration of FIG. 18. Be it noted that, in FIG. 18, an arrow denoted by "UV" and an arrow denoted by "VOLTAGE" merely represent the irradiation with the ultraviolet ray and the application of the voltage, and that directions of those arrows do not indicate the direction in which the ultraviolet ray is cast for the irradiation and the direction in which the electric field is applied. The compound after alignment processing includes a structure for aligning the liquid crystal molecule in a predetermined direction (specifically, in an oblique direction) with respect to a pair of substrates (specifically, the TFT substrate 20 and the CF substrate 30). Thus, the compounds after alignment processing are produced in the alignment films 22 and 32 by deforming the high-molecular compounds or by irradiating the high-molecular compounds with the energy ray, whereby the pre-tilt can be given to the liquid crystal molecules 41 positioned near the alignment films 22 and 32. As a result, the response speed is increased and the display characteristics are improved.

The photosensitive functional group can be, for example, an azobenzene-based compound having an azo group, a compound having imine and aldimine in its skeleton (called "aldimine benzene" for convenience of explanation), or a compound having a styrene skeleton (called "stilbene" for convenience of explanation). Each of those compounds can give the pre-tilt to the liquid crystal molecules as a result of that the compound is deformed in response to the energy ray (e.g., the ultraviolet ray), namely that the compound is transited from a trans-state to a cis-state.

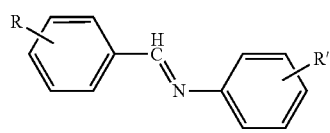

Aldimine Benzene

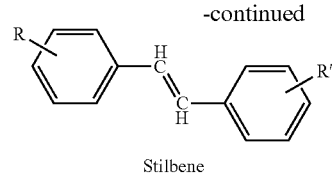

Stilbene

As the azobenzene-based compound expressed by the following formula (AZ-O), practical examples of "X" can be expressed by the following formulae (AZ-1) to (AZ-9).

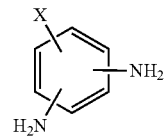

(AZ-0)

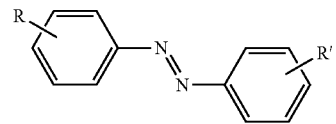

(AZ-1)

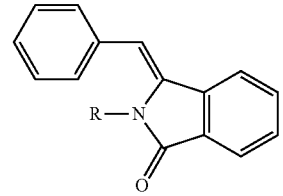

(AZ-2)

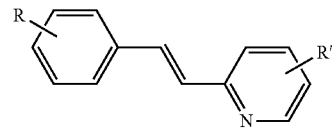

(AZ-3)

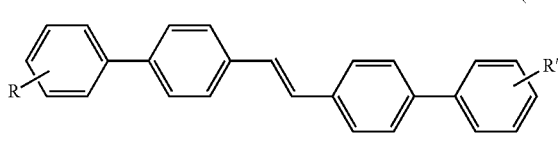

(AZ-4)

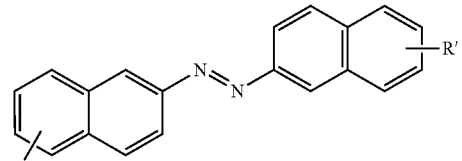

(AZ-5)

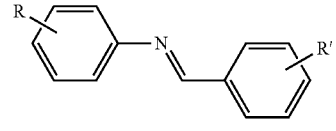

(AZ-6)

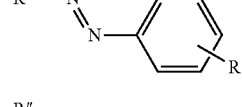

(AZ-7)

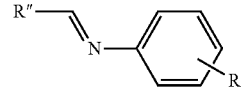

(AZ-8)

-continued

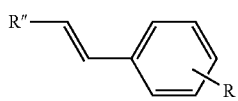
(AZ-9)

Herein, at least one of R and R" is bonded to a benzene ring including diamine directly or through ether or ester, for example, and the other serves as a terminal group. Further, R, R' and R" are each a univalent group containing a hydrogen atom, a halogen atom, an alkyl group, an alkoxy group or a carbonate group, or a derivative thereof. The terminal group may include R2 in the formula (1) or R13 in the formula (2). With such a feature, the pre-tilt can be more easily given to the liquid crystal molecules. R" is bonded to a benzene ring including diamine directly or through ether or ester, for example.

The liquid crystal display device and the method for manufacturing the same according to the fifth embodiment are not described in detail here because they can be basically and substantially similar to those according to the first to third embodiments except for using the compound before alignment processing, which contains the photosensitive functional group deformable by irradiation with the energy ray (e.g., the ultraviolet ray).

EXAMPLE 1

EXAMPLE 1 concerns with the liquid crystal display device (liquid crystal display element) and the method for manufacturing the same according to the first feature of an embodiment, and with the liquid crystal display device (liquid crystal display element) and the method for manufacturing the same according to the third feature of an embodiment. In EXAMPLE 1, the liquid crystal display device (liquid crystal display element) illustrated in FIG. 1 was fabricated through steps described below.

First, the TFT substrate 20 and the CF substrate 30 were prepared. The TFT substrate 20 was fabricated by forming, on one surface of a glass substrate 20A having a thickness of 0.7 mm, the pixel (first) electrodes 20B each made of ITO and including a slit pattern (providing such an arrangement that the first slit portions 21 had a width and a pitch of 5 μm and 65 μm, one segment of the first electrode 20B between the first slit portions 21 had a width of 60 μm, and a gap between two adjacent segments of the first electrode 20B was 5 μm). The CF substrate 30 was fabricated by using a glass substrate 20A having a thickness of 0.7 mm and including a color filter formed thereon, and by forming, on the color filter, the counter (second) electrodes 30B each made of ITO and including a slit pattern (providing such an arrangement that the second slit portions 31 had a width and a pitch of 5 μm and 65 μm, one segment of the second electrode 30B between the second slit portions 31 had a width of 60 and a gap between two adjacent segments of the second electrode 30B was 5 μm). Those first and second slit patterns formed in the pixel electrodes 20B and the counter electrodes 30B are intented to apply an oblique electric field between the TFT substrate 20 and the CF substrate 30. Next, the spacer projections each having a size of 3.5 μm were formed on the TFT substrate 20. Be it noted that the slit pattern used herein is illustrated in FIG. 2.

Meanwhile, an alignment film material was prepared, for example, as follows. First, 1 mol of a diamine compound, i.e., a compound having the cross-linkable functional group and expressed by the formula (A-6), 1 mol of a compound having the vertical alignment inducing structure portion and expressed by the formula (B-4), 2 mol of tetracarboxylic dianhydride expressed by the formula (E-2), and a compound expressed by the following formula (G-1) were dissolved in N-methyl-2-pyrolidone (NMP). Next, the thus-prepared solution was caused to develop a reaction at 60° C. for 6 hours. Thereafter, the reaction product was precipitated by pouring a large amount of pure water to the solution after the reaction. After separating the precipitated solid matter, it was washed with pure water and was dried at 40° C. for 15 hours under depressurization. As a result, the polyamic acid, i.e., the high-molecular compound precursor serving as the compound before alignment processing, was synthesized. Finally, a solution with a solid content concentration of 3% by weight was obtained by dissolving 3.0 g of the synthesized polyamic acid in NMP, and the obtained solution was subjected to filtration using a filter of 0.2 μm. An alignment film material 1 was thus prepared.

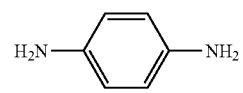
(G-1)

Subsequently, the prepared alignment film material 1 was coated on each of the TFT substrate 20 and the CF substrate 30 by using a spin coater. Thereafter, coated films were dried for 80 seconds by using a hot plate at 80° C. Next, the TFT substrate 20 and the CF substrate 30 were heated in an oven at 200° C. for 1 hour under an atmosphere of nitrogen gas. As a result, the alignment films 22 and 32, each having a thickness of 90 nm, were formed respectively on the pixel electrodes 20B and the counter electrodes 30B.

Subsequently, an ultraviolet-curable resin including silica particles with a particle diameter of 3.5 μm was coated along the peripheral edges of a pixel region on the CF substrate 30, thereby forming the sealing portions. A liquid crystal material made of MLC-7029 (made by Merck), which was a negative type liquid crystal, was poured into a space surrounded by the sealing portions. Thereafter, the TFT substrate 20 and the CF substrate 30 were attached together such that a center line of each linear segment of the pixel electrode 20B and the second slit portion 31 in the counter electrode 30B were positioned to face each other, followed by curing the sealing portions. Thus, the sealing portions were fully cured by heating in an oven at 120° C. for 1 hour. As a result, the liquid crystal layer 40 was formed in the sealed-off state and a liquid crystal cell was completed.

Subsequently, the liquid crystal cell, fabricated as described above, was irradiated with a uniform ultraviolet ray of 500 mJ (measured at a wavelength of 365 nm) in the state where an AC electric field (60 Hz) in the form of a rectangular wave was applied at an effective voltage value of 20 V, thereby causing the compounds before alignment processing in the alignment films 22 and 32 to develop reactions. As a result, the alignment films 22 and 32 including the compounds after alignment processing were formed respectively on the TFT substrate 20 and the CF substrate 30. Through the steps described above, the liquid crystal display device (liquid crystal display element), illustrated in FIG. 1, was completed in which a pre-tilt was given to the liquid crystal molecules 41A and 41B positioned respectively near the TFT substrate 20 and the CF substrate 30. Finally, a pair of polarizing plates were attached in one-to-one relation to the outer sides of the liquid crystal display device such that absorption axes of the polarizing plates were orthogonal to each other.

Figure 19:
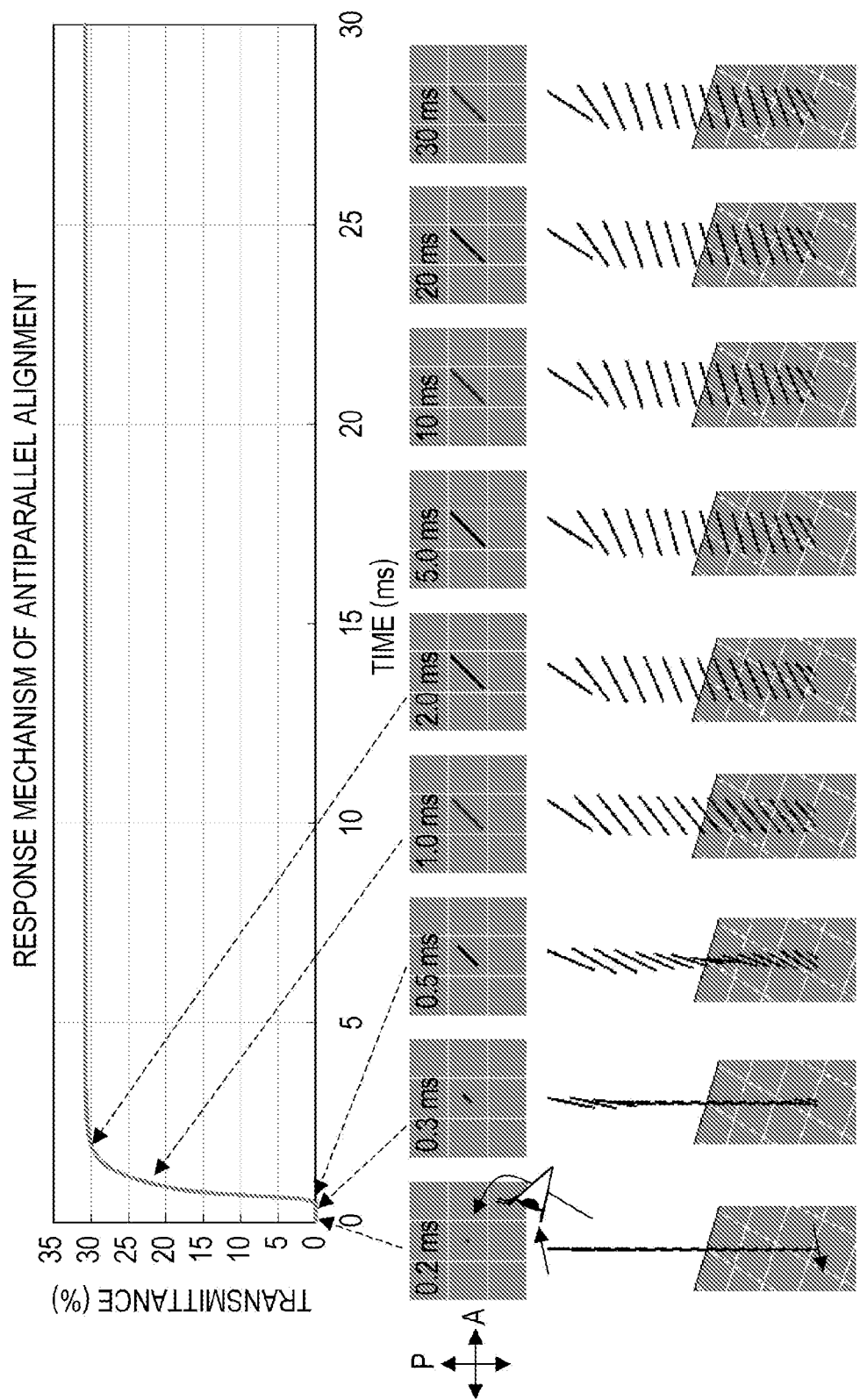
FIG. 19 illustrates the result of simulating change in state of the major axes of the group of liquid crystal molecules when a voltage is applied between a pair of electrodes in EXAMPLE 1.
Figure 20A:
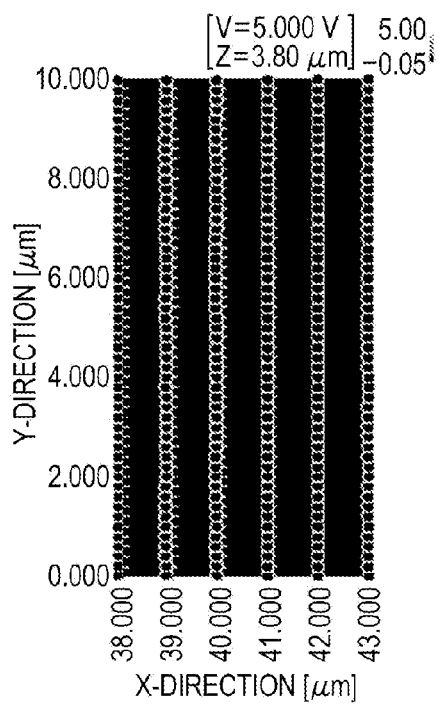
FIGS. 20A to 20D illustrate the results of simulating behaviors of liquid crystal molecules in EXAMPLE 1.
Figure 20B:
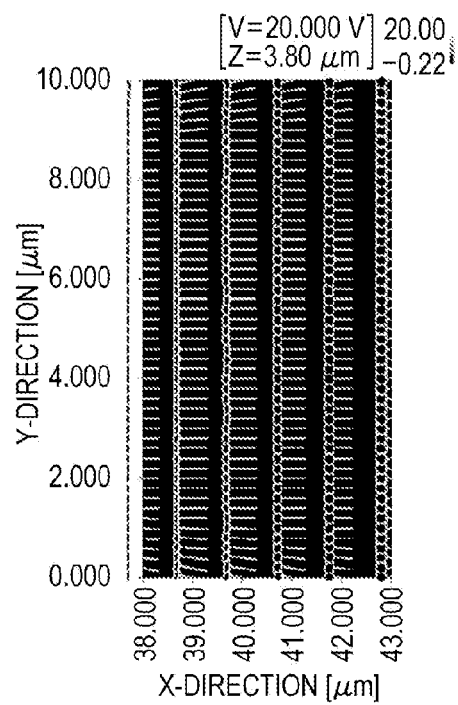
Figure 20C:
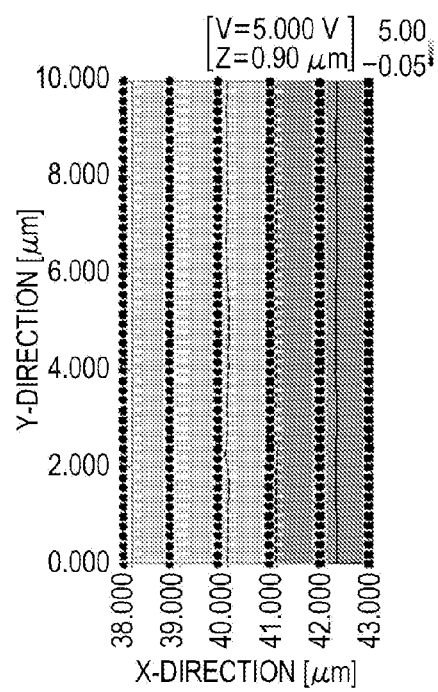
Figure 20D:
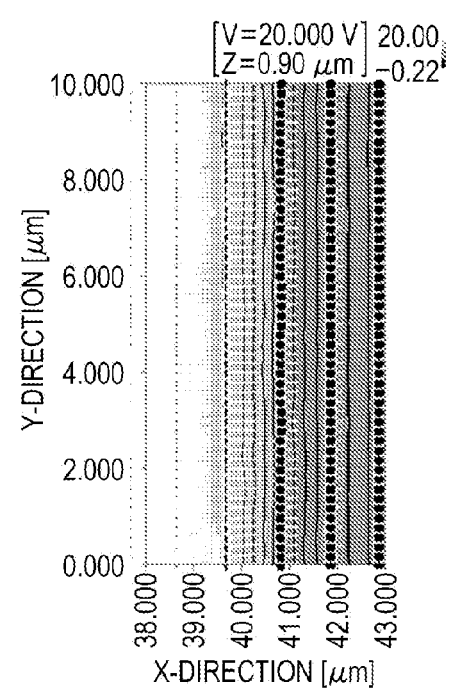
Figure 22:
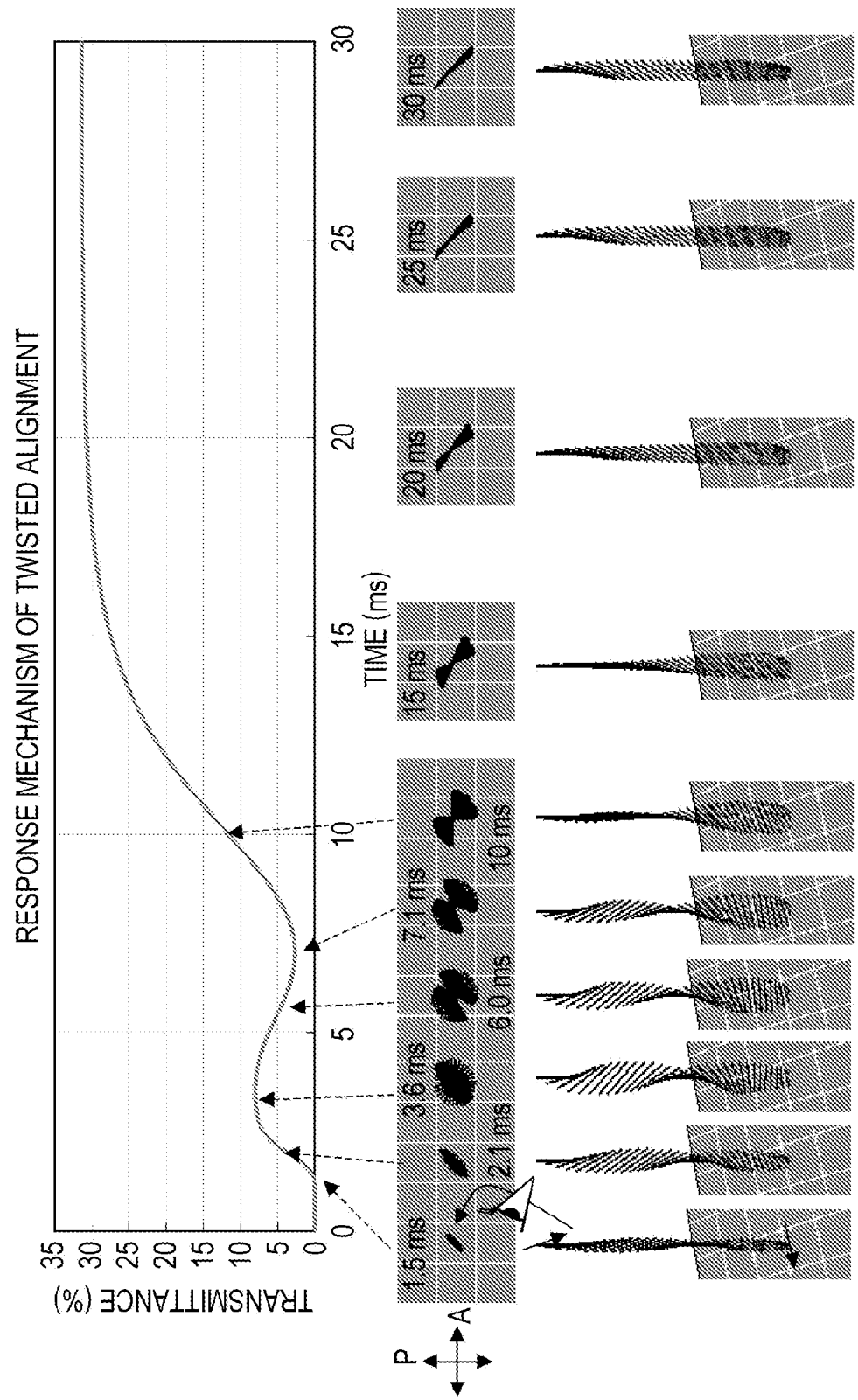
FIG. 22 illustrates the result of simulating the state where the major axes of the group of liquid crystal molecules are released from twisted state when a voltage is applied between a pair of electrodes in a liquid crystal display of the VA mode.
Figure 23A:
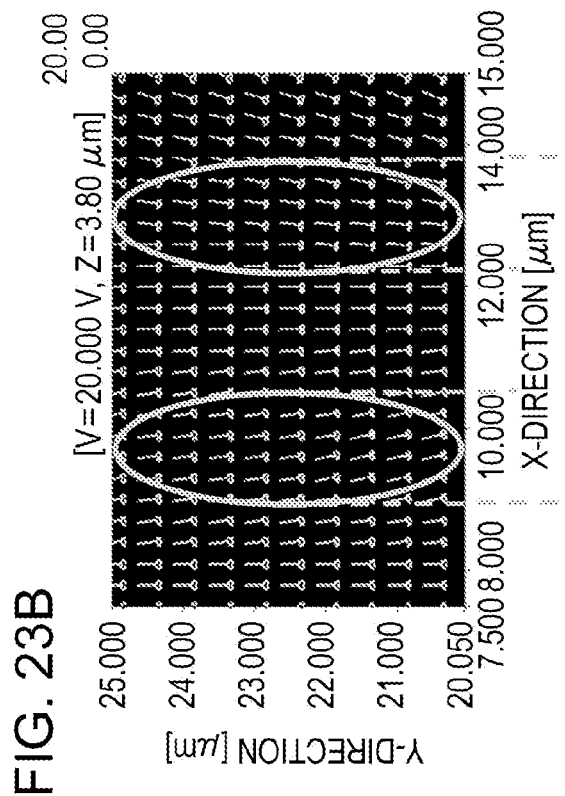
FIGS. 23A to 23D illustrate the results of simulating behaviors of liquid crystal molecules in COMPARATIVE EXAMPLE.
Figure 23B:
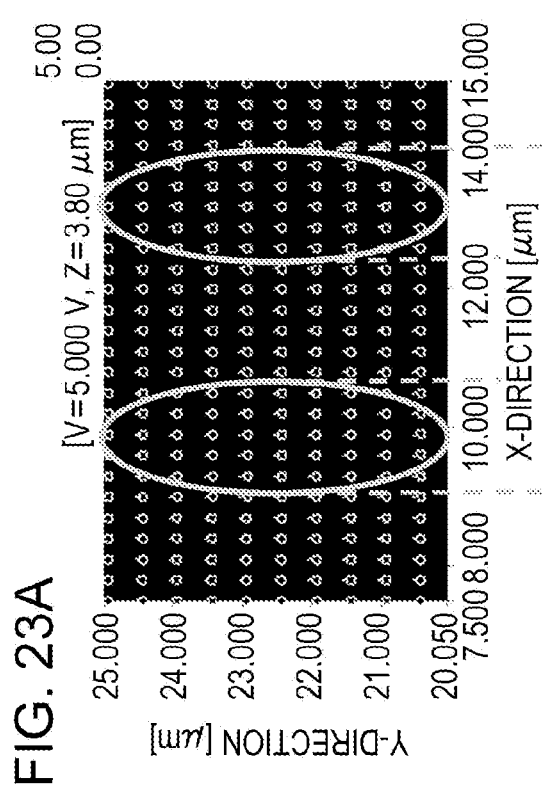
Figure 23C:
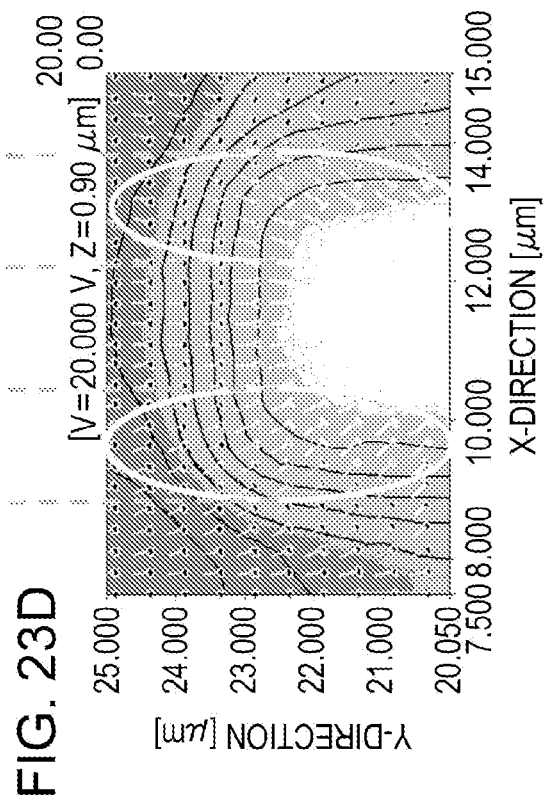
Figure 23D:
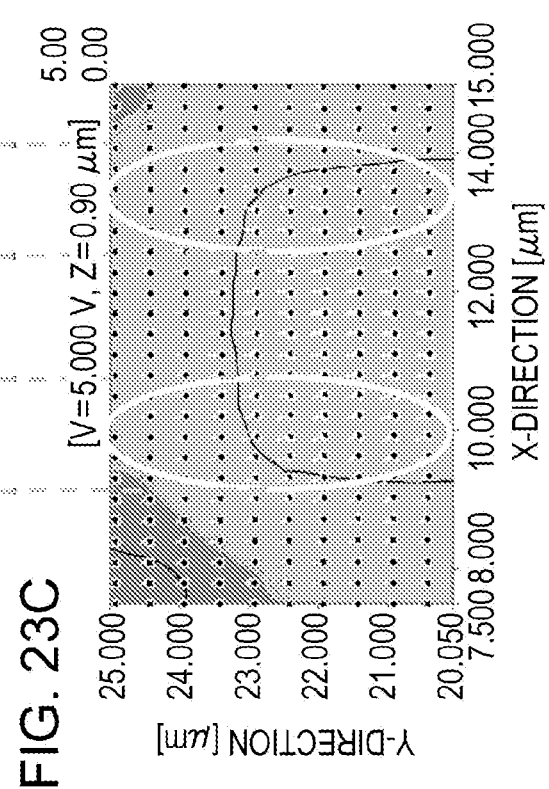
Figure 24A:
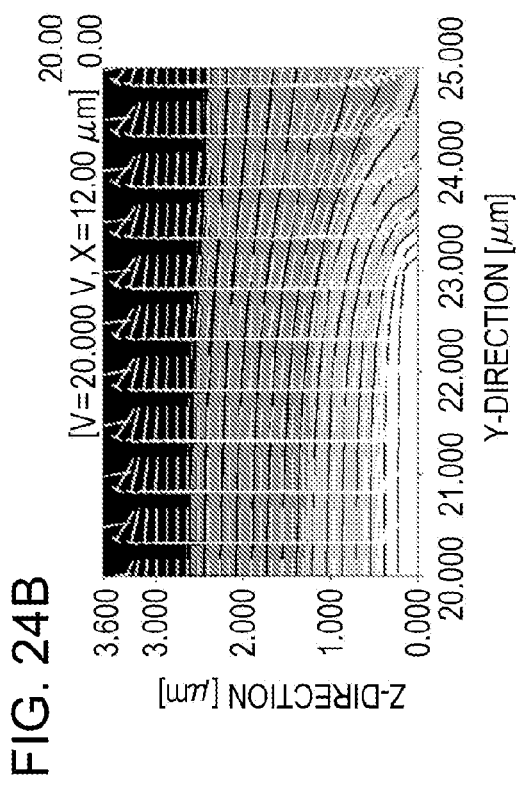
FIGS. 24A to 24D illustrate the results of simulating behaviors of liquid crystal molecules in COMPARATIVE EXAMPLE.
Figure 24B:
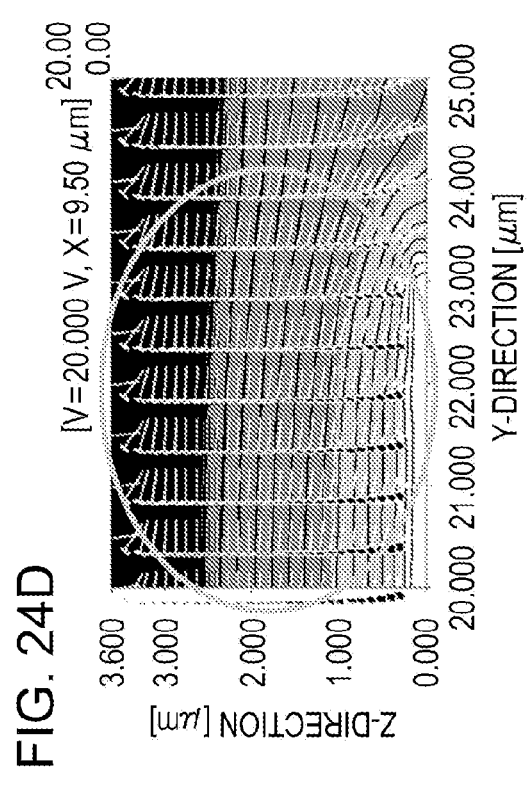
Figure 24C:
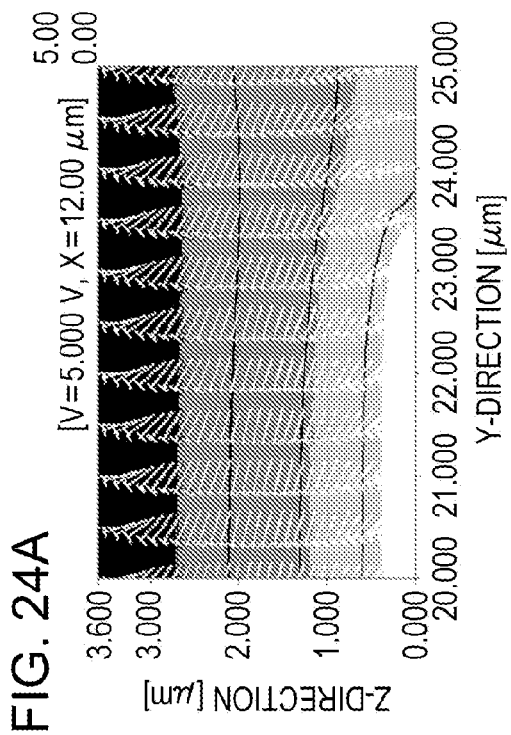
Figure 24D:
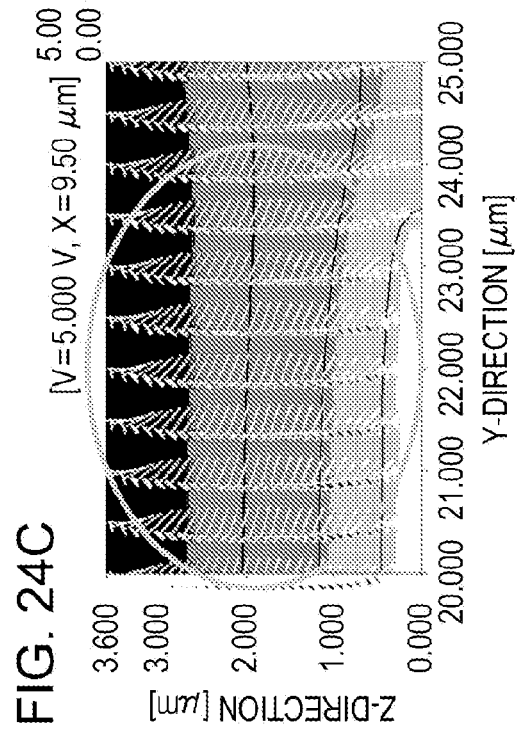

Alignment film materials 2 to 17 were prepared, as listed in Table 1 given below, similarly to the alignment film material 1 except for using different materials, and liquid crystal display devices were fabricated in a similar manner to that described above. Be it noted that, while the polyamic acid was used in the alignment film material 1, polyimide was used in the alignment film material 2.

result illustrated in FIG. 19, the response characteristic is greatly improved for the reason that, unlike the case illustrated in FIG. 22, the major axes of the group of liquid crystal molecules are not in the twisted state at the time when the voltage is applied between the pair of electrodes. The simulation results illustrated in FIGS. 20A and 20B represent the liquid crystal molecules on an assumption that the liquid crystal layer is cut along an imaginary plane parallel to the second substrate (CF substrate) at a position

TABLE 1

| | Diamine compound | | Compound having vertical alignment inducing structure portion | | Compound having group capable of being positioned along liquid crystal molecule | | Compound being diamine compound and having group capable of being positioned along liquid crystal molecule | | Tetracarboxylic dianhydride | | Main chain spacer | |
|---|---|---|---|---|---|---|---|---|---|---|---|---|
| | material | mole ratio | material | mole ratio | material | mole ratio | material | mole ratio | material | mole ratio | material | mole ratio |
| Alignment film material 1 | A-6 | 25 | B-4 | 5 | | | | | E-2 | 50 | G-1 | 20 |
| Alignment film material 2 | A-6 | 25 | B-4 | 5 | | | | | E-2 | 50 | G-1 | 20 |
| Alignment film material 3 | A-6 | 25 | B-12 | 5 | | | | | E-2 | 50 | G-1 | 20 |
| Alignment film material 4 | A-6 | 25 | B-4 | 5 | | | | | E-1 | 50 | G-1 | 20 |
| Alignment film material 5 | A-6 | 15 | B-4 | 5 | C-1 | 10 | | | E-2 | 50 | G-1 | 20 |
| Alignment film material 6 | A-20 | 15 | B-4 | 5 | C-1 | 10 | | | E-2 | 50 | G-1 | 20 |
| Alignment film material 7 | A-6 | 15 | B-12 | 5 | C-1 | 10 | | | E-2 | 50 | G-1 | 20 |
| Alignment film material 8 | A-6 | 15 | B-4 | 5 | C-13 | 10 | | | E-2 | 50 | G-1 | 20 |
| Alignment film material 9 | A-6 | 15 | B-4 | 5 | C-1 | 10 | | | E-1 | 50 | G-1 | 20 |
| Alignment film material 10 | A-6 | 15 | | | C-1 | 15 | | | E-2 | 50 | G-1 | 20 |
| Alignment film material 11 | A-6 | 15 | B-4 | 5 | | | D-4 | 10 | E-2 | 50 | G-1 | 20 |
| Alignment film material 12 | A-20 | 15 | B-4 | 5 | | | D-4 | 10 | E-2 | 50 | G-1 | 20 |
| Alignment film material 13 | A-6 | 15 | B-12 | 5 | | | D-4 | 10 | E-2 | 50 | G-1 | 20 |
| Alignment film material 14 | A-6 | 15 | B-4 | 5 | | | D-8 | 10 | E-2 | 50 | G-1 | 20 |
| Alignment film material 15 | A-6 | 15 | B-4 | 5 | | | D-4 | 10 | E-1 | 50 | G-1 | 20 |
| Alignment film material 16 | A-6 | 15 | | | | | D-4 | 15 | E-2 | 50 | G-1 | 20 |
| Alignment film material 17 | | | | | | | D-4 | 30 | E-2 | 50 | G-1 | 20 |

The response time and the pre-tilt θ were measured for each of the liquid crystal display devices (liquid crystal display elements) fabricated using the alignment film materials 1 to 17. The measured results are listed in Table 3 given below. The response time was measured by using LCD 5200 (made by OTSUKA ELECTRONICS CO., LTD.) as a measuring device, more specifically, by applying a drive voltage (2.5 V to 7.5 V) between the pixel electrodes 20B and the counter electrodes 30B, and by counting a time taken for brightness to increase from 10% up to 90% of a full level at a gradation corresponding to the applied drive voltage. Further, the pre-tilt θ of the liquid crystal molecule 41 was measured by a crystal rotation process using a He—Ne laser beam in accordance with the ordinary method (i.e., the method described in T. J. Scheffer et al., J. Appl. Phys., vol. 19, p. 2013, 1980). Be it noted that, as described above with reference to FIG. 6, when the direction perpendicular (i.e., the direction normal) to the surfaces of the glass substrates 20A and 30A is represented by Z, the pre-tilt θ is defined as an inclination angle of the director D of the liquid crystal molecule 41 (41A, 41B) with respect to the direction Z in the state where the drive voltage is turned off.

Figure 21A:
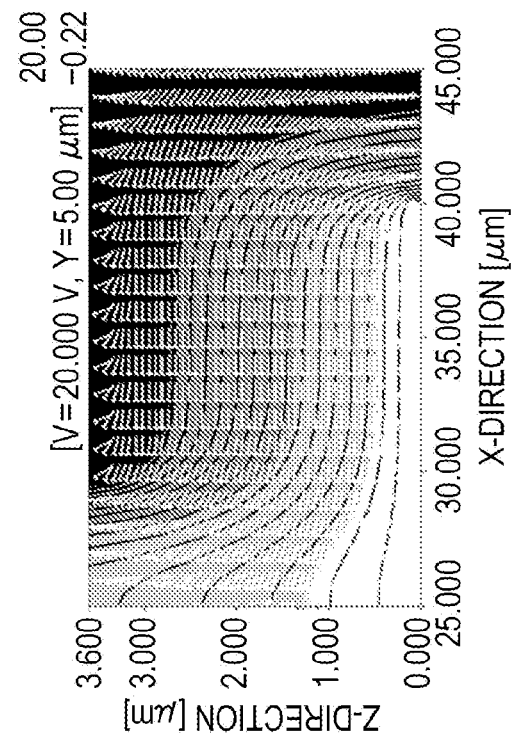
FIGS. 21A and 21B illustrate the results of simulating behaviors of liquid crystal molecules in EXAMPLE 1.
Figure 21B:
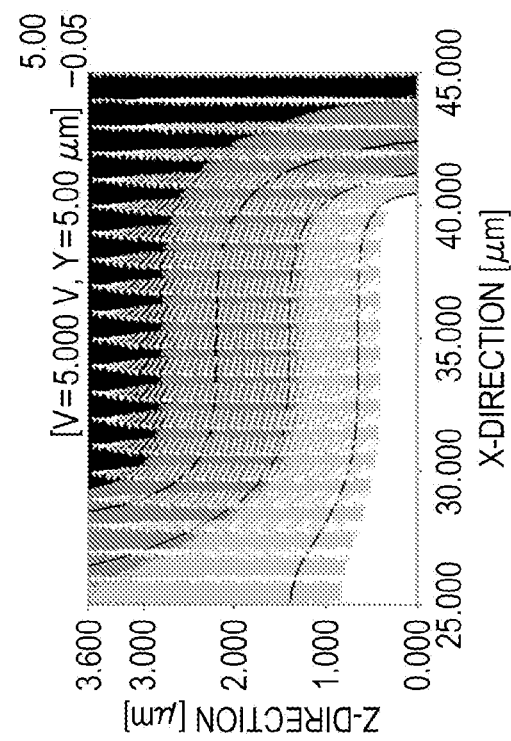

FIGS. 19, 20 and 21 illustrate the results of simulations performed in EXAMPLE 1. As seen from the simulation near the second alignment film. The simulation results illustrated in FIGS. 20C and 20D represent the liquid crystal molecules on an assumption that the liquid crystal layer is cut along an imaginary plane parallel to the first substrate (TFT substrate) at a position near the first alignment film. Further, the simulation results illustrated in FIGS. 20A and 20C represent the liquid crystal molecules when 5 V is applied between the first and second electrodes, and the simulation results illustrated in FIGS. 20B and 20D represent the liquid crystal molecules when 20 V is applied between the first and second electrodes. On the other hand, the simulation results illustrated in FIGS. 21A and 21B represent the liquid crystal molecules on an assumption that the liquid crystal layer is cut along an imaginary vertical (perpendicular) plane. Further, the simulation result illustrated in FIG. 21A represents the liquid crystal molecules when 5 V is applied between the first and second electrodes, and the simulation result illustrated in FIG. 21B represents the liquid crystal molecules when 20 V is applied between the first and second electrodes.

In COMPARATIVE EXAMPLE, as illustrated in FIG. 26B, the first electrode (pixel electrode) on the first substrate (TFT substrate) had a structure including the trunk electrode portion with a width of 3 μm and branch electrode portions (with a width of 4 μm) extending in the direction perpendicular to the trunk electrode portion (at an interval (gap) of 4 μm between the adjacent branch electrode portions). Further, the second electrode (counter electrode) on the second substrate (CF substrate) was formed as the so-called solid electrode without providing slits. In the case of such an electrode structure, as seen from simulation results illustrated in FIGS. 23, 24 and 25, the major axes of the group of liquid crystal molecules are in the state twisted from one electrode side toward the other electrode side.

Figure 25A:
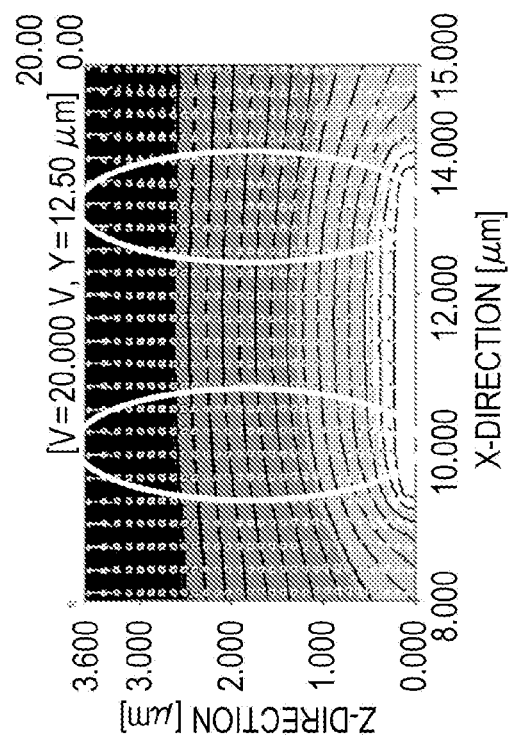
FIGS. 25A and 25B illustrate the results of simulating behaviors of liquid crystal molecules in COMPARATIVE EXAMPLE.
Figure 25B:
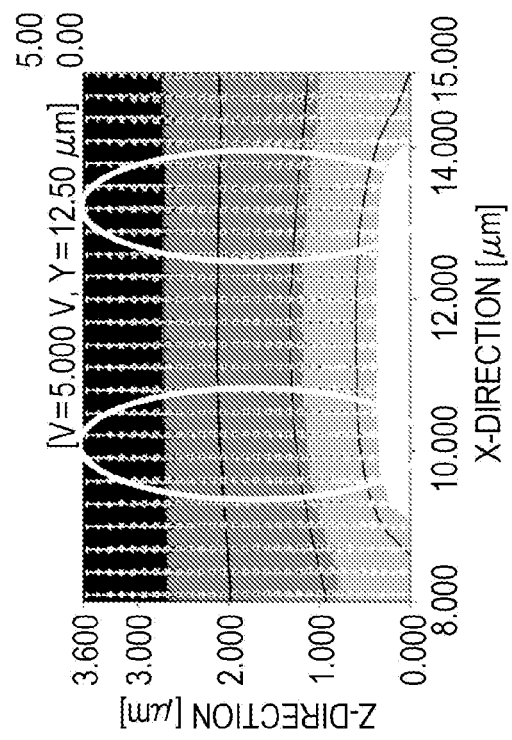

The simulation results in COMPARATIVE EXAMPLE are illustrated in FIGS. 23, 24 and 25. The simulation results illustrated in FIGS. 23A and 23B represent the liquid crystal molecules on an assumption that the liquid crystal layer is cut along an imaginary plane parallel to the second substrate (CF substrate) at a position near the second alignment film. The simulation results illustrated in FIGS. 23C and 23D represent the liquid crystal molecules on an assumption that the liquid crystal layer is cut along an imaginary plane parallel to the first substrate (TFT substrate) at a position near the first alignment film. Further, the simulation results illustrated in FIGS. 23A and 23C represent the liquid crystal molecules when 5 V is applied between the first and second electrodes, and the simulation results illustrated in FIGS. 23B and 23D represent the liquid crystal molecules when 20 V is applied between the first and second electrodes. Moreover, the simulation results illustrated in FIGS. 24A and 24B represent the liquid crystal molecules on an assumption that the liquid crystal layer is cut along an imaginary vertical (perpendicular) plane denoted by line XXIVA-XXIVA, XXIVB-XXIVB in FIG. 26B. The simulation results illustrated in FIGS. 24C and 24D represent the liquid crystal molecules on an assumption that the liquid crystal layer is cut along an imaginary vertical (perpendicular) plane denoted by line XXIVC-XXIVC, XXIVD-XXIVD in FIG. 26B. Further, the simulation results illustrated in FIGS. 24A and 24C represent the liquid crystal molecules when 5 V is applied between the first and second electrodes, and the simulation results illustrated in FIGS. 24B and 24D represent the liquid crystal molecules when 20 V is applied between the first and second electrodes. Moreover, the simulation results illustrated in FIGS. 25A and 25B represent the liquid crystal molecules on an assumption that the liquid crystal layer is cut along an imaginary vertical (perpendicular) plane denoted by line XXVA-XXVA, XXVB-XXVB in FIG. 26B. Further, the simulation result illustrated in FIG. 25A represents the liquid crystal molecules when 5 V is applied between the first and second electrodes, and the simulation result illustrated in FIG. 25B represents the liquid crystal molecules when 20 V is applied between the first and second electrodes.

TABLE 3

| Alignment film material | Pre-tilt (degree) | Response time (msec) EXAMPLE | Response time (msec) COMPARATIVE EXAMPLE |
| --- | --- | --- | --- |
| 1 | 1.5 | 2.754 | 16.214 |
| 2 | 1.8 | 2.594 | 14.310 |
| 3 | 1.0 | 3.482 | 18.301 |
| 4 | 1.4 | 3.039 | 11.202 |
| 5 | 1.6 | 2.521 | 12.391 |
| 6 | 1.6 | 2.632 | 11.290 |
| 7 | 1.9 | 2.038 | 9.029 |
| 8 | 0.8 | 3.944 | 15.219 |
| 9 | 2.0 | 1.982 | 8.322 |
| 10 | 1.3 | 3.209 | 14.209 |
| 11 | 1.1 | 3.280 | 16.291 |
| 12 | 1.0 | 3.231 | 14.329 |
| 13 | 1.7 | 2.332 | 8.305 |
| 14 | 2.0 | 1.882 | 7.241 |
| 15 | 1.4 | 2.720 | 13.874 |
| 16 | 1.5 | 2.645 | 10.513 |
| 17 | 1.2 | 3.109 | 15.279 |
| 18 | 1.5 | 2.295 | 11.587 |
| 19 | 2.0 | 1.926 | 9.377 |
| 20 | 1.2 | 2.837 | 16.288 |
| 21 | 0.9 | 3.124 | 18.329 |

As seen from Table 3, in any of the cases using the alignment film materials 1 to 17 and alignment film materials 18 to 21 in EXAMPLE 2 described later, the response time is reduced to about ¼ in EXAMPLES than in COMPARATIVE EXAMPLES. Accordingly, a smooth image free from tailing can be obtained in the liquid crystal display device driven at 240 Hz, and a clear image free from crosstalk can also be obtained in a time-division 3D display. When the time-division 3D display is driven at 240 Hz, one frame is about 4.2 msec. Hence, the response time has to be held within such a frame time. In the related-art liquid crystal display devices, the response time is held within 4.2 msec at some of gradations, namely not at all gradations. This implies that driven liquid crystal molecules do not follow to a driving image signal. In EXAMPLES, in any of the cases using the alignment film materials 1 to 17, the response time within 4.2 msec is achieved in the full-white state (255 gradations of 8 bits; applied voltage of 7.5 V). If the response time is not within 4.2 msec in the full-white state, display quality is degraded in the overdrive mode. With EXAMPLES, it has been confirmed that the liquid crystal display device driven at 240 Hz can be realized for the first time by achieving the response time within 4.2 msec at all the gradations.

Thus, in EXAMPLE 1 described above or EXAMPLE 2 described later, the compounds before alignment processing in the alignment films 22 and 32 are cross-linked after forming the liquid crystal layer 40 in the sealed-off state such that the alignment films 22 and 32 give the pre-tilt θ to the liquid crystal molecules 41 positioned nearby. As a result, the response speed can be greatly increased. Stated another way, it has been confirmed that the alignment films 22 and 32 capable of giving the pre-tilt to the liquid crystal molecules 41A and 41B can be formed without using an elaborate apparatus. It has also been confirmed that the response characteristic can be hence easily improved.

Further, the following points have been confirmed. In the central region 51 of the overlapped region 50, the major axes of the group of liquid crystal molecules in the liquid crystal layer 40 are positioned substantially in the same imaginary plane. Stated another way, a variation of azimuth angles of the liquid crystal molecule groups in the liquid crystal layer 40 was within ±5°. Thus, in the central region 51 of the overlapped region 50, the group of the liquid crystal molecule in the liquid crystal layer 40 is not in the twisted state. Therefore, when the voltage is applied between the pair of electrodes 20B and 30B, the major axes of the group of liquid crystal molecules does not take a time to release from the twisted state, and the response characteristic can be further improved.

EXAMPLE 2

EXAMPLE 2 concerns with the liquid crystal display device (liquid crystal display element) and the method for manufacturing the same according to the second feature of an embodiment, and with the liquid crystal display device (liquid crystal display element) and the method for manufacturing the same according to the third feature of an embodiment. In EXAMPLE 2, the pre-tilt was given to the liquid crystal molecule by deforming the high-molecular compound (compound before alignment processing) after the liquid crystal layer had been formed in the sealed-off state. More specifically, the side chain of the high-molecular compound (compound before alignment processing) was deformed by irradiating the liquid crystal layer with an ultraviolet ray while the predetermined electric field was applied to the liquid crystal layer for alignment of the liquid crystal molecules. In EXAMPLE 2, the compound before alignment processing (and the compound after alignment processing), containing the photosensitive functional group, was used. More specifically, an azobenzene-based compound and a compound having a styrene skeleton, expressed respectively by the following formulae (H-1) and (H-2), were each used as the compound before alignment processing, which contained the photosensitive functional group, and the response characteristic was measured by fabricating a liquid crystal display device, which had an arrangement and a structure similar to those illustrated in FIG. 1, as in EXAMPLE 1 described above.

manner as that in EXAMPLE 1. Further, as in EXAMPLE 1, the alignment films 22 and 32 were formed in a thickness of 90 nm on the pixel electrodes 20B and the counter electrodes 30B. Subsequently, as in EXAMPLE 1, an ultraviolet-curable resin including silica particles with a particle diameter of 3.5 μm was coated along the peripheral edges of a pixel region on the CF substrate 30, thereby forming the sealing portions. A liquid crystal material made of MLC-7029 (made by Merck), which was a negative type liquid crystal, was poured into a space surrounded by the sealing portions. Thereafter, the TFT substrate 20 and the CF substrate 30 were attached together such that a center line of each linear segment of the pixel electrode 20B and the second slit portion 31 of the counter electrode 30B were positioned to face each other, followed by curing the sealing portions. Thus, the sealing portions were fully cured by heating in an oven at 120° C. for 1 hour. As a result, the liquid crystal layer 40 was formed in the sealed-off state and a liquid crystal cell was completed.

TABLE 2

| | Diamine compound | | Compound having vertical alignment inducing structure portion | | Compound having group capable of being positioned along liquid crystal molecule | | Tetracarboxylic dianhydride | | Main chain spacer | | Compound having photosensitive functional group capable of being deformed | |
|---|---|---|---|---|---|---|---|---|---|---|---|---|
| | material | mole ratio | material | mole ratio | material | mole ratio | material | mole ratio | material | mole ratio | material | mole ratio |
| Alignment film material 18 | A-6 | 15 | B-4 | 5 | | | E-2 | 50 | G-1 | 20 | H-1 | 10 |
| Alignment film material 19 | A-6 | 15 | B-4 | 5 | | | E-2 | 50 | G-1 | 20 | H-2 | 10 |
| Alignment film material 20 | A-6 | 10 | | | C-1 | 10 | E-2 | 50 | G-1 | 20 | H-1 | 10 |
| Alignment film material 21 | | | B-4 | 5 | | | E-1 | 50 | G-1 | 20 | H-1 | 25 |

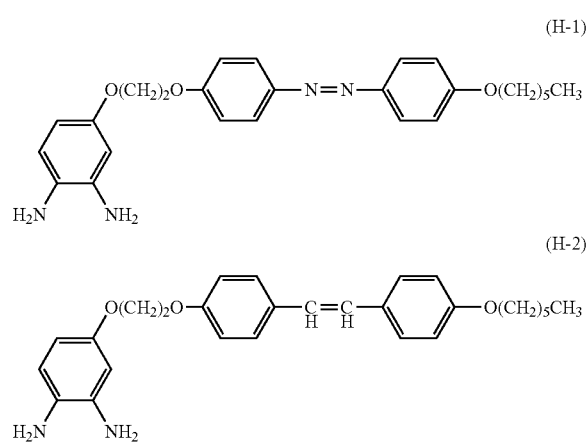

In EXAMPLE 2, the alignment film materials 18 to 21, listed in Table 2, were obtained substantially in the same Subsequently, the liquid crystal cell, fabricated as described above, was irradiated with a uniform ultraviolet ray of 500 mJ (measured at a wavelength of 365 nm) in the state where an AC electric field (60 Hz) in the form of a rectangular wave was applied at an effective voltage value of 20 V, thereby causing the compounds before alignment processing in the alignment films 22 and 32 to deform. As a result, the alignment films 22 and 32 including the compounds after alignment processing (i.e., the deformed high-molecular compounds) were formed respectively on the TFT substrate 20 and the CF substrate 30. Through the steps described above, the liquid crystal display device (liquid crystal display element), illustrated in FIG. 1, was completed in which a pre-tilt was given to the liquid crystal molecules 41A and 41B positioned respectively near the TFT substrate 20 and the CF substrate 30. Finally, a pair of polarizing plates were attached in one-to-one relation to the outer sides of the liquid crystal display device such that absorption axes of the polarizing plates were orthogonal to each other.

The response time and the pre-tilt θ were measured for each of the liquid crystal display devices (liquid crystal display elements) fabricated using the alignment film materials 18 to 21. The measured results are listed in Table 3.

While the present application has been described above in connection with the preferred embodiments and EXAMPLES, the present application is not limited to those embodiments, etc. and can be variously modified. For example, while the embodiments and EXAMPLES have been described in relation to the liquid crystal display device (liquid crystal display element) of the VA mode, applications of an embodiment are not limited to that type of liquid crystal display device (liquid crystal display element), and the present application is further applicable to other display modes, such as the ECB (Electrically Controlled Birefringence) mode (i.e., a positive liquid crystal mode utilizing horizontal alignment without twist), the IPS (In Plane Switching) mode, the FFS (Fringe Field Switching) mode, and the OCB (Optically Compensated Bend) mode. Similar advantages to those described above can also be obtained with the case using any of those modes. Be it noted that, comparing with the related art in which the pre-tilt processing is not carried out, the embodiments of an embodiment can develop a more significant effect in providing a higher response characteristic in the VA mode than in the IPS mode and the FFS mode.

Further, while the foregoing embodiments and EXAMPLES have been described just in connection with the liquid crystal display device (liquid crystal display element) of the transmission type, applications of an embodiment are not limited to the transmission type, and the present application may be applied to, e.g., the reflection type. In the case of the reflection type, the pixel electrodes are made of an electrode material capable of reflecting light, such as aluminum.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. A liquid crystal display device, comprising:
    an array of plural pixels, wherein each pixel of the plural pixels comprises:
        a first substrate and a second substrate;
        a first electrode on a first opposite surface of the first substrate, wherein the first opposite surface is positioned opposite to the second substrate;
        a plurality of first alignment restricting portions provided in the first electrode;
        a first alignment film configured to cover the first electrode, the plurality of first alignment restricting portions, and the first opposite surface of the first substrate;
        a second electrode on a second opposite surface of the second substrate, wherein the second opposite surface is positioned opposite to the first substrate;
        a plurality of second alignment restricting portions provided in the second electrode;
        a second alignment film configured to cover the second electrode, the plurality of second alignment restricting portions, and the second opposite surface of the second substrate; and
        a liquid crystal layer between the first alignment film and the second alignment film, wherein the liquid crystal layer contains liquid crystal molecules,
    wherein, in each pixel of the plural pixels, major axes of a group of liquid crystal molecules in the liquid crystal layer are positioned substantially in a same imaginary plane in a central region of an overlapped region, wherein in the overlapped region a first projected image of a first region overlaps with a second projected image of a second region, wherein the first region is surrounded by edges of the first electrode and two first alignment restricting portions from the plurality of first alignment restricting portions, wherein the second region is surrounded by edges of the second electrode and two second alignment restricting portions from the plurality of second alignment restricting portions, and
    wherein a pre-tilt is given to the liquid crystal molecules by at least the first alignment film.

2. The liquid crystal display device according to claim 1, wherein the liquid crystal molecules have negative dielectric anisotropy.

3. The liquid crystal display device according to claim 2, wherein the first alignment film contains a compound obtained by cross-link of a high-molecular compound that has a cross-linkable functional group or a polymerizable functional group in at least one side chain thereof, and
    wherein the pre-tilt is given to the liquid crystal molecule by the cross-linked compound.

4. The liquid crystal display device according to claim 2, wherein the first alignment film contains a compound obtained by deformation of a high-molecular compound that has a photosensitive functional group in at least one side chain thereof, and
    wherein the pre-tilt is given to the liquid crystal molecule by the deformed compound.

5. The liquid crystal display device according to claim 3, wherein the compound that constitute the first alignment film includes a compound which includes a group expressed by a following formula (1) in at least one side chain thereof,

$$—R1\text{-}R2\text{-}R3 \quad (1)$$

wherein R1 is a linear or branched bivalent organic group which includes a carbon number of 1 or more, wherein the bivalent organic group optionally includes an ether group or an ester group, wherein R1 is bonded to a main chain of the high-molecular compound or the cross-linked compound, or R1 is at least one type of bonding group selected from among ether, ester, ether ester, acetal, ketal, hemiacetal, or hemiketal, wherein R1 is bonded to the main chain of the high-molecular compound or the cross-linked compound, wherein R2 is a bivalent organic group that includes a plurality of ring structures, wherein one of atoms that constitutes a ring structures is bonded to R1, and wherein R3 is a univalent group that includes a hydrogen atom, a halogen atom, an alkyl group, an alkoxy group or a carbonate group, or a derivative thereof.

6. The liquid crystal display device according to claim 3, wherein the compound that constitutes the first alignment film includes a compound that has a group expressed by a following formula (2) in at least one side chain thereof,

$$—R11\text{-}R12\text{-}R13\text{-}R14 \quad (2)$$

wherein R11 is a linear or branched bivalent organic group which includes a carbon number of 1 or more and 20 or less, wherein the organic group optionally includes an ether group or an ester group, wherein R11 is bonded to a main chain of the high-molecular compound, or R11 is at least one type of bonding group selected from among ether, ester, ether ester, acetal, ketal, hemiacetal, or hemiketal, wherein R11 bonded to the main chain of the high-molecular compound, wherein R12 is a bivalent group that includes one type of structure selected from among structures represented by chalcone, cinnamate, cinnamoyl, coumarin, maleimide, benzophenone, norbornene, orizanol, chitosan, acryloyl, methacryloyl, vinyl, epoxy and oxetane, or an ethynylene group, wherein R13 is a bivalent organic group that includes a plurality of ring structures, and wherein R14 is a univalent group that includes a hydrogen atom, a halogen atom, an alkyl group, an alkoxy group or a carbonate group, or a derivative thereof.

7. The liquid crystal display device according to claim 3, wherein the compound obtained by cross-link of the high-molecular compound includes at least one side chain and a main chain that supports the side chain with respect to the first substrate,
wherein the side chain includes:
a cross-linked portion which is bonded to the main chain and in which a part of the side chain is cross-linked; and
a terminal structure portion bonded to the cross-linked portion, and
wherein the liquid crystal molecule is positioned along the terminal structure portion or caught between the terminal structure portions to give the pre-tilt.

8. The liquid crystal display device according to claim 4, wherein the compound obtained by deformation of the high-molecular compound includes at least one side chain and a main chain that supports the side chain with respect to the first substrate,
wherein the side chain includes:
a deformed portion which is bonded to the main chain and in which a part of the side chain is deformed; and
a terminal structure portion bonded to the deformed portion, and
wherein the liquid crystal molecule is positioned along the terminal structure portion or caught between the terminal structure portions to give the pre-tilt.

9. The liquid crystal display device according to claim 3, wherein the compound obtained by cross-link of the high-molecular compound includes at least one side chain and a main chain that supports the side chain with respect to the first substrate,
wherein the side chain includes:
a cross-linked portion which is bonded to the main chain and in which a part of the side chain is cross-linked; and
a terminal structure portion bonded to the cross-linked portion and that contains a mesogenic group.

10. The liquid crystal display device according to claim 4, wherein the compound obtained by deformation of the high-molecular compound includes at least one side chain and a main chain that supports the side chain with respect to the first substrate,
wherein the side chain includes:
a deformed portion which is bonded to the main chain and in which a part of the side chain is deformed; and
a terminal structure portion bonded to the deformed portion and that contains a mesogenic group.

11. The liquid crystal display device according to claim 3, wherein the second alignment film has the same composition as that of the first alignment film.

12. The liquid crystal display device according to claim 6, wherein R11 is the linear or branched bivalent organic group which includes the carbon number of 3 or more and 12 or less.

* * * * *